US011971871B1

United States Patent
Kienle et al.

(10) Patent No.: US 11,971,871 B1
(45) Date of Patent: Apr. 30, 2024

(54) SYSTEM CONTROLLED BY DATA BEARING RECORDS

(71) Applicant: Sketch Align, Inc., Powell, OH (US)

(72) Inventors: Brian N. Kienle, Powell, OH (US); David James Priest, Ostrander, OH (US)

(73) Assignee: SKETCH ALIGN, INC., Powell, OH (US)

( * ) Notice: Subject to any disclaimer, the term of this patent is extended or adjusted under 35 U.S.C. 154(b) by 596 days.

(21) Appl. No.: 17/021,089

(22) Filed: Sep. 15, 2020

Related U.S. Application Data

(60) Provisional application No. 62/901,564, filed on Sep. 17, 2019.

(51) Int. Cl.
| | |
|---|---|
| *G06F 16/23* | (2019.01) |
| *G06F 3/04817* | (2022.01) |
| *G06F 16/29* | (2019.01) |
| *G06F 16/532* | (2019.01) |
| *G06F 16/538* | (2019.01) |
| *G06F 16/54* | (2019.01) |
| *G06F 18/22* | (2023.01) |
| *G06Q 10/10* | (2023.01) |
| *G06Q 10/20* | (2023.01) |

(Continued)

(52) U.S. Cl.
CPC ...... *G06F 16/2365* (2019.01); *G06F 3/04817* (2013.01); *G06F 16/29* (2019.01); *G06F 16/532* (2019.01); *G06F 16/538* (2019.01); *G06F 16/54* (2019.01); *G06F 18/22* (2023.01); *G06Q 10/10* (2013.01); *G06Q 10/20* (2013.01); *G06Q 30/0205* (2013.01); *G06Q 50/16* (2013.01); *G06Q 50/26* (2013.01); *G06T 11/00* (2013.01)

(58) Field of Classification Search
CPC .................................................. G06F 16/2365
See application file for complete search history.

(56) References Cited

U.S. PATENT DOCUMENTS

| | | | |
|---|---|---|---|
| 8,207,964 B1 * | 6/2012 | Meadow | G06Q 10/10 345/441 |
| 10,248,731 B1 * | 4/2019 | Brouwer, II | G06Q 50/186 |

(Continued)

*Primary Examiner* — Mohammad S Rostami
(74) *Attorney, Agent, or Firm* — Ralph E. Jocke; WALKER & JOCKE

(57) ABSTRACT

A system that operates responsive to data bearing records is operative to extract selected data from records related to structures that are included in a property record system (PRS) (12). The extracted record data is used to resolve outline data for corresponding structures and associated parcel and other data through operation of record analysis system (RAS) circuitry (38). The RAS circuitry is operative to acquire georeferenced data records regarding parcels and structures from at least one georeferenced record system (GRS) (26, 32). The RAS circuitry is operative to determine conditions where GRS record data indicates the presence of structures that are absent from PRS records, as well as structures that have various levels of correspondence with the sketch data in data bearing records included in the PRS records. The exemplary RAS circuitry is also operative to produce georeferenced data including visual outputs including visible indicia that shows the structures that are present on parcels and the degrees of discrepancy with data regarding structures in the PRS data.

34 Claims, 37 Drawing Sheets

(51) Int. Cl.
    *G06Q 30/0204*    (2023.01)
    *G06Q 50/16*    (2012.01)
    *G06Q 50/26*    (2012.01)
    *G06T 11/00*    (2006.01)

(56) References Cited

U.S. PATENT DOCUMENTS

| | | | |
|---|---|---|---|
| 10,540,529 B1* | 1/2020 | Bondarenko | G06K 7/10722 |
| 2009/0171980 A1* | 7/2009 | Meadow | G06F 16/51 |
| 2013/0226515 A1* | 8/2013 | Pershing | G06Q 50/16 |
| | | | 702/156 |
| 2014/0046627 A1* | 2/2014 | Pershing | G06Q 10/06 |
| | | | 702/156 |
| 2014/0108016 A1* | 4/2014 | Albrecht | G01C 21/367 |
| | | | 704/E11.001 |
| 2019/0155973 A1* | 5/2019 | Morczinek | G06T 3/4038 |
| 2020/0175623 A1* | 6/2020 | Howie | G01S 19/01 |
| 2020/0348132 A1* | 11/2020 | Du | G06V 20/10 |
| 2020/0349724 A1* | 11/2020 | Chu | G06T 7/33 |

* cited by examiner

SYSTEM CONTROLLED BY DATA BEARING RECORDS

TECHNICAL FIELD

Exemplary embodiments include systems controlled by data bearing records which may be classified in CPC G 06 K 17/00; USPC 235/375

BACKGROUND

Governments and other entities often have the need to maintain accurate records regarding structures that are present on property within their jurisdiction. Often these records are produced and updated through processes that introduce inaccuracies. It is desirable to assure that systems that produce and update such records do so in a manner that is accurate.

Systems that operate responsive to data bearing records and that produce records regarding aspects of structures may benefit from improvements.

SUMMARY

Exemplary embodiments include systems and methods which operate responsive at least in part to data bearing records and which produce data bearing records related to structures and their respective sizes and locations which are more accurate and which are usable to correct accuracies in existing records.

DETAILED DESCRIPTION

Figure 1:
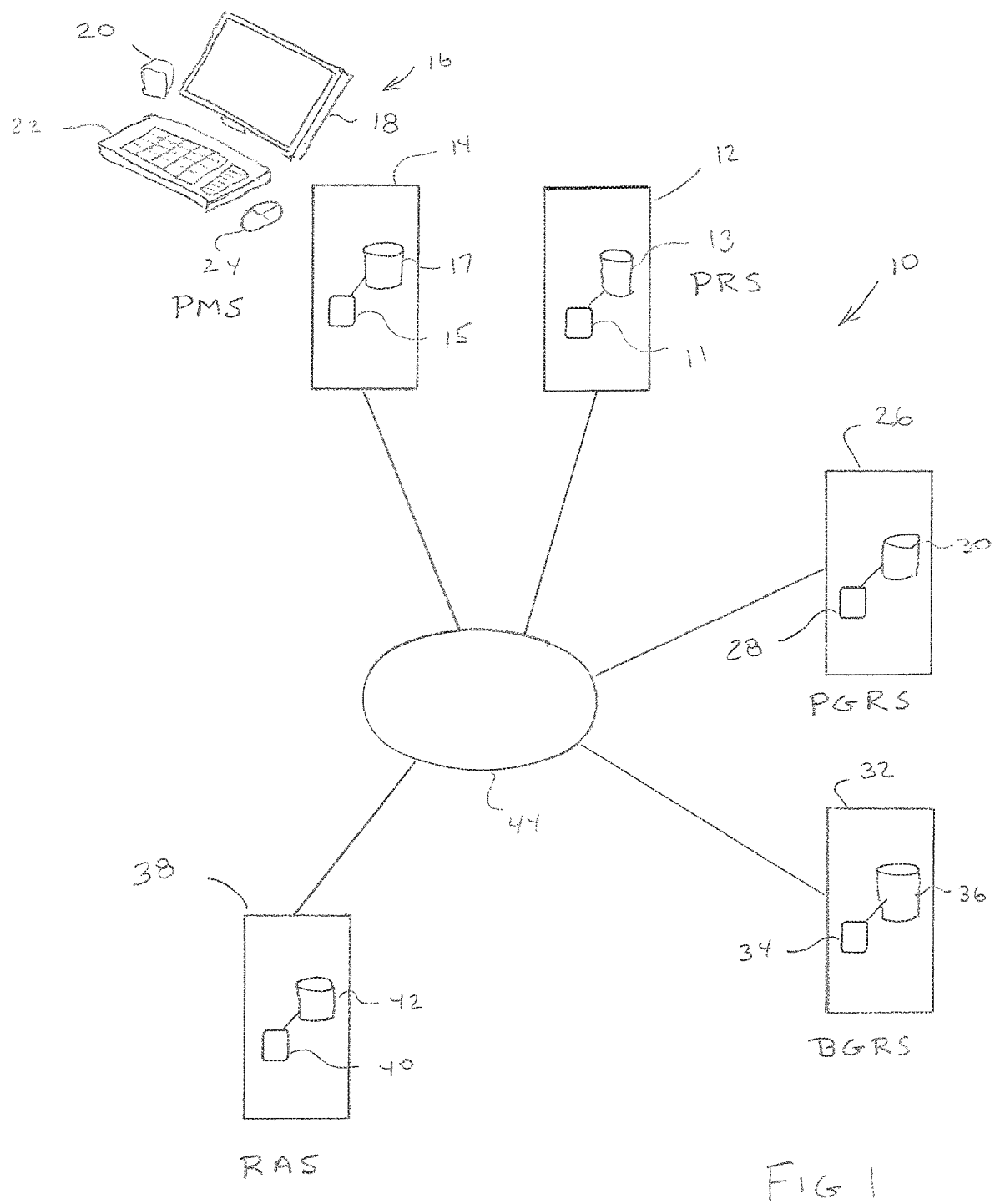
FIG. 1 is a schematic view of an exemplary system that operates responsive to data bearing records for purposes of tracking and updating data bearing records related to the sizes and locations of structures.
Figure 2:
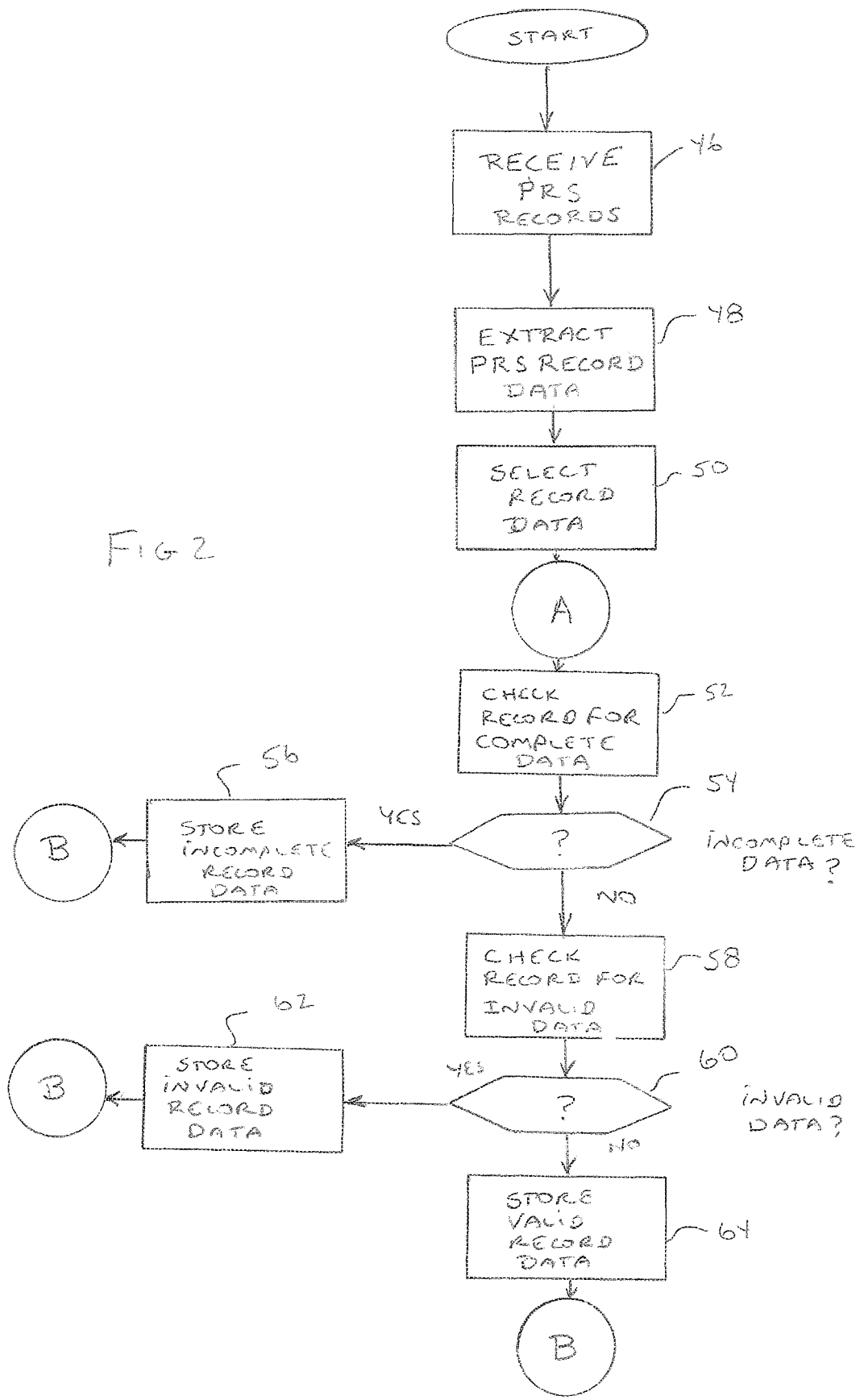
FIGS. 2, 3, 4, 5, 6, 7, 8, 9, 10, 11, 12, 13, 13A, 14, 15, 16, 17, 18 and 19 include a schematic representation of logic carried out through circuitry associated with the exemplary embodiment.
Figure 3:
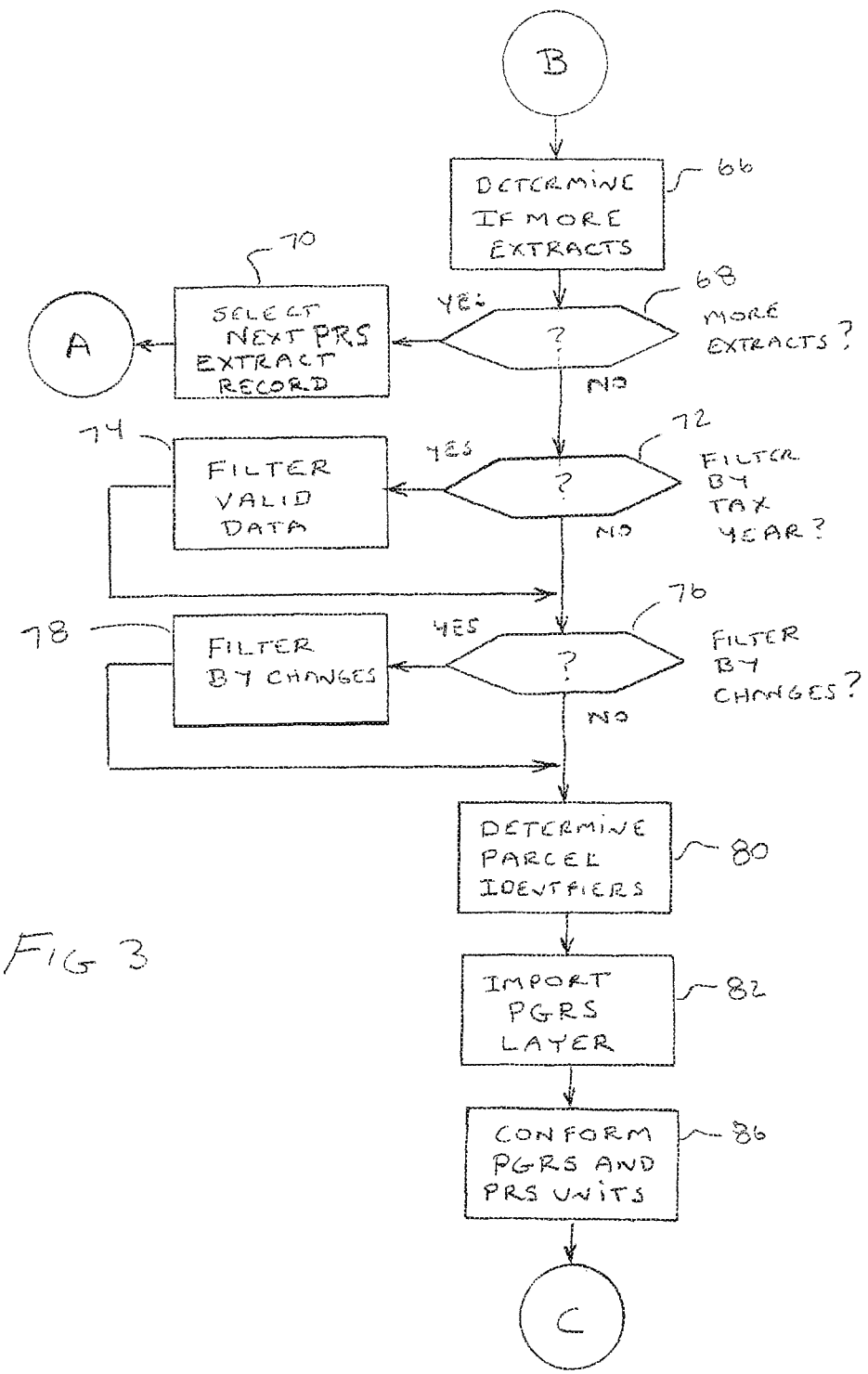
Figure 4:
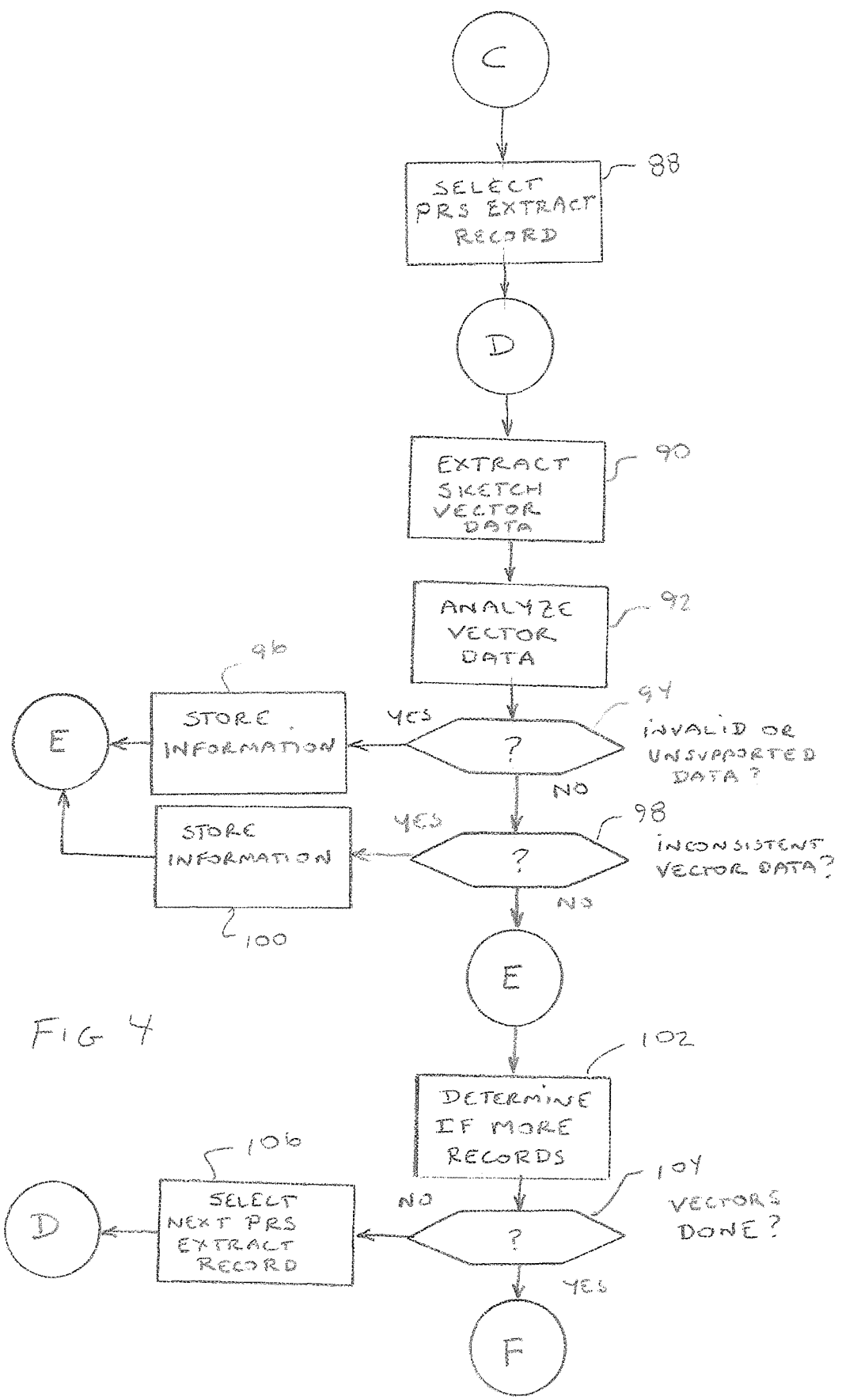
Figure 5:
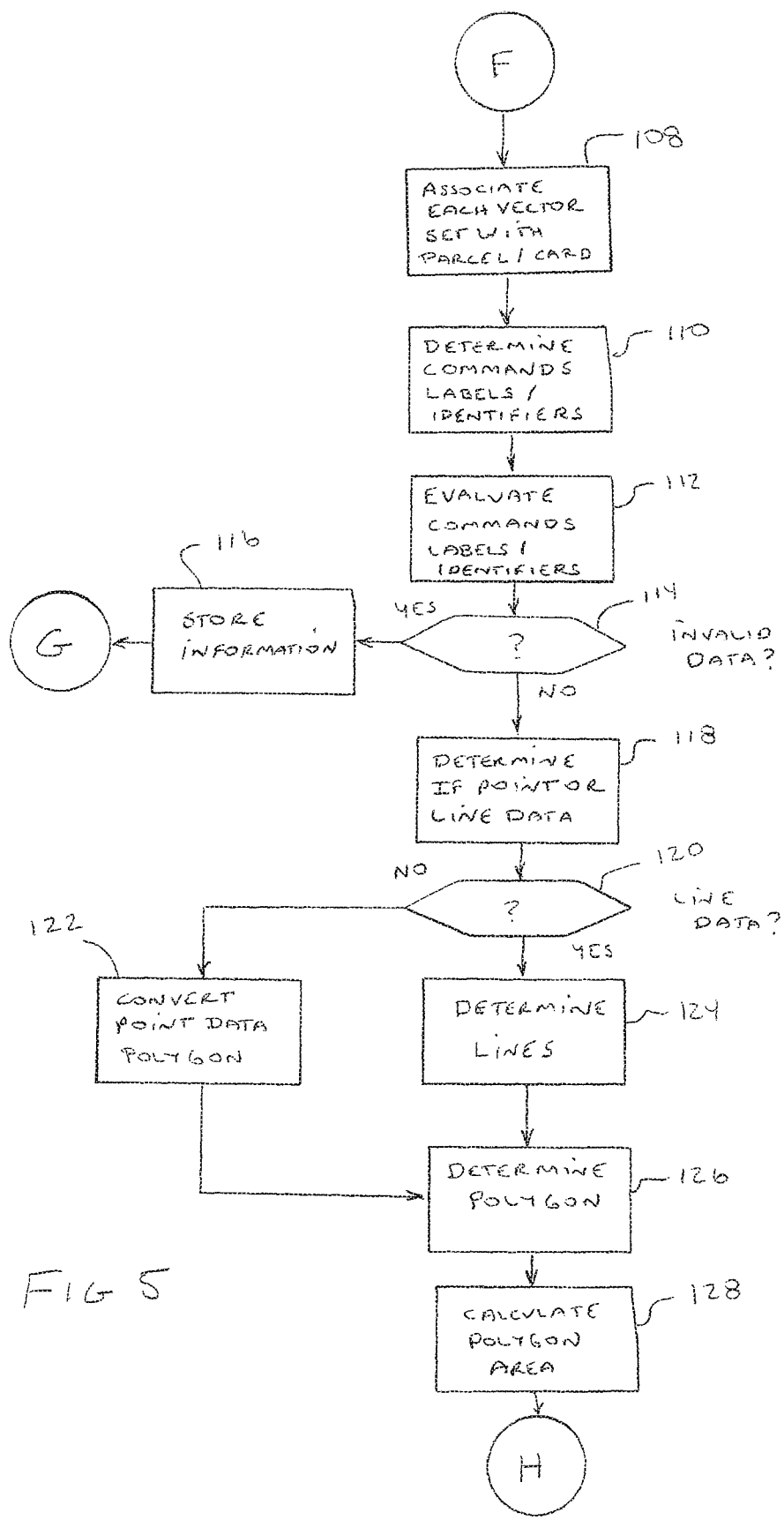
Figure 6:
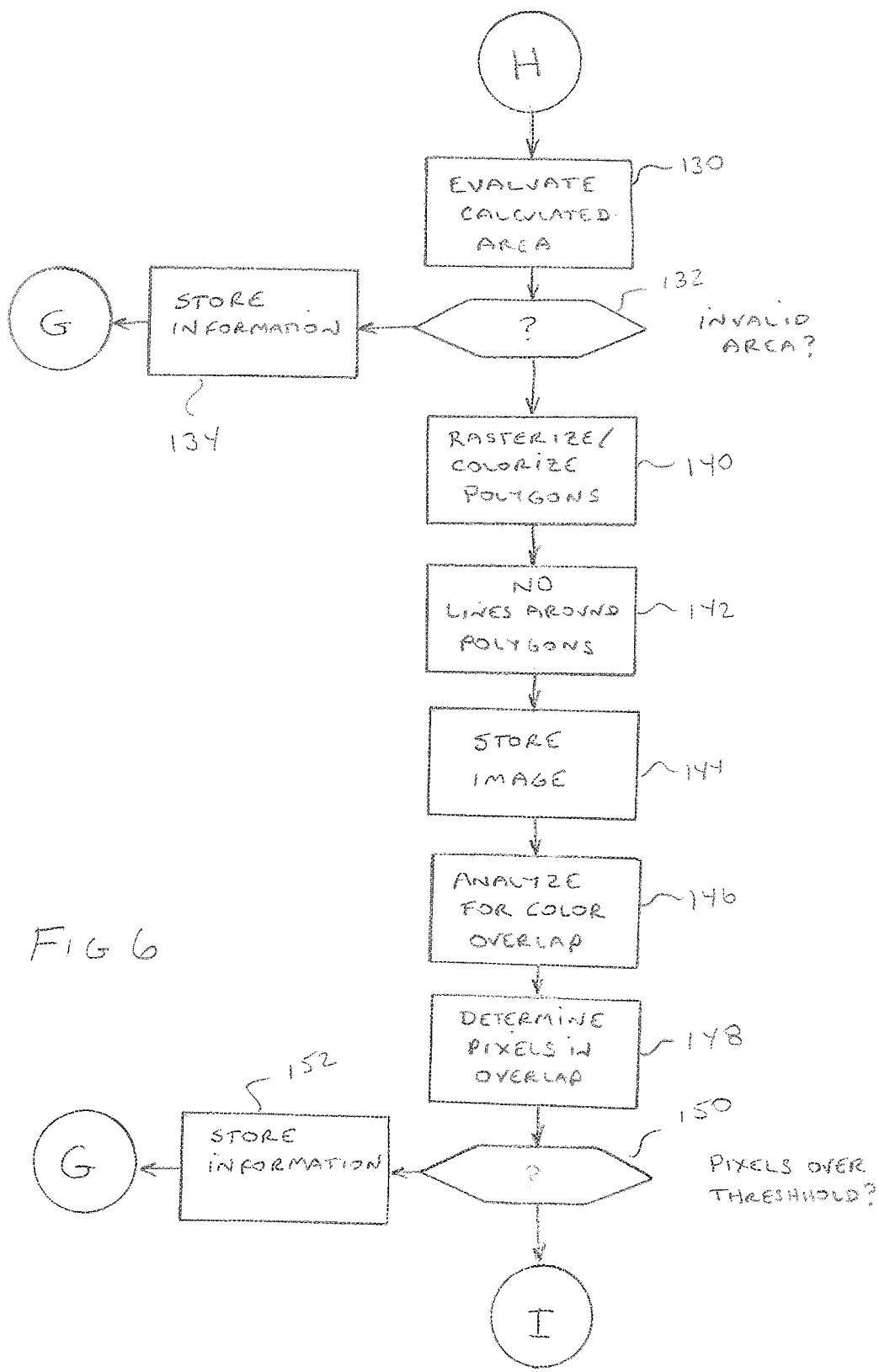
Figure 7:
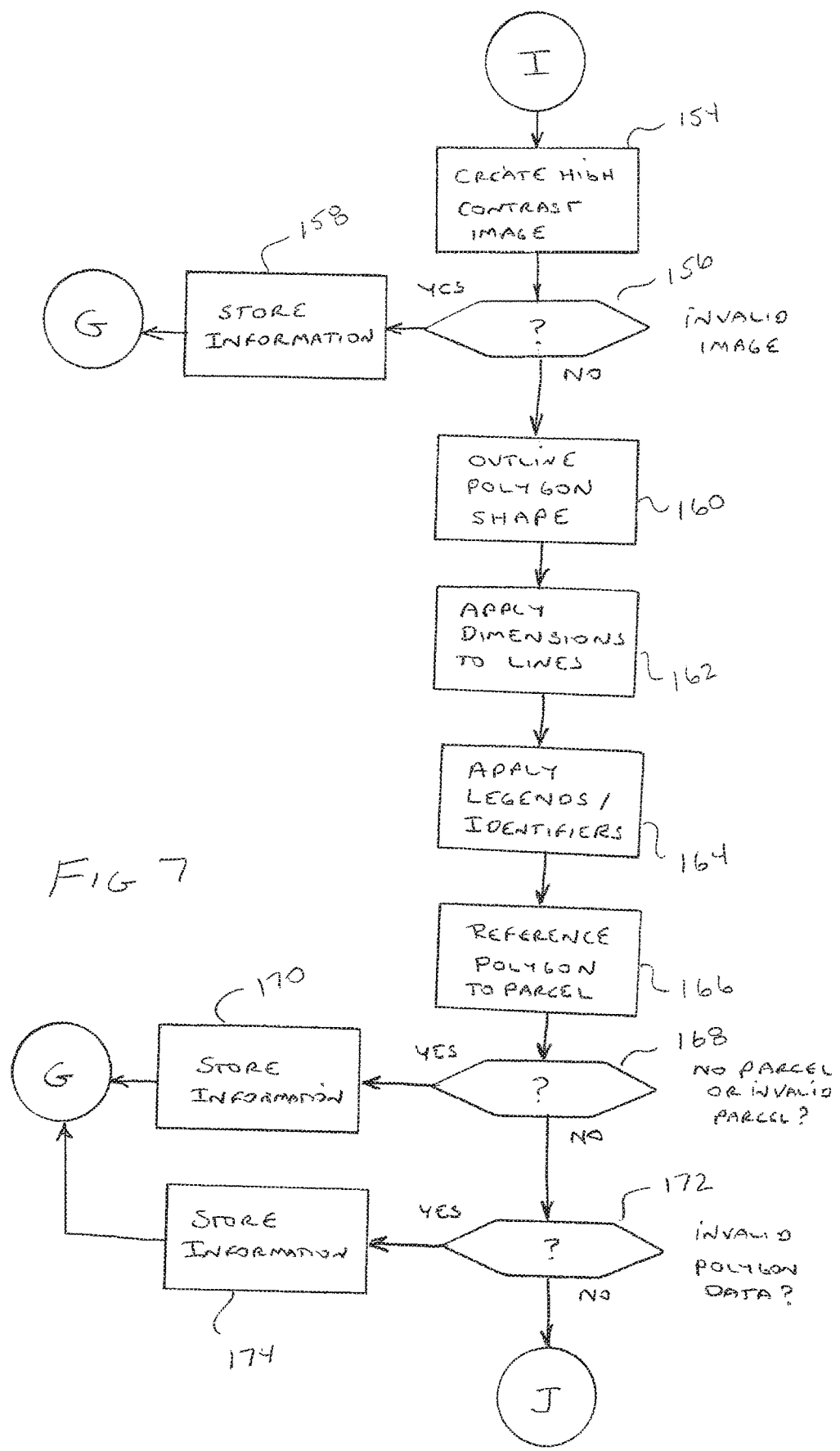
Figure 8:
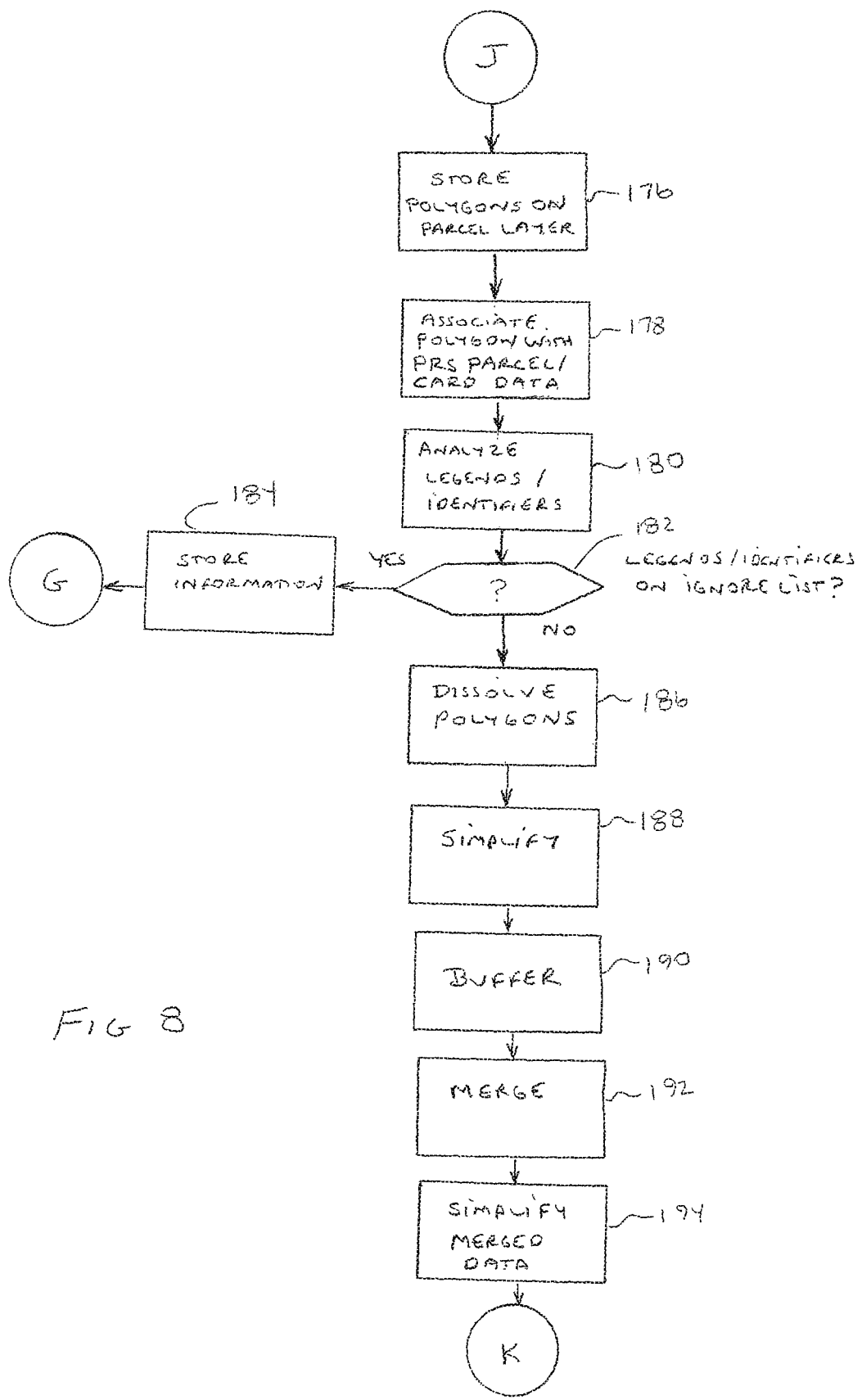
Figure 9:
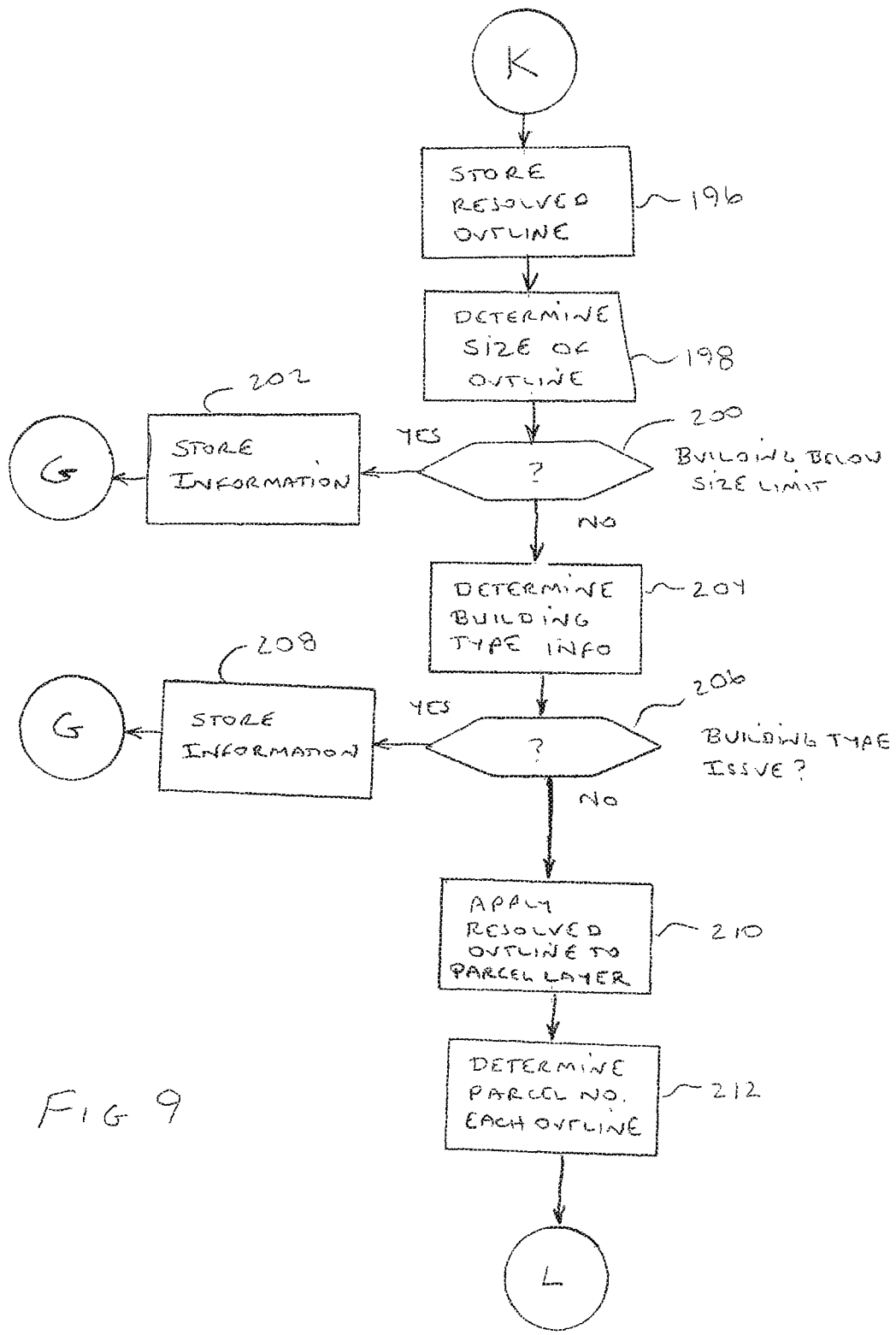
Figure 10:
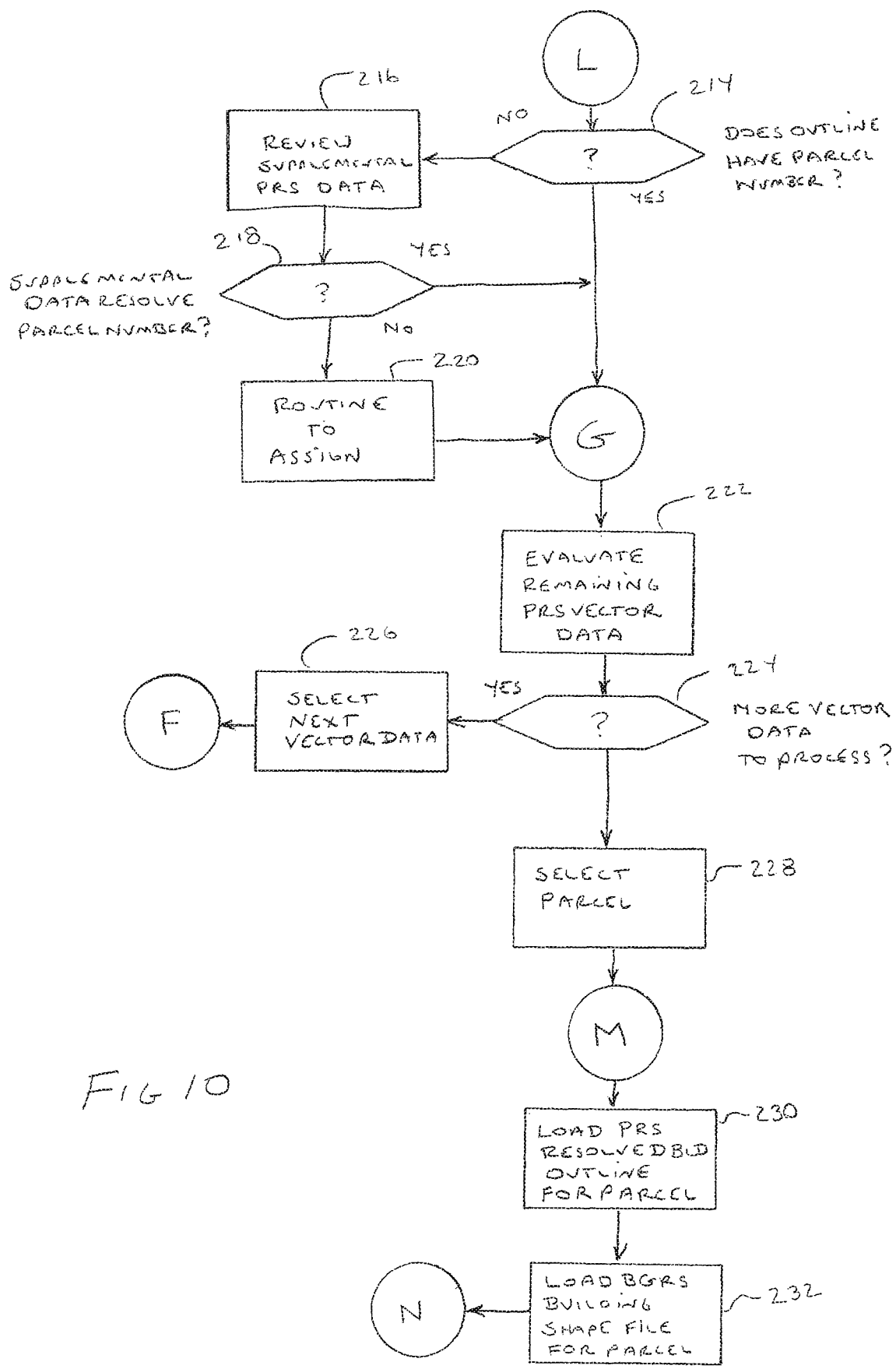
Figure 11:
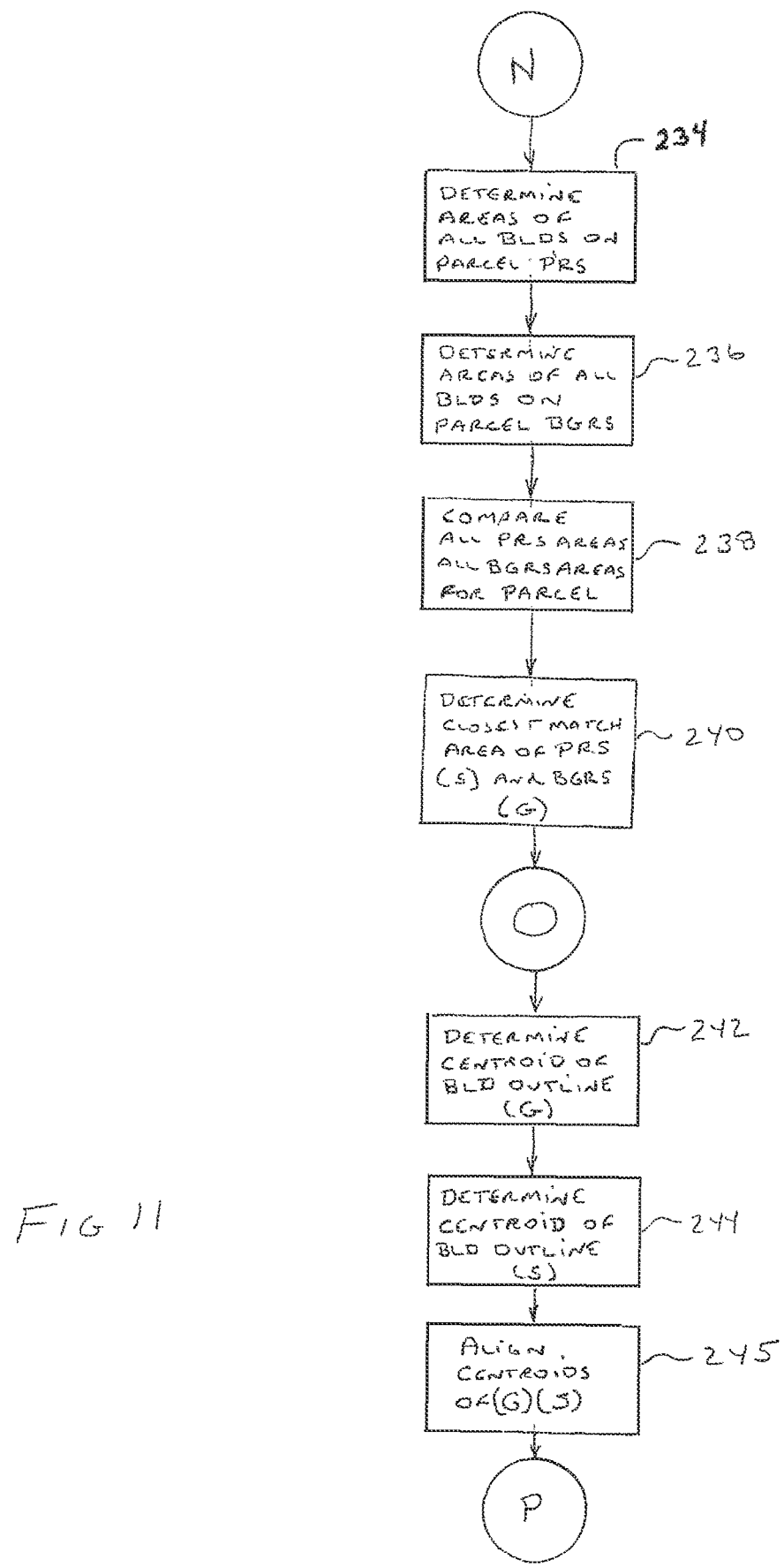
Figure 12:
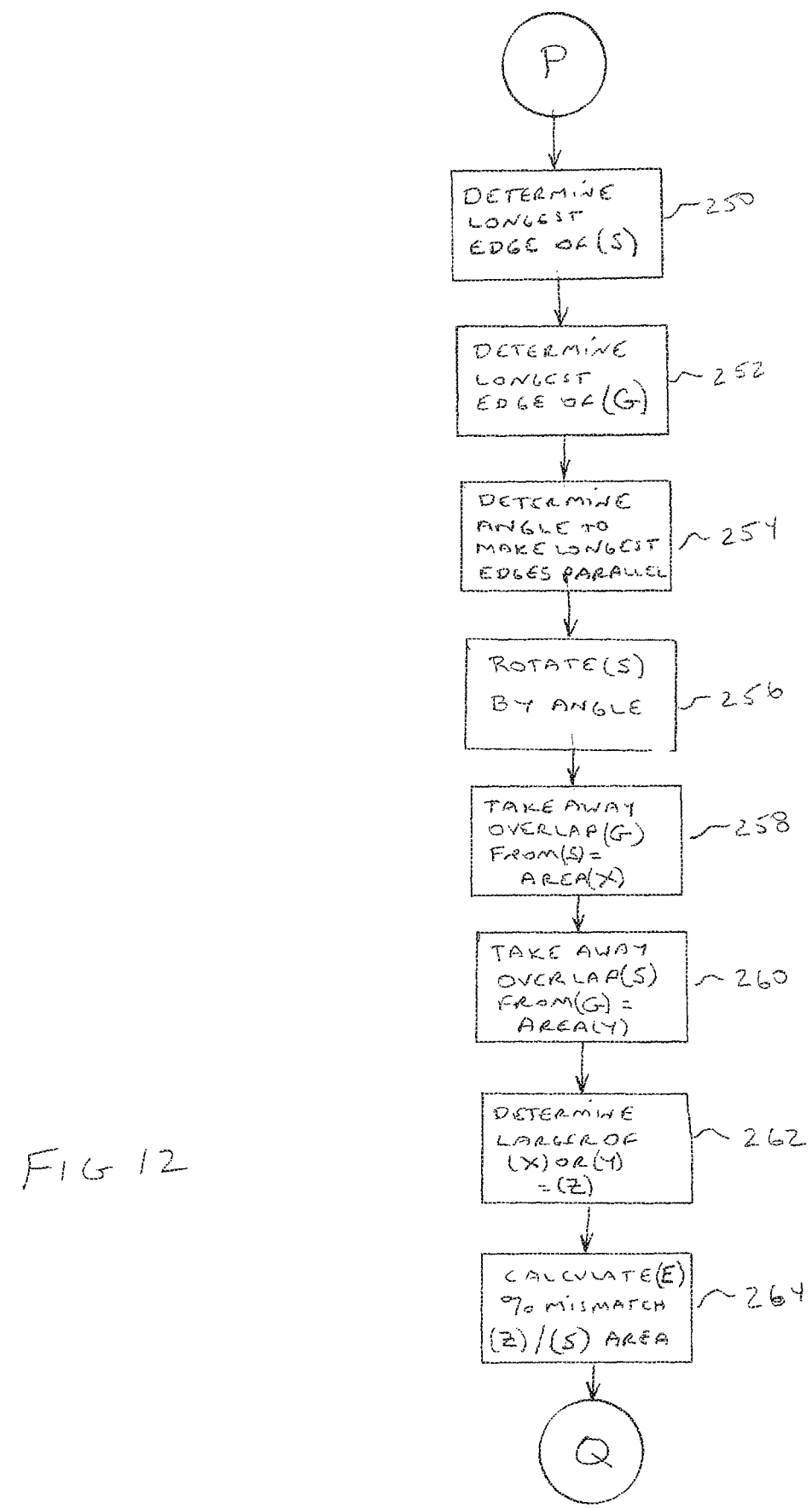
Figure 13:
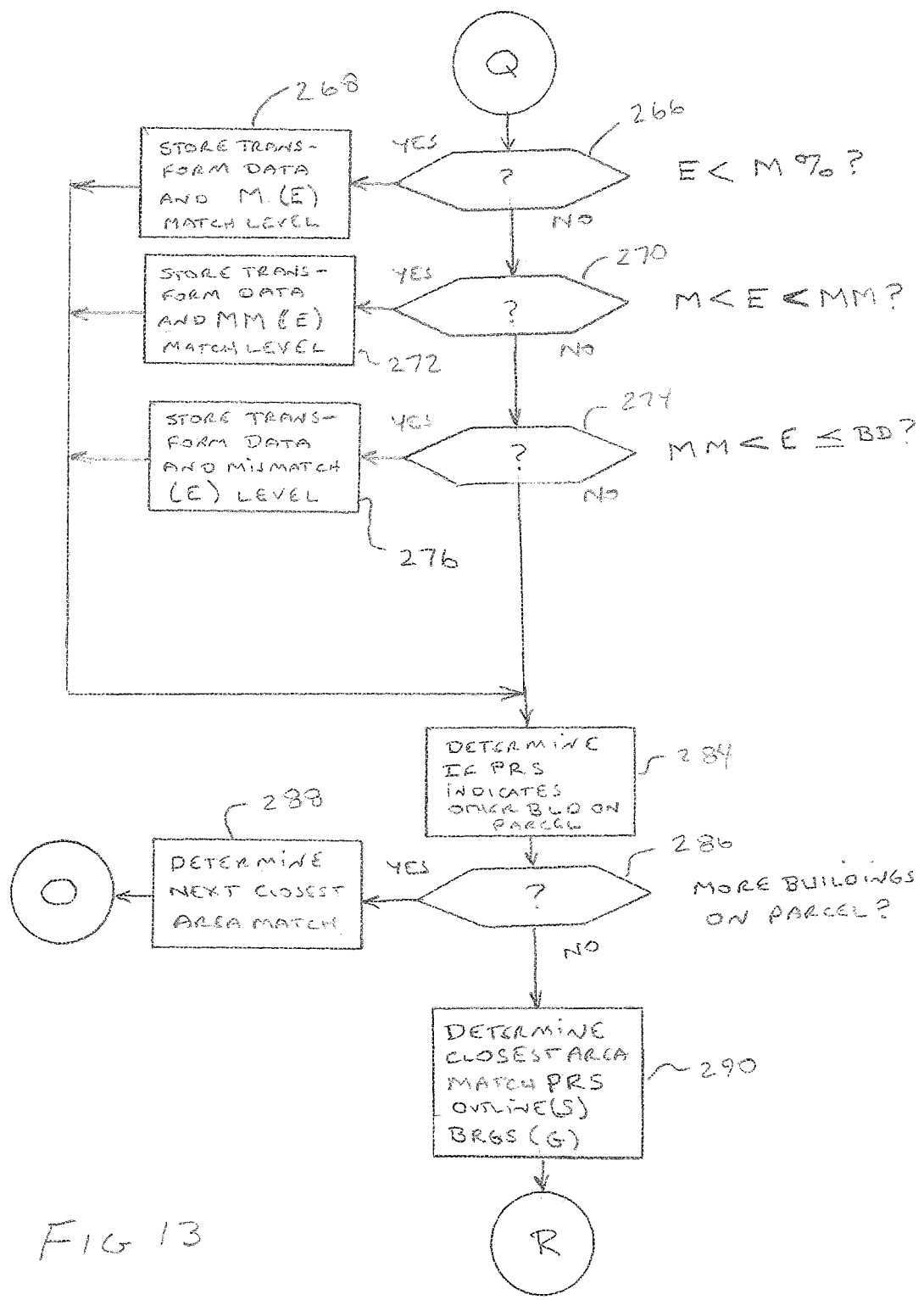
Figure 13A:
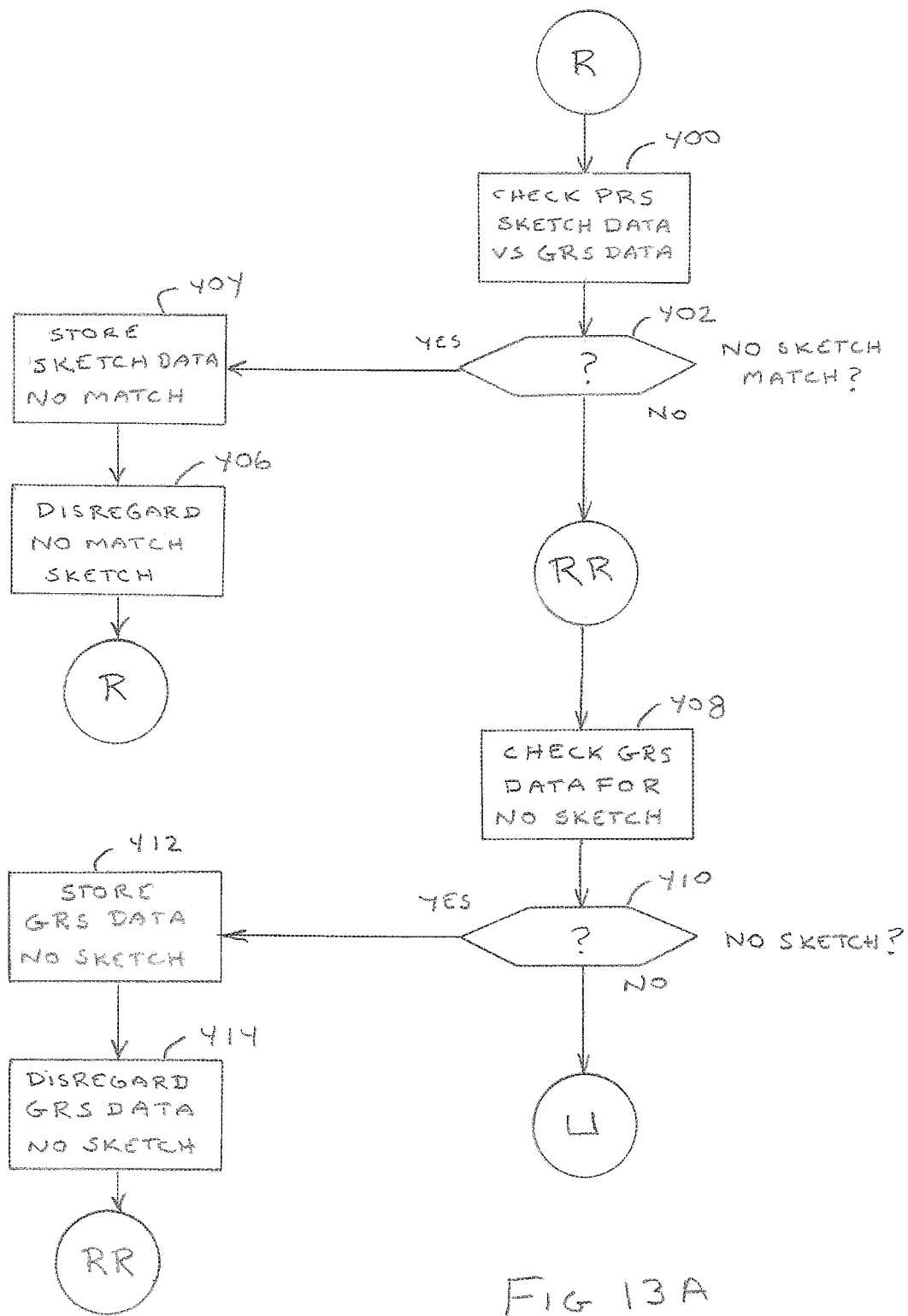
Figure 14:
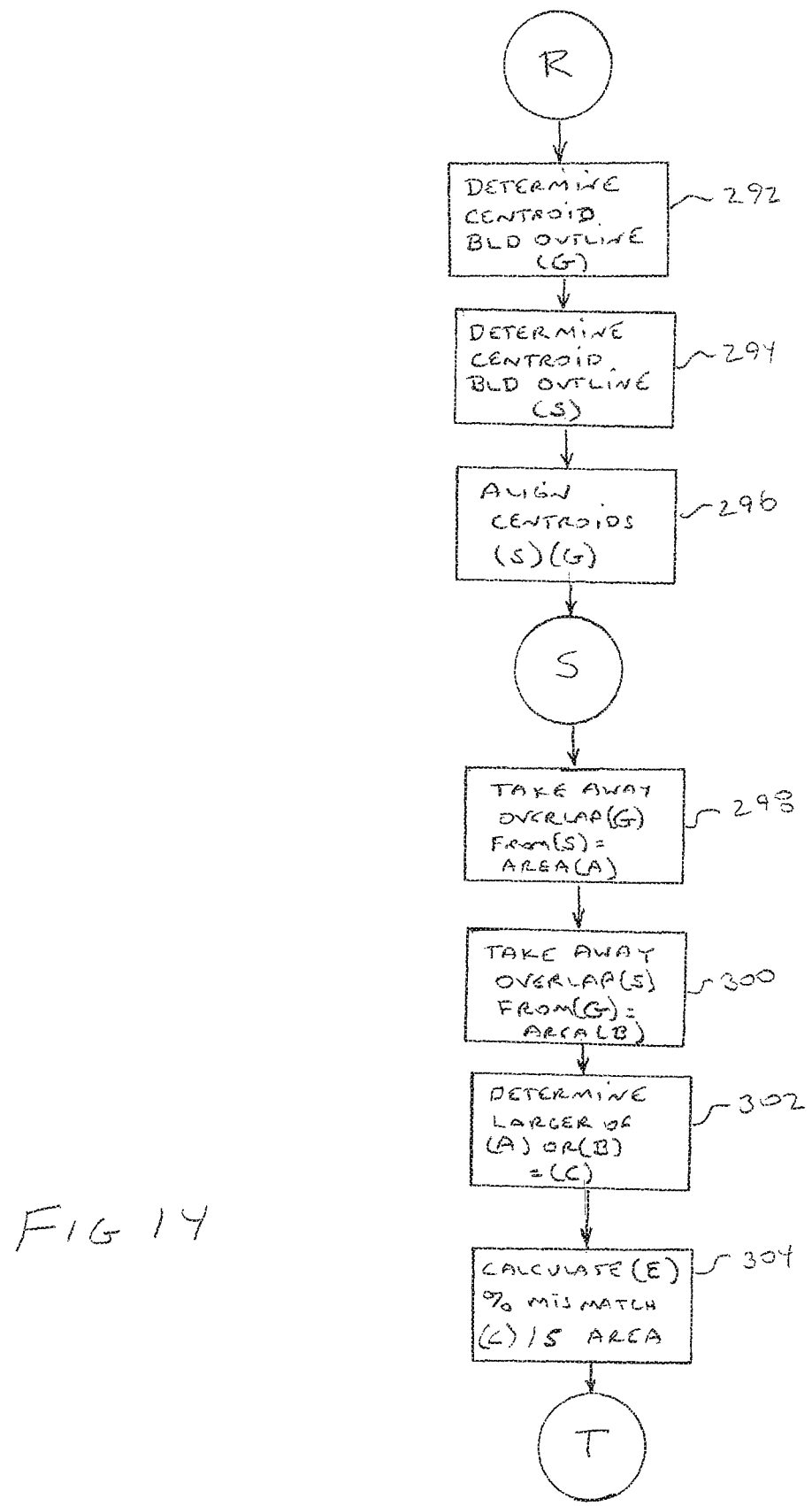
Figure 15:
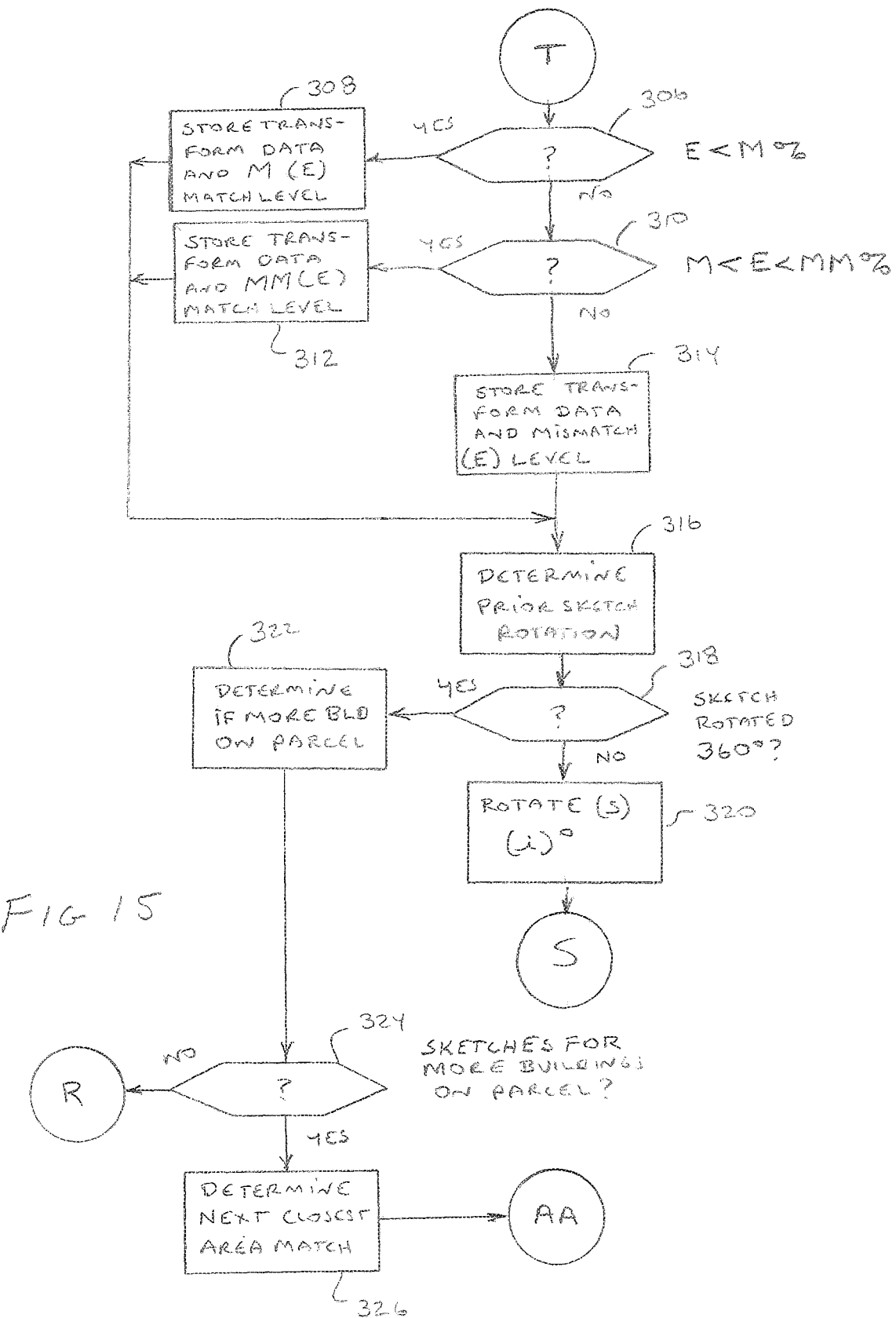

Referring now to the drawings and particularly to FIG. 1 there is shown therein an exemplary embodiment of a system that operates responsive to data bearing records generally indicated 10. The exemplary system 10 includes a property record system (PRS) 12. In the exemplary arrangement PRS 12 includes circuitry schematically indicated 11. Exemplary circuitry 11 includes at least one data store 13. Data store 13 includes circuit executable instructions as well as data bearing records regarding structures and associated parcels of property located within a given geographic territory or jurisdiction. In the exemplary arrangement the data store includes data corresponding to parcels or other geographic areas of real estate, such as areas or regions under common ownership, or that have some common aspect such as responsibility for the payment of real estate taxes or other purposes. The exemplary data store further includes sketch data for building structures included on respective parcels. The exemplary sketch data includes configurations and dimensions which corresponds to the external walls and internal walls of respective building structures. Such stored sketch data may include data corresponding to dimensions and relative directions of such external and/or internal walls which make up the structure. In addition in exemplary arrangements the sketch data may correspond to portions of building structures that have different uses or structural features which have significance for purposes of taxation or other purposes. Further in exemplary arrangements the sketch data may have associated therewith structure type data which is indicative of the use or other aspect of all or an indicated portion of the particular structure. Other data stored in exemplary arrangements may include data regarding when the data was accumulated or last checked. Alternatively or in addition the data store may include records that enable correlation of the data with different types of files and data which is maintained in connection with the PRS or other systems. Of course it should be understood that the data described as stored in connection with the PRS is exemplary and in other arrangements other or additional data may also be stored.

The exemplary arrangement further includes a property management system (PMS) 14. PMS 14 includes circuitry 15. Circuitry 15 includes at least one data store 17 which holds circuit executable instructions and data bearing records. The exemplary PMS 14 has an associated user interface 16. The associated user interface 16 includes output devices such as a display 18 operable to provide visual display outputs and a speaker 20. The exemplary user interface further includes input devices such as a keyboard 22 and a pointing device such as a mouse 24. Of course it should be understood that these input and output devices of user interface 16 are exemplary and other embodiments other types of input and output devices may be used. Further it should be understood that in other exemplary arrangements numerous different types of user interfaces such as user interface terminals may be operative to communicate in the system with the property record system. Further exemplary user interface terminals may be operative to communicate via wired or wireless communications in the network so as to be able to access various types of circuitry that are interconnected through the system for purposes of carrying out the capabilities that are described herein. This may include for example user interface terminals that are portable and usable by individuals who carry out field investigations and other activities related to evaluating building structures and parcels or other geographic areas of real estate.

The exemplary system further includes a parcel georeferenced record system (PGRS) 26. PGRS 26 includes circuitry 28. Circuitry 28 includes at least one data store 30. The at least one data store of the exemplary PGRS includes circuit executable instructions and data bearing records. The data bearing records include records regarding georeferenced data regarding real estate parcels included in the geographic territory for which the exemplary system is utilized. In exemplary arrangements the PGRS includes a geographic information system (GIS) which is operative to capture, store and provide records related to data related to different positions on the earth's surface. Such records are usable by circuitry to generate signals which produce visually perceivable outputs from displays which show features which are applicable to particular geographic territories. Further it should be understood that in this exemplary arrangement the PGRS is operative to provide record data usable to show representations corresponding to overhead views of real estate parcels and the boundaries thereof superimposed on geographic terrain in a particular region or political subdivision. In other exemplary arrangements the PGRS record data may be provided for other types of geographic areas.

The exemplary system further includes a building georeferenced record system (BGRS) 32. BGRS 32 includes circuitry 34. Circuitry 34 includes at least one data store schematically represented 36. The at least one data store 36 includes circuit executable instructions and data bearing records regarding structures located in the geographic territory or other area for which the exemplary system is utilized. The exemplary BGRS may be a system similar to the PGRS that provides records including GIS data. Such data records may be usable by circuitry to produce signals that are usable to produce visual outputs from displays including overhead views of building structures within certain geographic areas. Further it should be understood that in other exemplary arrangements the data and features that are provided from the records included in the PGRS and the BGRS may be provided from a single georeferenced record system (GRS) or a different number of GRS systems which provide GRS data.

The exemplary system further includes a record analysis system (RAS) 38. RAS 38 includes circuitry 40. Circuitry 40 includes at least one data store 42. Data store 42 includes circuit executable instructions and data bearing records that cause the RAS to operate in a manner that is hereinafter discussed.

In the exemplary arrangement the RAS is in operative connection with each of the PRS 12, PMS 14, PGRS 26 and BGRS 32 through one or more networks schematically indicated 44. Network 44 may comprise one or more local or wide area networks that enable communication between the components of the exemplary system 10. Network 44 may include public and/or private networks as well as combinations thereof. Network 44 may further comprise wired or wireless networks of numerous different types and configurations. Further as can be appreciated numerous different types of terminals and circuitry may be operative to communicate through the at least one network 44 for purposes of communication with the various systems that are accessible through the network. Such terminals and circuitry may include mobile wireless devices, laptop computers, desktop computers, servers, hand held terminals, wearable devices such as smart watches, augmented reality headsets, virtual reality headsets or other types of suitable devices which are capable of providing human perceivable outputs and receiving user inputs.

Further it should be understood that the configuration of the exemplary system 10 that is shown is merely a schematic representation of an exemplary arrangement. Alternative arrangements may include numerous different devices and systems that accomplish the functions that are described herein. Further, alternative exemplary arrangements may include the operation of virtual machines that operate in a cloud environment to carry out the functions that are herein described. Further it should be appreciated that different numbers and arrangements of devices shown that carry out the functions of the PRS, PMS, PGRS, BGRS and RAS may be utilized in alternative arrangements to provide the features and accomplish the operations described.

The exemplary RAS 38 is operative to accomplish the analysis of the data bearing records related to structures and other information related to parcels of real property located in a governmental jurisdiction or geographic area for which the exemplary system is utilized. The exemplary circuitry 40 of RAS 38 comprises one or more circuits including processors, which for purposes hereof corresponds to any electronic device that is configured via circuit executable instructions that can be implemented in either hardware circuits, software, firmware or applications that are operative to enable the circuitry to process data and carry out the other actions that are described herein. For example, the circuitry may include circuits that correspond to one or more of a combination of a CPU, FPGA, ASIC or any other integrated circuit or other type circuit that is capable of processing data. The processors may be included in a computer, server, terminal or other type of electronic device. Further, the RAS circuitry 40 may include one or more data stores 42 that correspond to one or more of volatile or non-volatile memory such as random access memory, flash memory, magnetic memory, optical memory, solid-state memory or other devices that are operative to store computer executable instructions and/or data. The computer executable instructions may include instructions in any of a plurality of programming languages and formats, including without limitation, routines, subroutines, programs, threads of execution, scripts, objects, methodologies and functions which carry out the actions and operations described herein. The structures of the circuitry of the RAS may include, correspond to and utilize the principles that are described in the textbook entitled Microprocessor Architecture, Programming, and Applications With The 8085 by Ramesh S. Gaonker (Prentice Hall, 2002), which is incorporated herein by reference in its entirety. Of course it should be understood that these circuitry structures are exemplary and in other embodiments, other circuitry structures for storing, processing, resolving and outputting signals, record data and information may be used.

It should also be understood that the circuitry utilized in the PRS, PMS, PGRS and BGRS may be similar to that described in connection with the RAS. Of course as previously discussed, these systems which make up the exemplary embodiment may be operated in a plurality of different devices and environments to carry out the operations and methods described herein, and that the systems are not limited to the particular architecture as described in connection with the operation of the exemplary embodiment.

In the operation of the exemplary embodiment at least one of the data stores associated with the PRS includes data corresponding to real estate parcels and the structures and other improvements that are located thereon including sketch data and other types of information. In some exemplary arrangements the PRS may include a computer assisted mass appraisal type system that is used for the evaluation and taxation of real estate by political subdivisions such as counties. Of course this particular type of PRS is exemplary and in other embodiments other types of systems may be the source of the initial data records that are evaluated through operation of the RAS.

In the exemplary arrangement the RAS is initially operative to import or otherwise access from the PRS the PRS records which are subject to being evaluated. This is represented by a step 46. In the exemplary arrangement the PRS may be operated responsive to instructions provided by a user of the PRS, or in operative connection with the RAS or other remote system, to identify the data bearing records of interest for purposes of evaluation. The identified records may be sent through the at least one network 44 to the RAS. Alternatively, some or all the data bearing records of the PRS may be transmitted to the RAS for purposes of performing the required analysis. In still other arrangements the appropriate records may be stored on one or more articles of computer readable media that is sent to the operator of the RAS. The data records to be analyzed correspond to the parcels or other geographic areas that are to be evaluated for purposes of determining the accuracy of the information included in the records regarding the structures located on the parcels.

After receiving the PRS data records the exemplary RAS operates in accordance with its executable instructions to extract the desired data for performing the analysis of the data from the PRS records. This is represented by step 48. In the exemplary arrangement the circuitry of the RAS is operative to analyze the PRS records to find and extract selected items of data. In alternative arrangements the PRS may be operated to extract the desired subset of the PRS record data and deliver the subset of the data to the RAS. In the exemplary arrangement the extracted data includes a parcel number which is a unique identifier assigned to a given parcel of real estate. Other data that is extracted from the PRS records in the exemplary arrangement includes a card number. The card number corresponds to a building structure on a parcel and a card may be maintained regarding each building structure which is subject to analysis. However in other arrangements multiple structures may be associated with a single card. Generally in exemplary arrangements the card number is associated with a unique parcel number that is associated with the card, and the card includes information about the structure or structures subject to review for taxation by a political subdivision or that otherwise need to be separately identified.

Data that is extracted from PRS records in the exemplary arrangement includes sketch data. The exemplary sketch data corresponds to configurations and dimensions of external walls of buildings or other structures. Such sketch data includes dimensions and data that corresponds to the relative directions of the external walls of a given building or other structure. Sketch data may also include dimensions of internal walls that separate different areas within a common structure that are differentiated by the type of use or structural features of the particular area, because such differences in type or use are utilized for purposes of tax valuation or other types of analysis. In some arrangements the sketch data is comprised of vector data. The vector data comprises a representation of particular distances or coordinates which make up the particular structure. For example in some exemplary embodiments, the vectors are operative to describe a series of directions and distances which define a closed area of the particular structure which is associated with the particular use or tax designation. In most cases the closed area is defined by the vector data that corresponds to one or more external walls of the structure. However, in other arrangements the vector data may describe walls that bound an area internal to the structure that is treated differently for purposes of property tax or other designation purpose. Further in some exemplary arrangements the data includes a descriptor which corresponds to a destination assigned to a group of vectors. Thus the vector data can be used to determine the boundaries of the particular closed area of a structure. Such vector data may be presented in PRS records in different record storage notations. Such notations may commonly include comma separated text files, tab separated text files, fixed width text files, access database files or other file types. The exemplary RAS is operative to decode the vector data from the particular notation in which it is stored so that the sketch data that includes the vectors can be presented and analyzed through operation of the RAS circuitry.

In other exemplary arrangements the PRS records include alternative forms of sketch data which includes representations of structures as point data. Such exemplary arrangements the point data includes data corresponding to a structure description that provides particular dimensions. The particular dimensions define a regular shape such as a generally rectangular structure, the layout of which is provided as dimension data associated with the single point. Generally such point data will include width and length data associated with the particular structure. In other exemplary arrangements point data may be associated in the PRS records with data corresponding to a square footage area for the structure. In such arrangements the point data may be designated to identify the center of a rectangular structure having that particular area. In other exemplary arrangements point data may be accompanied in the PRS data by the dimensions of sidewalls of different lengths that bound the rectangular structure. Such point data may be stored in different notations and formats in different PRS records, and the exemplary RAS is operative in accordance with its circuit executable instructions to decode such point data.

In exemplary arrangements the extracted data further includes data which is correlatable with legends and identifiers that correspond to a type attribute associated with the particular area that is defined by a set of vectors. Such exemplary legends and identifiers include structure type data which is indicative of the particular type of area or structure that corresponds to the particular vector set. For example in some arrangements the data may be correlated to a legend or identifier that may indicate that a particular area defined by a set of vectors is an open porch or deck. Other data may be correlated to legends or identifiers that indicate that an area is a garage or barn. Other data may be correlated to legends or identifiers that identify other aspects of the area which may be pertinent to the analysis carried out through operation of the RAS and/or the taxation of the particular area that is defined by the vectors.

Of course it should be understood that this described collection of extracted PRS data is exemplary and other embodiments additional, different or other extracted data may be used.

Through the extraction and analysis of the selected PRS data in step 48, the RAS is operative to place the data in a defined format that is utilized in the operation of the RAS. In exemplary arrangements the defined format includes an XML format that provides PRS extract records that are utilized through operation of the RAS to carry out the functions hereinafter described. Of course it should be understood that in other arrangements other types of record formats may be utilized for purposes of storing, correlating and organizing the data from the PRS records for purposes of carrying out the functions described herein.

After the extraction of the data from the PRS records, the exemplary RAS operates as represented in a step 50 to select an initial data record for analysis. In exemplary arrangements the extracted records may be analyzed through operation of the RAS circuitry in a particular order such as by parcel or card number beginning with the lowest or highest number for example. Alternatively in other arrangements other sequences for analysis of the extracted records may be used.

The exemplary RAS operates as represented in a step 52 to review the extracted PRS record data for all the types of data necessary to carry out the analysis. In this activity the RAS operates to be sure that the particular extracted record includes each of the types of data elements that will be required to carry out the later analysis. If in a step 54 it is determined that the data in the record is incomplete because it does not include all of the types of data required for the analysis, information about the incomplete record is stored for later handling either individually via a manual process carried out through a user terminal or automatically through a separate RAS process in accordance with circuit executable instructions. This is represented by step 56.

If the particular extract record is determined to be complete, the exemplary RAS circuitry then operates to check the PRS extract record to determine if it contains any data elements that are invalid. This step is represented by step 58. Such invalid data may include data represented in characters or other formats that are unsuitable for processing by the RAS circuitry. In some exemplary arrangements the check for invalid data may also include reviewing certain data elements to see if they are within certain ranges or below or above certain thresholds. For example in some exemplary arrangements the analysis may evaluate whether the area indicated for a structure is above a set threshold which could not realistically correspond to an actual building structure. Alternatively or in addition, exemplary arrangements may analyze dimensions of external walls of structures to identify situations where a wall has a length which is below a set threshold which corresponds to an unrealistic dimension of an external wall of a building structure. Further in some exemplary arrangements the analysis may be tied to other related data such as the structure type data for purposes of the set thresholds that are utilized in connection with the analysis. Numerous other types of analysis may be carried out with regard to structure dimensions, areas or other properties for purposes of identifying situations where there is invalid data. The analysis of the data for invalid data in step 58 is then reviewed by the RAS in a step 60 to determine whether there is any invalid data in the record. If so the record that includes the invalid data is stored and cataloged by the RAS as including invalid data for later correction. This is represented in step 62

If the record is determined to be complete and not include invalid data, the RAS circuitry operates to store the valid PRS extract record as represented in a step 64. The exemplary RAS circuitry then operates to determine if there are more extract records that have not yet been checked for completeness and invalid data as represented by step 66. If there are more PRS extract records to be processed as determined in step 68, the RAS operates to select the next PRS extract record to be processed. This is represented by a step 70.

In the exemplary arrangement the RAS circuitry operates to check all the PRS extract records of the selected set or group for invalid data and incomplete data until it is determined that there are no more records to be checked in step 68. In some exemplary arrangements the operator of the RAS circuitry may be interested only in records that are associated with particular tax years or other time periods or other selection criteria. This may be done for example in situations where the RAS is operated to make comparisons to PRS records from one or more particular years. In such cases the extracted data will include information about particular tax years from the PRS records. In situations where the records are to be filtered by tax years the RAS operates at a step 72 to determine if there are instructions to filter the extracts by a tax year. If there are such instructions the RAS operates to carry out the filtering operation as represented in a step 74. If there is no required filtering operation the RAS proceeds with the further execution of its instructions.

Also in some exemplary arrangements the PRS extract data may include fields which indicate certain changes that have been made to particular structures or conditions. This may include for example information in a legend or an identifier which indicates that a change related to the structure or its use have been made. In other arrangements other information may indicate particular changes of interest for purposes of processing the data. This data is extracted from the PRS records and included in the XML records produced by the RAS.

In some exemplary arrangements changes of interest may be identified by comparing different data sets related to records that have been gathered at different times. For example in some arrangements PRS records corresponding to different annual periods or from other time periods can be compared. Such comparison may identify PRS records in the data set that is later in time, that have been subject to certain changes from the corresponding information in the data set from the earlier time. The RAS may be operative to identify those records that have been subject to changes of a type that may be of interest for purposes of the analysis. Further in other exemplary arrangements different numbers of data sets from different times and with different data may be analyzed through operation of the RAS circuitry to determine PRS records have been subject to selected types of changes and which will be subject to further analysis.

If the RAS circuitry is programmed and/or instructed via user inputs to analyze only extracted PRS records which have been subject to particular changes, the RAS operates as represented in a step 76 to filter the PRS extract records to identify records which exhibit particular change conditions. If the RAS is programmed to operate to filter such extract records by change conditions, the RAS operates as represented in a step 78 to filter the PRS extract records so that only records that meet the criteria are subject to analysis. Of course it should be understood that numerous different types of filtering steps may be carried out on extracted data to analyze particular records of interest, and that filtering by tax year or by particular changes in the records are merely examples of such actions that may be carried out through operation of the exemplary RAS circuitry.

The exemplary RAS then operates in accordance with its programmed instructions to analyze the extracted data records and determine the parcel identifiers or other geographic area identifiers associated with the extracted data to be analyzed. This may be done for example by the RAS collecting particular blocks or ranges associated with contiguous real estate parcels that are located in a particular geographic area. Alternatively, the RAS may operate to determine all of the particular parcel number data associated with the PRS extract records that are subject to analysis. Alternatively, other identifying information associated with the geographic areas of real estate may be used. This is represented by a step 80.

After determining the parcel identifiers from the PRS extract records, the exemplary RAS circuitry is operative to access or acquire GRS data from at least one data store. In the exemplary arrangement the RAS circuitry is operative to access the GIS data included in the PGRS system 32 through communication in the at least one network 44. In the exemplary arrangements the PGRS system is operative to provide geographic record information that includes map data which corresponds to visual overhead images the selected parcel identifiers. In exemplary arrangements the PGRS data includes data corresponding to graphic representations of boundaries that corresponds to the respective parcels or other geographic areas of real estate that are subject to analysis by the RAS circuitry. In some exemplary arrangements, the PGRS may be a system that operates software provided by the Environmental Systems Research Institute for purposes of providing records including georeferenced spatial data. Of course this type of system is exemplary, and in other embodiments other types of systems and record data may be used. Further it should be understood that in alternative embodiments the georeferenced spatial data may be provided from other sources such as one or more data stores of the PRS system circuitry or from the RAS circuitry.

Figure 20:
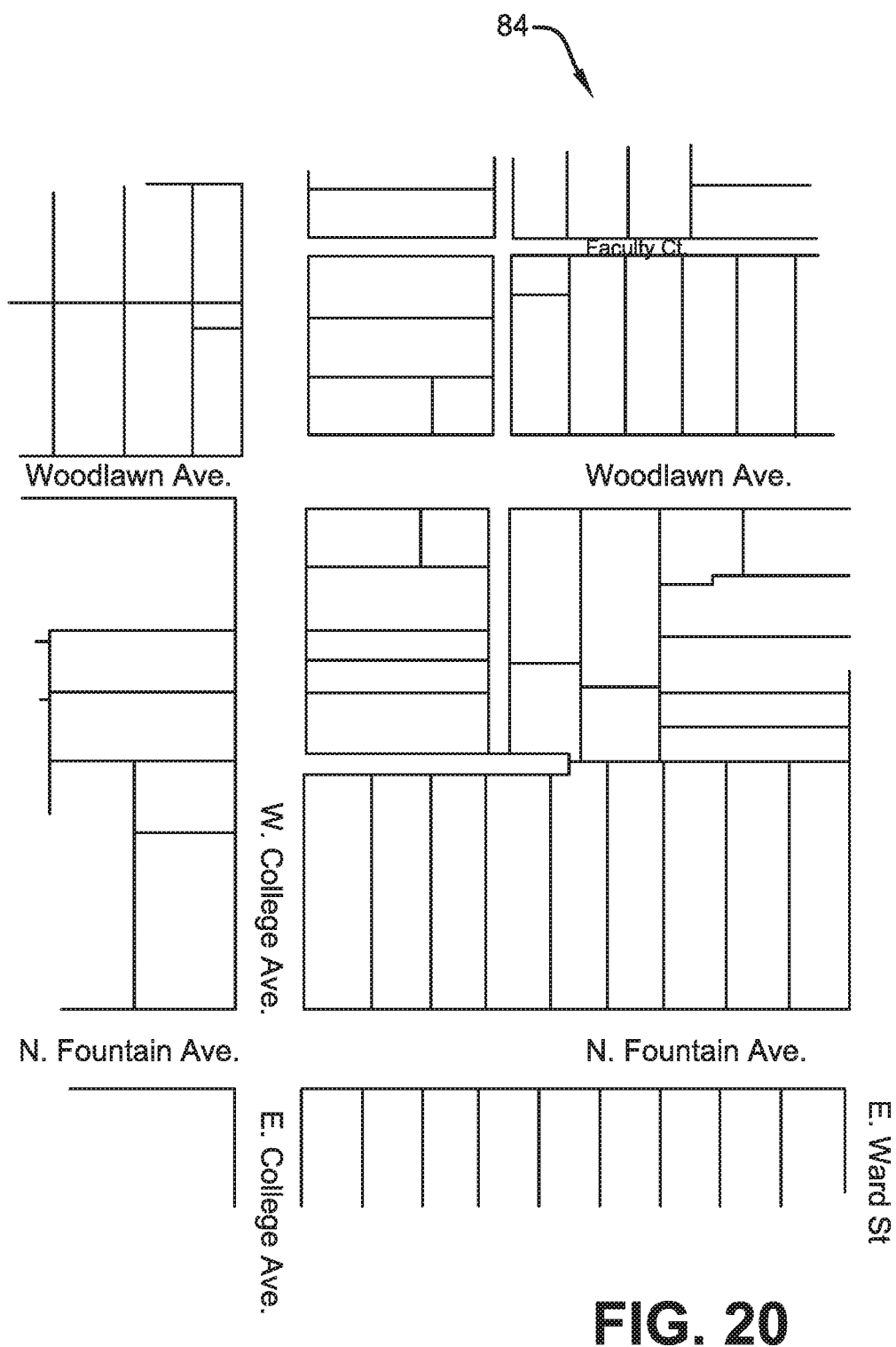
FIG. 20 is a schematic representation of several records provided by a parcel georeferenced record system.

In the exemplary arrangement the RAS circuitry is operative to communicate with PGRS 30 and provide the parcel identifying information for the parcels of interest for analysis. The PGRS 30 operates to enable the RAS to import or otherwise access data corresponding to a PGRS parcel layer. This is represented by a step 82. In the exemplary arrangement the PGRS parcel layer corresponds to record data that can be rendered visually through visual display outputs as a parcel map such as map 84 that is shown in FIG. 20. In the exemplary arrangement the parcel layer data includes a plurality of records which produce a representation of the parcels on which the structures of interest for analysis are located.

After importing or otherwise accessing the parcel layer the exemplary RAS circuitry is operative as represented in a step 86, to conform the units of measure in the parcel layer that is imported from the PGRS system to the units that are utilized in the PRS extracts. This is done to help assure that the parcel and structure data are in the same corresponding common scale. Further, in some exemplary arrangements the PGRS system may include the GRS data records corresponding to overhead images of building structures included on the respective parcels. In such arrangements the RAS circuitry may operate to obtain the GRS data records corresponding to the overhead images of building structures and the parcel data from a single system rather than from the data stores of the separate PGRS and BGRS systems as described in this exemplary embodiment.

In the exemplary arrangement the RAS is then operative to begin processing the sketch data that includes vector data and/or point data extracted from the PRS records. In exemplary arrangements the vector data corresponds to the configuration and dimensions of external walls and/or area components of structures that are subject to analysis by the system. The system operates to analyze this vector data so that the size and configuration of the structures can be appropriately determined and analyzed in the manner later discussed.

As represented in a step 88 the exemplary RAS circuitry selects an initial record of PRS extracted data from the set of those records that are subject to analysis, and extracts the sketch vector data as represented by a step 90. In a step 92 the RAS analyzes the extracted vector data for the presence of data that is unsupported by the system, as well as data that is inconsistent with certain thresholds or other set limits. In a step 94 a determination is made as to whether invalid or unsupported data has been found in the extracted vector data. This may be done through comparisons with different thresholds or other criteria which are settable in accordance with the configuration of the RAS circuitry which carries out an analysis relative to the threshold and other criteria in a manner like that previously discussed. If invalid or unsupported data is determined to be included the information regarding the particular sketch vector data and the corresponding parcel and/or card data is stored by the RAS as represented in the step 96. Such data is stored and tagged for later analysis and correction.

Similarly in a step 98 a determination is made whether the sketch vector data includes data that is inconsistent. For example, the exemplary RAS circuitry may include stored criteria and executable instructions that determine if the sketch data corresponds to certain excessively short or excessively long dimensions or areas that cannot reasonably correspond to a building area structure. Alternatively or in addition, vector data may be recognized as inconsistent if it does not correspond to or cannot be utilized through buffering or other programmed normalization circuit executable instructions to generate data corresponding to a closed area polygon. Various different tests may be carried out in exemplary arrangements of the RAS circuitry for purposes of determining that vector data or other sketch data is inconsistent. If the sketch vector data is found to be inconsistent in step 98, the data is then stored in a step 100 along with other identifying data such as type data, parcel and/or card data so that the data may be later reviewed and corrected. Of course it should be understood that sketch vector data may be analyzed for other properties and features as well in alternative arrangements. In exemplary arrangements a similar analysis may be conducted by the RAS circuitry for sketch data that includes point data.

In the exemplary arrangement the RAS circuitry then operates to determine if all of the data from the PRS extract records have been analyzed for sketch data including vector data and point data. This is represented step 102. If a determination is made at step 104 that more records need to be analyzed, the RAS operates to select the next PRS extract record from which vector data and/or point data is to be examined as represented in a step 106. The sketch data including vector data and/or point data is analyzed until it is determined at step 104 that the vector analysis is complete.

The exemplary RAS circuitry then operates in accordance with its programmed instructions to associate each vector set or point data that has been determined to be valid, with the parcel and card data that was extracted from the PRS records. This is represented by a step 108. The RAS then operates to determine the commands associated with the particular vectors and/or points. This includes the directional and distance information associated with each of the vector instructions. This may also include the dimensions associated with point data. In the exemplary arrangement, the RAS circuitry is also operative to determine from the PRS extract data, the data corresponding structure type data, including for example, labels and/or identifiers which describe the particular type or nature of the area of the structure described by the vector set and point data. This is represented by step 110.

The RAS circuitry is then operative to evaluate the command and/or format data associated with the vector data to determine if it corresponds to a closed polygon shape. In some exemplary arrangements the RAS circuitry is programmed to cause the sketch data to be arranged and manipulated so that it necessarily results in the delineation of a closed polygon configuration. In some arrangements the command and/or format data may also be evaluated to determine if it is inconsistent or prescribes an area which does not satisfy certain criteria. For example, an evaluation may be conducted to determine if the command data for vectors create lines that extend in crossing relation or otherwise extend in directions that are inconsistent with defining the perimeter of a closed area. This is represented by step 112.

Further in the exemplary arrangement in the step 112, the data corresponding to the structure type data such as the labels/identifiers which correspond to the type or nature attribute of the area of the structure defined by the vectors or point data, is checked to see if it is valid for purposes of the particular system. In the exemplary arrangement the RAS circuitry is operative check to determine and confirm that the data corresponding to the labels/identifiers correspond to the types of data that are used consistently throughout the PRS system. Additional checks for data consistency associated with vector data may be done in other arrangements. In other exemplary arrangements the RAS circuitry may include data corresponding to conversion factors or other conversion data that can be utilized for purposes of changing the particular structure type data included in the PRS records to a different type of data that is utilized in, or consistent with structure type data that can be utilized by the RAS circuitry. In some arrangements this conversion data may correspond to circuit executable instructions that are operative to change the name associated with certain data when encountered in the PRS records so as to conform all data to a desired naming convention. In other arrangements the conversion data may be operative to change certain structure type data from one unit of measure to another, for example converting data in yards or meters into feet. Of course these approaches are exemplary and other arrangements other approaches may be used.

In a step 114 the exemplary RAS is operative to review the evaluation carried out in step 112 for any invalid data. If the data is found to be invalid the invalid data record along with the card and parcel data is stored as represented in step 116. The invalid data is stored for later review and correction either via manual or automated processes.

As represented in step 118 the exemplary RAS circuitry is then operative to determine if the extracted sketch data corresponds to point or line data. At step 120 information resolved through the determination is reviewed. If the data corresponds to point data the exemplary RAS circuitry is operative to convert the point data and dimensional information into data corresponding to polygons in a step 122. If in step 120 the data is determined to correspond to line data, the RAS circuitry is operative to determine the lines that correspond to the data in a step 124.

The polygon information that corresponds to the line data or the point data is resolved as represented in a step 126. The exemplary RAS circuitry is then operative to determine the area associated with the determined polygon. This is represented by step 128.

The RAS is then operative to evaluate the calculated area of the particular polygon. This is represented by step 130. In exemplary arrangements the analysis may include determining if the calculated area is zero or an amount that is excessively small and cannot reasonably correspond to an area that is subject to proper analysis. Alternatively or in addition the analysis may include evaluating the determined area to see if it is so excessively large or includes dimensions that are beyond certain thresholds so as to identify a situation which corresponds to erroneous data. Such evaluations may include evaluations of the type that have been previously discussed or alternatively may include particular evaluations of thresholds and other area related information that are considered appropriate for the type of sketch data or the structure type data associated with the particular building structure. Various types of evaluations may be conducted on the area data for the purpose of determining if the area data is invalid. If the analysis carried out in step 130 identifies probable invalid data, a determination is made at a step 132 to store the invalid data record along with the other identifying data such as parcel and card information for later analysis and correction. The storage of such information is represented in a step 134.

In some exemplary arrangements extracted sketch data in PRS record data may correspond to structures for which there is more than one set of vector data. Such vector data may be associated with multiple areas that are of different types or areas that are used for different purposes. In exemplary arrangements the RAS circuitry is operative to evaluate all the vector data associated with a particular card number, and which identifies the areas which make up or are associated with a single structure. As can be appreciated, these different vectors which are associated with a single structure produce multiple adjacent closed areas which can be represented as polygons. In exemplary arrangements the polygons may have different associated structure type data such as legends or identifiers that describe the nature or type of area represented within the particular polygon.

Figure 21:
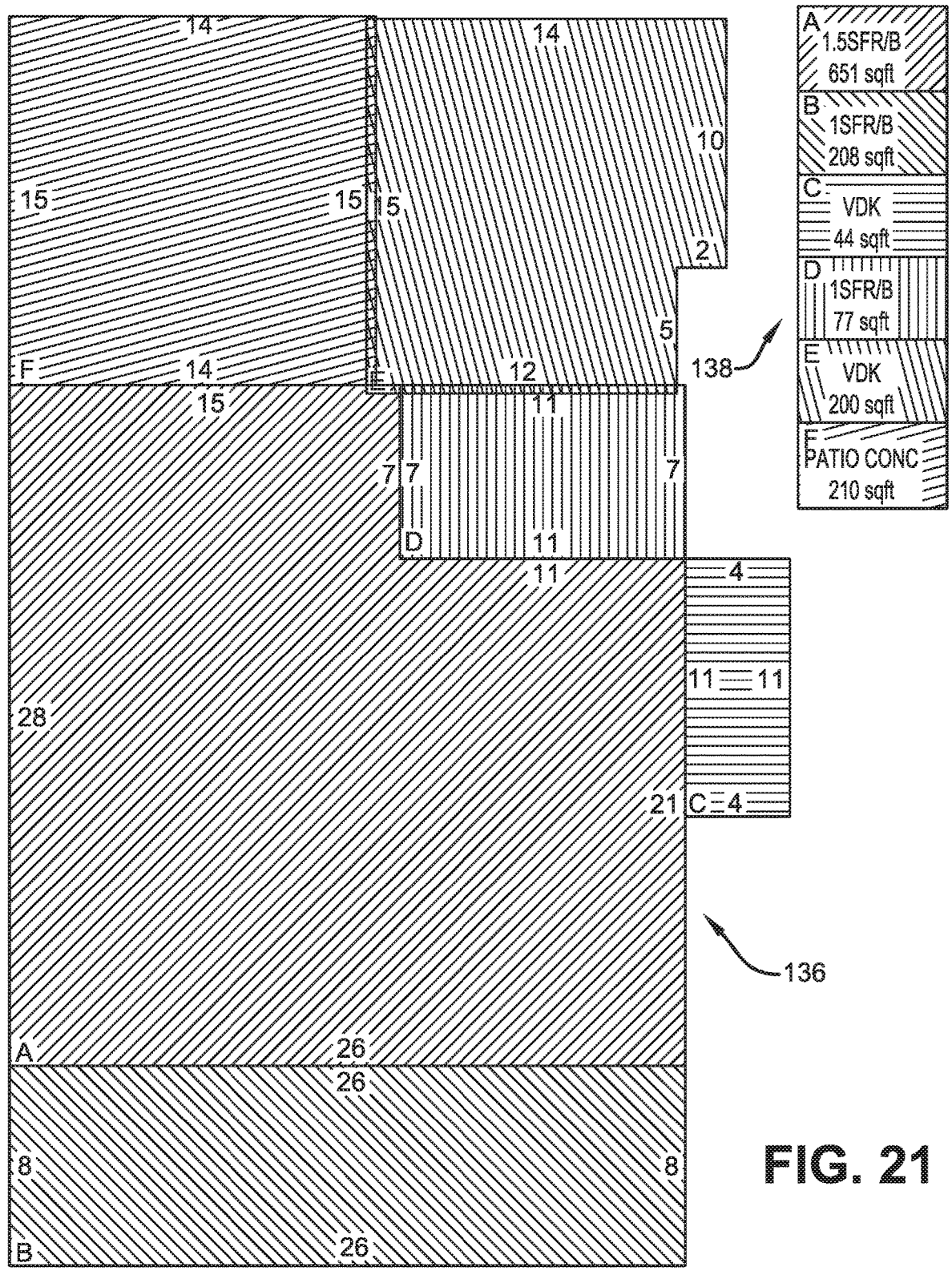
FIG. 21 is a visual representation of a colorized record corresponding to a structure.

In an exemplary arrangement the RAS circuitry is operative to determine all the different vectors associated with card data so as to produce all the polygons for areas which make up a given structure. Further in the exemplary arrangement the RAS circuitry is operative to determine the structure type data such as legends/identifiers that indicate the nature or type of area associated with each of the polygons. An example of a rendering 136 of sketch vector data corresponding to a structure comprised of a plurality of polygons derived from different sets of vector data is represented in FIG. 21. In this exemplary arrangement the sketch data corresponding to the vectors can be visually rendered through a display as lines with dimensional values shown adjacent to each respective line in feet or other units. Each polygon corresponding to a set of vector data is assigned a respective identifier, which in the exemplary arrangement is a letter. The letter is shown in the visual display output represented in FIG. 21 in the lower left-hand corner of each respective polygon. In the exemplary rendering 136 of the building structure represented in FIG. 21, legend data 138 associated with each identifier which corresponds to each polygon which makes up the structure is also rendered as part of the visual display output. The legend data 138 is based on the extracted data and is presented graphically in a manner that includes characters which identify the associated structure type data which is indicative of the particular type or nature of the space and also includes the area of the respective polygon in this exemplary arrangement. Of course it should be understood that this rendering approach is exemplary and in other embodiments other approaches may be used. Alternatively in some arrangements a visual rendering of this type directly from the extracted data may not be produced by the RAS circuitry.

In the exemplary RAS circuitry the collected sketch data such as vector data for each structure is analyzed and adjusted for purposes of producing data that is suitable for comparison and analysis with other georeferenced record system spatial data. In order to achieve the correlation of the extracted PRS vector data to the data corresponding to the accessed Geographic Information System (GIS) data, the polygons which make up the rendering of the building are each rasterized and assigned different colors. The colors assigned to each polygon are different from each other and also different from the background color which is white in the example arrangement. This is represented by step 140. The colorized polygons in different colors on a white background are also represented by the rendering 136 in FIGS. 21 and 22.

Figure 22:
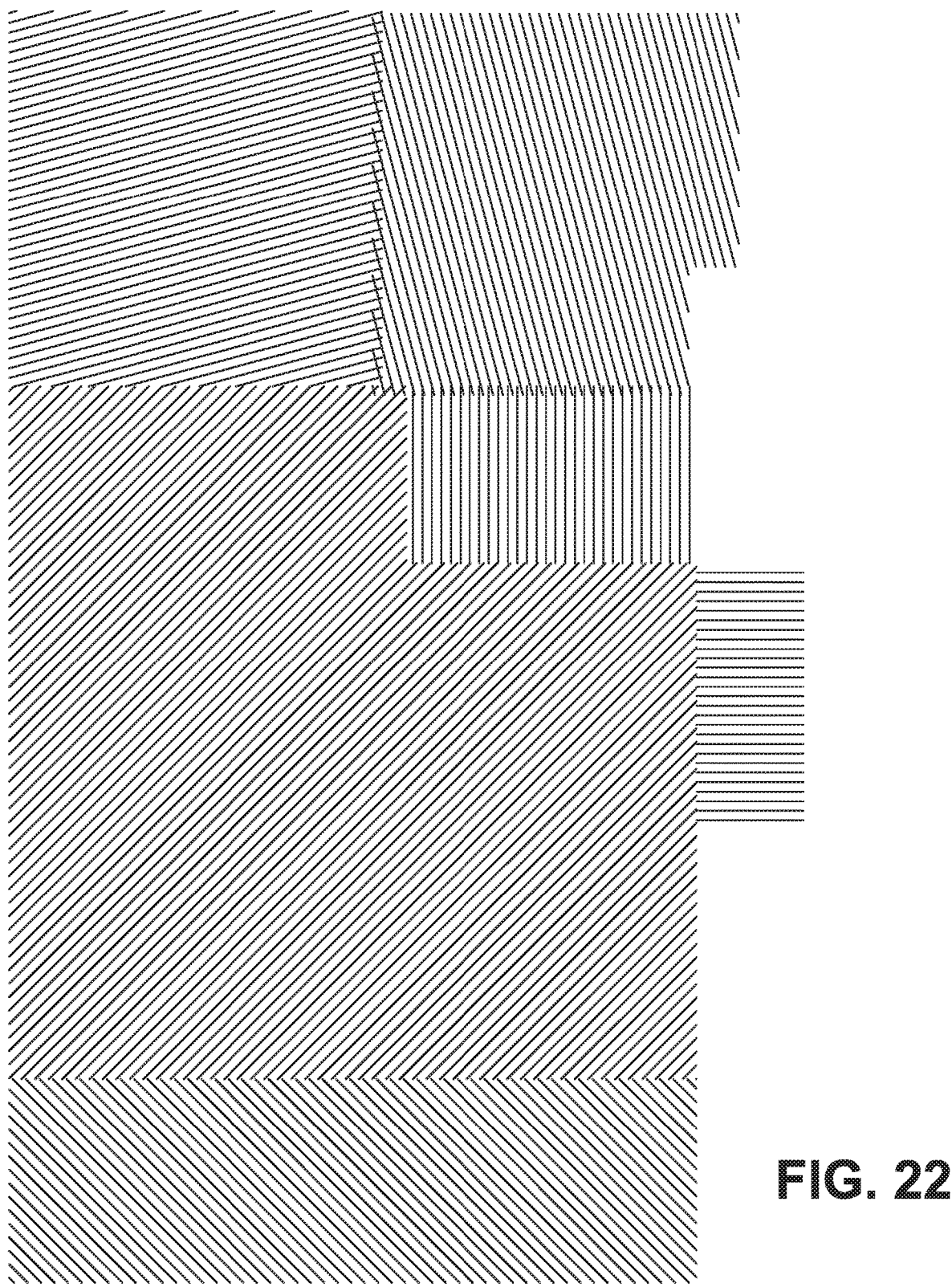
FIG. 22 is a visual representation of a colorized record corresponding to the structure shown in FIG. 21 with the lines dissolved.

The exemplary RAS circuitry operates to produce the multicolor representation of the polygons that make up the areas of the building structure that correspond to the areas defined by the sketch data such as vector and/or point data, without the lines that bound the polygons and without the legend information. The resolved representation of the sketch data in a visual rendering has different colors which correspond to each respective polygon. This is represented by step 142. The variation of the rendering shown in FIG. 21 that does not include the lines, dimensions and legends, and that is produced in accordance with step 142 is represented in FIG. 22. The RAS circuitry is then operative to store the data corresponding to the modified colorized image as represented by step 144.

As can be appreciated, because each polygon that is derived from the original PRS extract sketch data has a unique color in the data corresponding to the visual rendering, areas of overlap between the polygons will have a color that is different from any of the assigned colors. This is due to the different color that is produced in the area of the overlap from the combination of the different values associated with color pixels in the overlap areas. As represented by step 146 the exemplary RAS circuitry is operative to analyze the data that corresponds to the modified image data for areas having pixels that correspond to a color that does not correspond to any of the assigned colors and which is indicative of the polygons having one or more areas of overlap. The number of pixels which have a color that is different than any of the colors assigned to the polygons and background is evaluated. In the exemplary arrangement the number of pixels correspond to the magnitude of the areas in which the polygons overlap. The magnitude of this value is determined as represented by step 148. The number of pixels which correspond to pixel values in ranges having unassigned colors and which represent areas of overlapping polygons is then analyzed through operation of the exemplary RAS circuitry as represented by step 150. The number of pixels in unassigned colors is compared in a step 152 to a threshold or a range which indicates that the amount of overlap of the polygons is above acceptable threshold. If the overlap is above the threshold the information regarding the particular structure including parcel and card data is stored as represented by step 152 for later analysis and correction.

Figure 23:
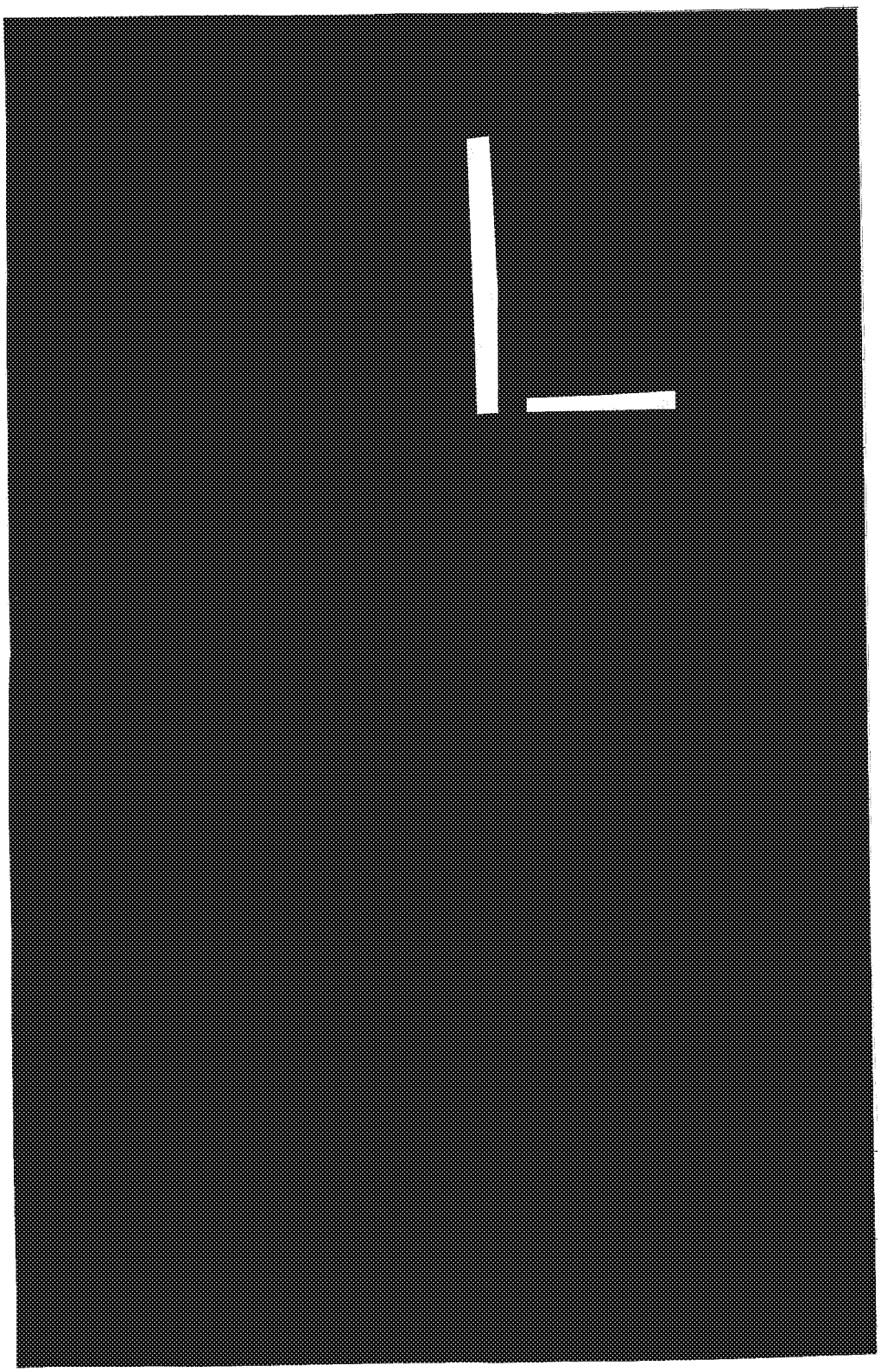
FIG. 23 is a visual representation of a high contrast record corresponding to FIG. 22 showing areas of overlap

Further in some exemplary arrangements the image data may be further analyzed by creating a high contrast image as represented by step 154. In the exemplary arrangement the high contrast image is created by replacing each of the assigned colors in the image data including the background color with black. Such replacement of the assigned colors with black is operative to produce an image in which the only areas with colors other than black are areas of overlap. Such an image is represented in FIG. 23 for the areas of parcel overlap shown in FIG. 22. Of course it should be understood that in an actual image that is rendered from the data, the colorization will correspond to the colorization resulting from the overlap.

In the exemplary arrangement the generated high contrast image may be analyzed through operation of the RAS circuitry or purposes of determining whether it corresponds to an acceptable image. In exemplary arrangements this is accomplished through analysis of the size of the portable network graphics (PNG) file that is produced through the high contrast image. The analysis is represented by step 156. If it is determined that the overlap data is not acceptable in step 156, the data regarding the parcel is stored for later correction along with the image data in a step 158. Alternatively in other arrangements the analysis of a high contrast image may only be conducted in cases where the number of pixels that do not correspond to an original assigned color is determined to be above a threshold. Of course these approaches are exemplary and other embodiments other approaches may be used. For example, in other arrangements different types of analyses may be carried out for purposes of determining areas of overlap or other inconsistencies so they can be evaluated. Such approaches may include analysis of line or area data from the PRS records or other data sources, including without limitation, available GIS data. Such analysis may be used to identify the magnitude of overlap or other inconsistencies so that situations in which the differences are sufficiently small and below one or more set thresholds can be disregarded, and other situations where the magnitude is above one or more set thresholds and which require further analysis can be identified.

In the exemplary arrangement the RAS circuitry is operative to generate line data which surrounds each of the colored polygons. This is done based on the rasterized color data such as is represented in FIG. 22. In some exemplary arrangements the polygons are simplified through operation of the RAS circuitry so they correspond to polygons that are more uniformly formed. This application in some exemplary arrangements includes eliminating mismatched lines which have a difference less than a set value to eliminate overlaps and edges that are not straight. In some exemplary arrangements the lines are buffered by approximately 0.2 feet to eliminate overlaps and irregular line segments. The RAS circuitry may operate in other exemplary arrangements to modify the shape files and outline data so as to better fit in correlated relation with GRS data. This may include for example buffering dimensions so that the area and shapes correspond to the data corresponding to overhead views of structures which include for certain types of buildings, overhangs which define the building outlines in the GRS data. Of course it should be understood that these steps are exemplary and in other arrangements other approaches may be used. The RAS circuitry is then operative to carry out an outline step in which the data is modified to include outlines of the simplified boundaries each of the polygons. The outlining step is represented by step 160. The RAS circuitry is also operative to modify the data to apply dimensions to the lines in the outlines as represented by step 162. The legends and identifiers corresponding to the colors assigned to the polygons are also determined in the data as represented by step 164. This can be done to produce data records that can be visually rendered in a manner similar to that shown in FIG. 21.

The RAS circuitry is then operative in the exemplary arrangement to reference the polygon data to parcel information in the GRS data of the parcel layer previously obtained from the PGRS. The reference of the building outline data to the parcel identifier is based on the parcel data in the PRS abstract record for the particular structure. This action is represented by step 166. A determination is then made concerning whether the extracted parcel data has corresponding parcel data in the PGRS parcel layer. The determination as to whether corresponding parcel data is present is made as represented in a step 168. If no corresponding parcel data is found in the parcel layer, the information regarding the PRS extracted parcel data is stored along with the other data as represented in a step 170. The data is stored for later review and correction.

In the exemplary arrangement the constructed polygon data based on the colorized polygons is analyzed in a step 172. In the exemplary step 172 the parcel data is analyzed for suitability, reprocessing and analysis as Geographic Information System (GIS) polygon data. The analysis carried out by the RAS circuitry in step 172 may include for example reviewing the polygon data for gaps or other features that render the data unsuitable for purposes of the later analysis. In exemplary arrangements the analysis carried out in step 172 may include steps to determine if the polygons conform to the OpenGIS Simple Features Specification for SQL. Such analysis may include in exemplary arrangements assuring that the coordinates of polygons are valid and that the polygons do not self intersect. Other tests may include determining frames of the shell holes do not cross and that no series of touching holes result in making the interior of the polygon disconnected. Of course in other embodiments other analysis or a different analysis may be carried out. If the polygon data has been found to be unacceptable in the step 172, the data is stored along with other information in step 174 for further review and correction.

The exemplary RAS circuitry then operates to store the valid polygons data associated with building outlines in correlated relation with the GRS parcel layer data received from the PGRS. This is represented by a step 176. The GIS compliant polygons are associated with respective parcels through the respective parcel and/or card data that is derived from the PRS extracted data. This is represented by step 178.

In some exemplary arrangements certain of the data that may correspond to the structure type attribute data used to produce the legends/identifiers associated with the polygons, may correspond to area types or structures types which the system has been programmed to identify as being types that should not be further considered for purposes of the analysis. This is represented by step 180. For example in some arrangements the polygon may correspond to a structure that does not impact the external wall perimeter. This may include for example, a polygon that corresponds to an elevator. The exemplary RAS circuitry may be operative to analyze the structure type data that may correspond to legends and/or identifiers associated with the polygons as represented in a step 184, to determine if such polygons are included in programmed data that corresponds to an "ignore list" or other category that requires special handling. The determination that polygons included in a given structure outline include these features is represented by step 182. If such features are determined to be present in the data corresponding to the particular structure, the data is stored for later analysis and special handling as represented by step 184. Alternatively in other arrangements the RAS may operate to not include certain polygons that are to be ignored in the assimilation of the polygon data.

Figure 24:
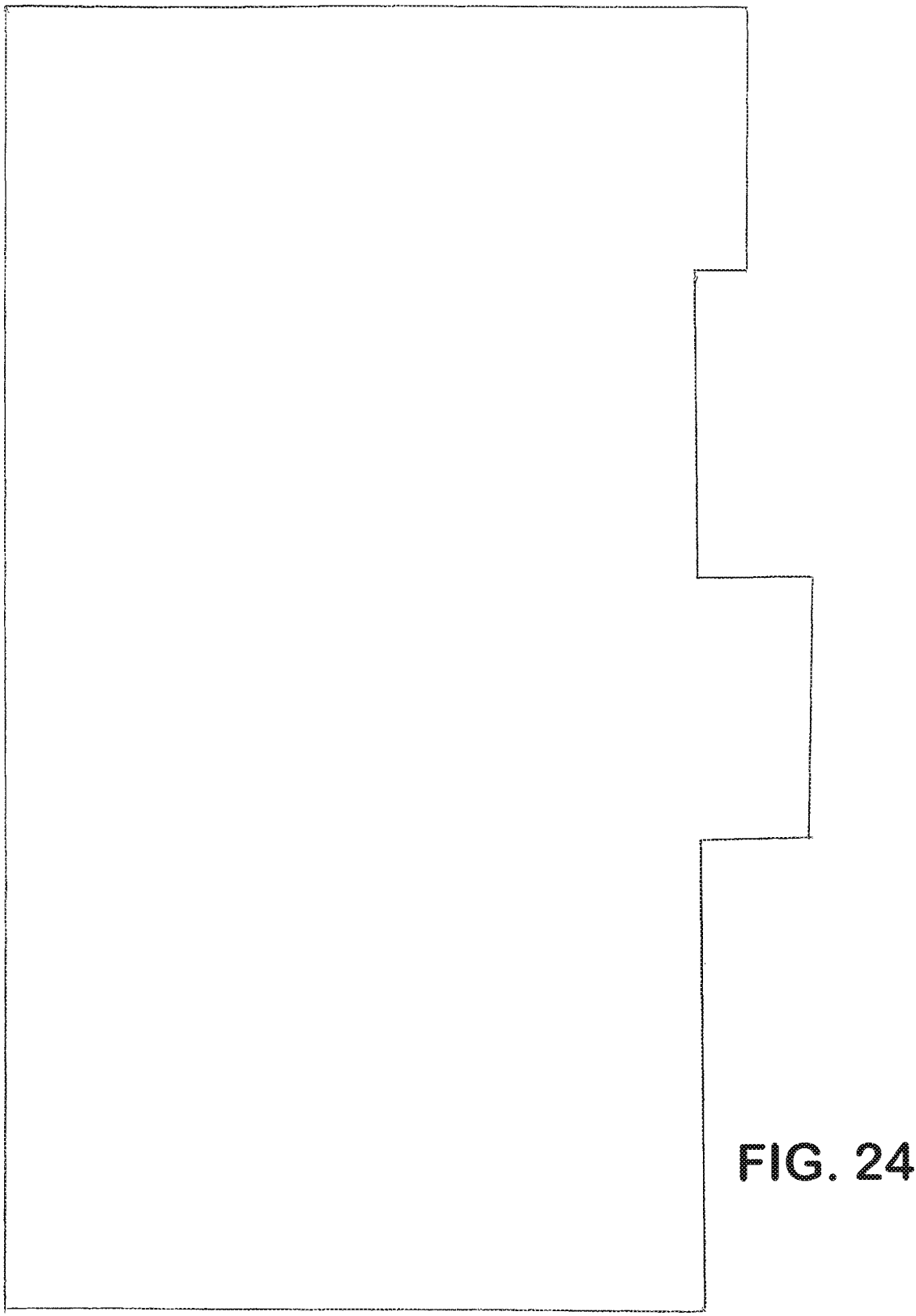
FIG. 24 is a visual representation of an outline record produced through operation of the exemplary record analysis system.

In the exemplary arrangement the RAS circuitry is then operative in accordance with its circuit executable instructions to dissolve all the internal sketch line components that represent the polygon outlines that corresponds to the extracted sketch vectors from the PRS system within the outermost bounding lines of the polygons. This process which is represented by a step 186, is operative to produce data corresponding to an outer outline of the building structure. An example of the outline data produced is shown in FIG. 24. This outline data generally corresponds to the outer boundaries of the building 136 that is rendered as shown in FIG. 21.

As will be appreciated, the outline data that is produced from the extracted vector data will generally produce a clean outline due to the simplification and other processes previously discussed that are carried out by the RAS circuitry. In some arrangements there may still be gaps, redundant points or lines, or other discontinuities that cause problems for later steps that are carried out as described herein. In the exemplary arrangement the RAS circuitry may execute certain steps to identify and minimize these issues which may still be remaining. For example as represented in a step 188 the outline is analyzed for any issues which correspond to discontinuities, jagged lines, or other identified flaws in the outline data. These issues once identified may be corrected by the RAS circuitry through operation of one or more buffering, alignment and/or simplification algorithms. For example in some exemplary arrangements redundant vertices are reduced via processing with a Douglas-Peucker algorithm to simplify line data. Of course in other embodiments other approaches and techniques for data modification may be used.

In the exemplary arrangement the adjusted line data may be further adjusted by further buffering to eliminate overlaps. Such buffering may be accomplished through the RAS circuitry operating in accordance with its circuit executable instructions. The further buffering of the line data is represented by step 190. In the exemplary arrangement the buffered and simplified data will be merged together or otherwise combined. This is represented by step 192 to produce a shape file. A shape file may be a single nontopological format for storing geometric location and attribute information of geographic features. The merged data is then further simplified as represented by step 194. The exemplary steps carried out by the RAS circuitry are operative to adjust the line data so as to remove unneeded data points, fill holes and remove bad points in the outline. The result of the exemplary steps is to produce data corresponding to a generally clean outline shape file that can be used for subsequent analysis.

The resolved shape file outline data is then stored in at least one data store through operation of the RAS circuitry as represented by step 196. In the exemplary arrangement the record including the shape file is stored with other data that is resolved from the PRS extract data. In the exemplary arrangement the data stored in the record with the shape file includes the parcel number, the card number, the structure type data such as label and/or identifier data, the area in square feet and a unique identifier associated with the particular shape file. Of course it should be understood that this approach is exemplary and other embodiments less, different or other types of information may be resolved and/or stored in the record conjunction with the particular shape file. In the exemplary arrangement the shape file is then analyzed as represented in a step 198. The analysis that is carried out on the shape file is used to determine if the shape corresponds to an overall building that is below a certain size limit, for example. Such buildings may not be subject to inclusion in the analysis due to their small size. The determination that the resolved building outline corresponds to a building below a set size limit is represented by step 200. If the building is below the size limit the data is stored for further analysis as represented by step 202.

In the exemplary arrangement the resolved shape file is further analyzed in connection with building structure type information. This is represented by step 204. Building structure type data may include type data that can be used to resolve the labels and identifier information. Alternatively or in addition, data resolved from the PRS file extracts may include additional information associated with the parcel number that is referred to as "hint data" which provides information regarding the particular parcel or structure. For example, in some arrangements the structure type data includes or can be used to resolve legend or identifier data. The hint data may indicate that the area of the structure is not of interest. This may be because it is not taxable because it is used for religious purposes or is considered personal property. Alternatively, such a structure may be exempt from the analysis because it is a government building or used for other purposes which cause it to be excluded from the analysis. In other exemplary arrangements image data may include data that is usable to indicate a particular parcel or geographic area with which a structure is associated. Such information may be helpful in situations where a particular building structure spans two or more adjacent parcels, but is considered associated with only one of those parcels in connection with the PRS data. If it is determined by the RAS circuitry as represented by a step 206 that the building type information and/or structure type data in connection with associated hint data corresponds to a building that is to be treated in some special manner, or if it is determined that there is an error or inconsistency in connection with the building data, the information regarding the particular building and the shape file is stored for later analysis and verification as represented by step 208. Of course it should be understood that these approaches are exemplary and other embodiments other approaches may be used.

The exemplary RAS circuitry is further operative to obtain structure outline GRS data from the BGRS. In exemplary arrangements the RAS circuitry is operative to process the data bearing records from the PGRS and the BGRS so as to generate data corresponding to GRS data that corresponds an overhead view of the parcel or other geographic area with the structure and parcel data superimposed and in a common scale. In exemplary arrangements the RAS circuitry is operative to adjust the scale factors associated with the different data elements so as to provide GRS data which is in corresponding superimposed relation such that data for buildings included in the BGRS data are indicated in the correct geographical locations and can be shown in visual displays accurately and in a common scale with the geographic data. Of course it should be understood that in alternative arrangements the data records described as being accessed by the RAS circuitry from the data stores associated with the BGRS and PGRS may be acquired from a data store associated with a single GRS system or from a larger plurality of data stores and different GRS systems. This is represented in a step 210. An analysis of the data is then conducted as represented by step 212 to determine for each structure outline incurred in the GRS data, a corresponding parcel number indicated in the GRS data. A determination is made in step 214 as to whether the outline is associated with a parcel number. As represented in step 216 in the event that an outline does not have a parcel number in the associated GRS data the RAS circuitry is operative to check the supplemental data included in the PRS extract record or other data to determine if there is an indication as to data which is usable to correlate with the GRS data and resolve the parcel number to which a particular structure is assigned. This may include for example reviewing other GRS data, "hint" data or other information which provides an indication of the parcel number with which the structure is associated. If a resolution of the parcel number is made from the GRS data and/or supplemental data the process continues as represented by step 218. However if the supplemental data does not resolve the parcel number the exemplary RAS circuitry is operative to carry out circuit executable instructions which comprise one or more routines as represented by step 220 which make an assignment of the structure to a particular parcel number. This may include for example assigning the structure to the parcel with which the greatest area of the structure outline is associated. Alternatively it may include assigning the structure to the parcel which is closest to the structure and which has an associated street address stored in correlated relation therewith in one or more data stores that is accessible by the RAS circuitry. Of course various rules and approaches may be applied depending on the available data and the nature of the desired analysis.

Of course as can be appreciated, in order to accomplish the desired analysis for all the structures which sketch data is present in the extracted PRS data for a given parcel or a set comprising a plurality of parcels, the described process of developing the outline of the structures in a suitable shape file needs to be completed for each of the structures included in the data related to the parcel or parcels. Therefore the exemplary arrangement after completion of the resolution of the shape file and parcel assignment for a particular structure, evaluation is then made as represented in a step 222 by the RAS circuitry as to the need to complete the processing of additional data to produce corresponding shape files. A determination is then made as represented in a step 224 as to the need to process additional sketch data and parcel data. When there is additional data remaining the exemplary RAS circuitry operates to select the next sketch data to be analyzed as represented by step 226. The process then repeats until shape files are resolved from the extracted PRS vector data and point for all appropriate structures for the parcel or set of parcels to be analyzed.

In the exemplary arrangement, the RAS circuitry is operative to manipulate the data records to apply the resolved structure outlines which correspond to a graphic representation of the sketch data resolved from the PRS extract records, to the GRS parcel and building outline image data in the data stores associated with the PGRS 26 and BGRS 32. This is done to determine structures that are shown in the GRS data that have no corresponding sketch data records in the PRS data. Further the application of the structure outline data resolved from the sketch data in the PRS extracts to the structure data from the GRS data, is used to determine situations where the sketch data in the PRS records regarding the size and/or configuration of building structures on a given parcel of other geographic area is inaccurate. Such situations may correspond to requirements to make changes in the tax payable related to building structures or certain parcels when the RAS system is used by governmental agency for example.

In the exemplary arrangement the RAS circuitry is operative to produce data bearing records that can be visually rendered through one or more displays to indicate situations where structures in the GRS data which have no corresponding PRS record sketch data are present, as well as structures in the GRS data for which the sketch data in the PRS record data is inaccurate. In some arrangements the RAS circuitry operates to generate these records including such visually renderable data by selecting a starting parcel as represented by step 228 which is included in a set of parcels or geographic area that is subject to analysis. The starting parcel may be selected based on programmed criteria, geographical information, parcel number information or other parameters. Alternatively in some arrangements the starting parcel may be selected randomly. The RAS circuitry is then operative to recover the resolved building structure outline data for all structures associated with the selected parcel that have been resolved from the associated sketch data. This is represented by step 230. The RAS circuitry is then operative to load the corresponding building shape file data for the respective parcel that is obtained from the GRS data. This is represented by step 232. The respective building shape file includes data corresponding to visual overhead images of the parcel and all the visible building structures on the respective parcel.

In exemplary arrangements the RAS circuitry is operative to analyze the building outlines that a result from the sketch data included in the PRS records and the data corresponding to the overhead views of the buildings included in the GRS data to determine which sketch data most closely matches building structures represented in the GRS data. This is accomplished in exemplary arrangements by the RAS circuitry carrying out circuit executable instructions to determine the closest match of the sketch data in the PRS data with the particular building structure in the GRS data. Further in exemplary arrangements the RAS circuitry is operative to generate record data indicative of the level and nature of mismatch between the sketch data in the PRS data for a building and a corresponding building structure in the GRS data. As can be appreciated such data is usable to identify circumstances where there are errors in the sketch data in the PRS records and/or situations where buildings have been modified since the time that the sketch data was included in the PRS records. Further in exemplary arrangements the RAS circuitry is operative to determine building structures that are included in the GRS data for which there is no corresponding building sketch included in the PRS data. Such situations may correspond to buildings that have been constructed or substantially modified on a particular parcel since the sketch data was included in the PRS record data. As can be appreciated the RAS circuitry or other circuitry may operate to carry out circuit executable instructions corresponding to different types of data analysis on the data for purposes of evaluating the data and determining the type and magnitude of the discrepancy or mismatch between the sketch data included in the PRS data for parcel or other geographic area and the building structures that are indicated as present in the GRS data for the respective parcel or other geographic area. Such analysis is usable for purposes of identifying structures and parcels for which PRS record data is erroneous and/or changes have apparently been made with regard to the number and size of building structures which may warrant further investigation and/or analysis. Such investigation and analysis which may be done either through operation of the RAS circuitry or other circuitry, through data gathering of additional data conducted in field investigations, or both, and may result in corrected PRS data which may also result in changes to the tax status, assessments or other consequences for the owner of the real estate parcel.

In the exemplary system the RAS circuitry operates to attempt to correlate the sketch data for a building included in the PRS data that is used to produce the corresponding outline data, with the building structure on particular parcel as represented in the GRS data for purposes of determining the respective building structure to which the respective sketch data and resolved outline most closely corresponds. The exemplary RAS circuitry is operative as represented by step 234 to determine the areas of all the building structures associated with the particular parcel from the outline data that was resolved based on the sketch data in the PRS extract data. The areas of all the building structures associated with the particular parcel based on the structures shown in the BGRS data, is also resolved by the RAS circuitry as represented by step 236. The areas of all the structures as resolved from each of the PRS extract based outlines and the GRS aerial photograph data or other overhead graphic representation data are then compared. This is represented by step 238. A determination is then made as represented by step 240 of the closest match between the area of an outline resolved from the PRS extract sketch data (S) and the area of the building structure as determined from the GRS data (G).

The exemplary RAS circuitry is then operative to determine the centroid of the structure G determined from the GRS data as the closest match. This determination is represented by step 242. The centroid of the outline data for S is also determined as represented by step 244. The centroids of each of S and G are then placed in superimposed alignment over the GRS layer data and in a common scale in a step 245. This condition of the data manipulation with the centroids aligned is graphically represented in FIG. 25. As can be seen from the graphic representation corresponding to an overhead view of the structure 246 which is shown furthest to the right in FIG. 25, the resolved outline 248 overlies the building 246 when the centroids are aligned. Further while the outline 248 in this example has a similar shape to the underlying building 246, the angular orientation of the outline does not correspond to the external outline of the building in the BGRS layer which corresponds to an overhead view.

In order to adjust the data corresponding outline layer to determine the level of discrepancy in correspondence with the corresponding building structure shown in the BGRS layer, the exemplary RAS circuitry executes additional steps. These steps are exemplary, and in other arrangements additional or different steps may be used. Further in alternative arrangements, only some of the steps that are described in connection with the exemplary RAS circuitry may be necessary in order to achieve the desired information as to the presence of structures that are undocumented in the PRS data and the level of discrepancies between the PRS data for a given structure and the structure data obtained from the BGRS system.

In an exemplary embodiment the RAS circuitry is operative to determine how best to angularly align the resolved PRS based outline data with the BGRS building outline data. In one exemplary arrangement the RAS circuitry operates as represented in step 250 to determine the data corresponding to longest edge of the outline S that was resolved from the PRS data. The RAS then operates as represented in a step 252 to determine the data corresponding to longest edge of the corresponding structure G which has the closest area match from the BGRS data. The RAS circuitry then operates as represented in step 254 to determine the angle that will make the longest edges of S and G parallel to one another. It should be understood that the exemplary RAS circuitry operates to make the lines parallel rather than overlying due to shadows or other features of the data corresponding to the images in the GRS data layer which may not allow the best fit when the lines are in directly overlying relation.

Figure 25:
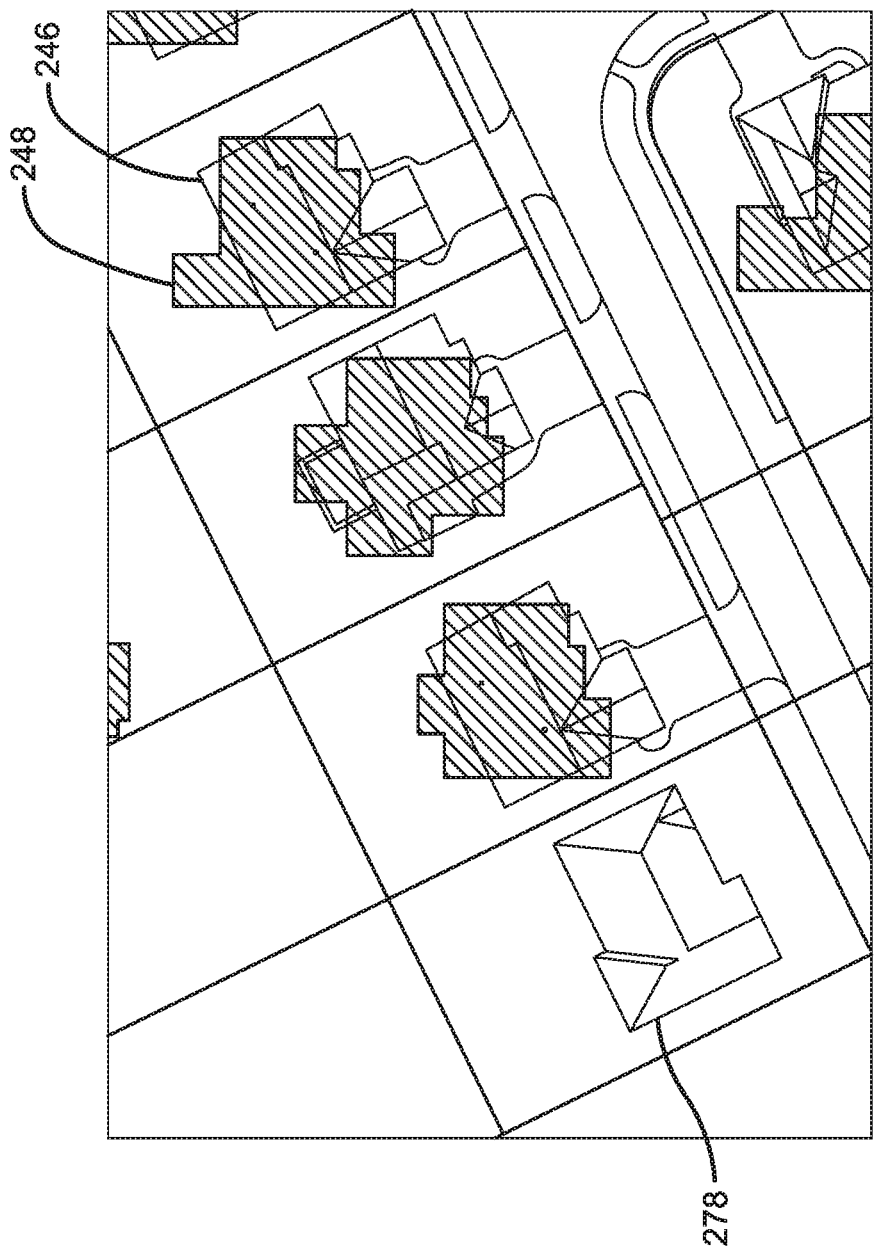
FIG. 25 is a representation of a visually rendered record corresponding to an overhead view representative of centroid alignment of outline record data and building images from a building georeferenced record system.
Figure 26:
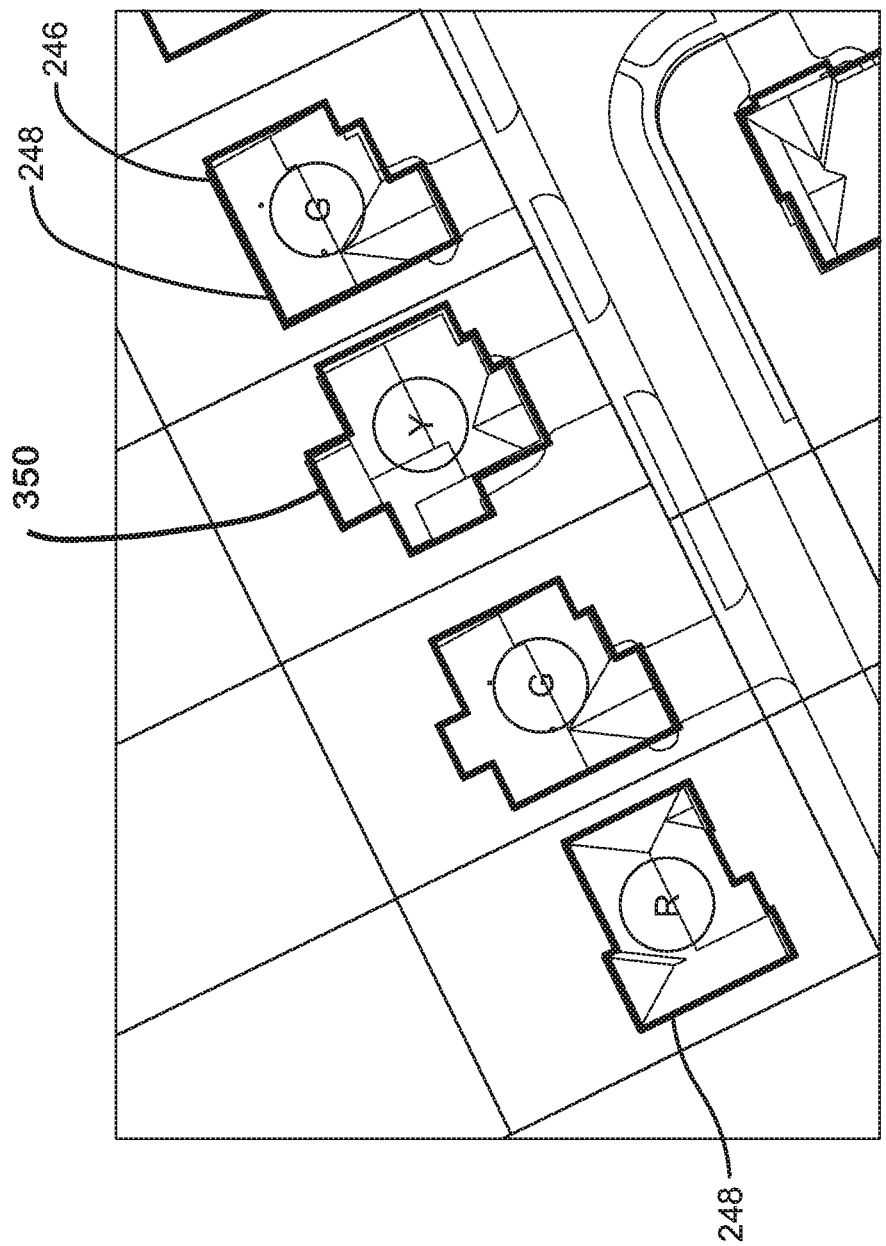
FIG. 26 is a representation of a visually rendered record corresponding to an overhead view representative of alignment of outline record data and the building images shown in FIG. 25 with graphic indicia representative of the level of correspondence between currently stored record data and data resolved through operation of the exemplary record analysis system.

As represented by step 256 the RAS circuitry is then operative to manipulate the data in a manner that corresponds to rotation of the outline S resolved from the PRS data by the angle. This angular rotation is operative in the example as represented in FIG. 25 to cause the outline 248 and the building profile 246 in the PGRS data to closely correspond as shown in FIG. 26.

However such rotation of the outline S about the centroid may produce various degrees of discrepancy (alternatively referred to herein as the amount of discrepancy) between S and G depending on whether they correspond to the same structure and perhaps other factors. In order to determine the degree of discrepancy between the outline S and the building structure shown in the BGRS layer, the exemplary RAS circuitry then does a calculation as represented in step 258 which corresponds to taking away the area of overlap of the outline of G from the outline of S. This produces an area value X.

A calculation is then carried out as represented by step 260 which corresponds to taking away the area of overlap of S from G which corresponds to an area value Y. In a step 262 is then determined whether X or Y is larger. This larger value is designated Z. A percentage mismatch E is then calculated as represented in step 264. In this exemplary calculation the percentage is calculated by dividing the larger mismatch area value Z by the area value of S. The smaller the value of E the closer the match between the outline resolved from the PRS data and the building outline in the BGRS layer. This data is then stored as a discrepancy amount in at least one data store in the exemplary arrangement.

In other exemplary arrangements other approaches may be used to determine the amount or degree of discrepancy between the sketch as determined from the PRS data and the building outline as determined from the GRS data. For example in some arrangements the area mismatch may be determined by computing angles by comparing all edges of the building outlines in the outlines determined from the sketch data and the GRS data. The angles may be sorted by the square root of the sum of the squares of the two edge links. The RAS circuitry may then operate to take the smallest area sum of the differences between the building outline in the GRS data and the building outline from the PRS data. The smallest area sum corresponds to the degree or amount of discrepancy (E). Of course this is merely one alternative approach of numerous approaches that can be taken when calculating a degree of mismatch between the area values, including approaches that are described later herein.

As represented in step 266 the value of E is compared to a set threshold which corresponds to a match level which is a level of correspondence which generally identifies a matching outline. The match level may be set as a percentage of the difference in areas of the sketch data and the GRS building data and may be selectively varied based on the underlying data, including without limitation the accuracy of the PRS data and resolution of the GRS data. In general, a perfect match will be unusual. However, a match which is acceptable for purposes of indicating that the PRS data accurately defines the selected building can be set at a percentage which in some arrangements may be in the range of discrepancy from 0% up to less than 25% based on the area of the outline that is resolved from the PRS sketch data.

In the exemplary arrangement if a match is determined in step 266, the transformed data for the outline S is stored along with the value of E for the particular transform. This is represented by step 268. If the value of E is above that of what is required to meet the criteria for a match but is lower than what corresponds to a minor mismatch value, this is determined as represented by step 270. In exemplary arrangements the minor mismatch value corresponds to an indication that the outline has a reasonably high likelihood of corresponding to the building structure in the GRS data. Again the threshold for the minor mismatch depends on system factors. However in some systems the level for the determination of a minor mismatch is within a range of discrepancy from 25% to less than 40% based on the outline area for the outline resolved from the PRS sketch data. If a minor match is determined the transformed data and the value of E is stored as represented by step 272.

If the value of E is above that required to have the determination of a minor mismatch in step 270, a determination is then made as to whether the value of E is between that of a minor mismatch and a big difference which corresponds to a major mismatch as represented by step 274. The value which corresponds to a major mismatch or big difference may be set by the system operator based on the nature of the data. In some exemplary arrangements the level or amount of discrepancy which corresponds to a major mismatch is within a range of discrepancy from 40% to up to 50% of the areas of the building structures as determined from the PRS and GRS data based on the outline area as resolved from the sketch data in the PRS data. When a major mismatch is determined the transform data is stored in at least one data store and the value of E is recorded as represented in a step 276.

Of course it should be understood that these ranges of discrepancy are exemplary and in other arrangements other approaches may be used. For example in other arrangements a resolved discrepancy value above the set value for a match may be considered a mismatch. Further in other exemplary arrangements numerous different set ranges of discrepancy may be resolved and stored for purposes of facilitating the analysis of determining whether the outline resolved from the sketch data included in the PRS data corresponds to the outline data of buildings in the GRS data. Numerous different approaches and analysis may be conducted by the RAS circuitry or other circuitry to achieve these results.

In the exemplary arrangement the RAS circuitry is operative to then analyze whether the data resolved from the PRS extract indicates that there are additional building structures located on the selected parcel this is represented by step 284. If the determination is made in a step 286 that other buildings are present on the parcel, the system then operates as represented by the step 288 to determine the next closest area match between the outline data S as resolved from the PRS extract data and the building structures G from the BGRS data. The exemplary arrangement is then operative to again carry out the analysis previously described for each of the structures for which there is sketch data included in the PRS records. The RAS circuitry is operative to analyze the resolved outline for a structure based on the PRS sketch data to the outlines of each of the structures present on the parcel that are included in the GRS data. The comparative process is executed for each of the buildings on the parcel. In exemplary arrangements if the RAS circuitry is operative to determine that a level of discrepancy with regard to given sketch data and a building outline in the GRS data is less than a previously determined level of discrepancy for that particular sketch data, the RAS circuitry is operative to store data which indicates the smallest level of discrepancy (closest match) between each building structure represented in the sketch data and each building structure as represented in the GRS data. Once the RAS circuitry has done this analysis for all of the outlines based on the PRS sketch data and building outlines on the GRS data, the RAS circuitry is operative as represented in a step 290 to determine the smallest level of discrepancy between the PRS sketch data and the GRS building outline data which is below the top of the major mismatch range.

In the exemplary arrangement the RAS circuitry is operative as represented in a step 400 to make a determination whether the PRS data includes data corresponding to a sketch outline which does not correspond to a building outline in the GRS data within the range of discrepancy for a major mismatch or within another range of discrepancy closer to a match. The circuitry is then operative as represented in step 402 to identify the no match condition for the sketch data and to store in at least one data store the sketch data for which there is no match as represented in a step 404. The exemplary RAS circuitry is then operative in a step 406 to disregard the sketch data for which a no match condition has been determined and stored from the sketch data, and returns to determine if there is other sketch data in the PRS records for which there is no match, in the GRS records at step 400. The RAS circuitry continues to determine sketch data for which there is no match until all sketch data which has no corresponding building outline in the GRS data with a major mismatch level of correspondence or closer to a match has been identified and stored.

The exemplary RAS circuitry is further operative as represented in a step 408 to determine if there are any situations where a building outline in the GRS data has no corresponding sketch data in the PRS data. This corresponds generally to a situation where a new building has been constructed on the parcel since the time that the PRS data was collected, or to a situation in which the PRS data is inaccurate and has failed to record the data regarding a particular building. This condition is represented for example by the building structure 278 that is shown furthest to the left in FIGS. 25 and 26 for which there is no corresponding outline that has been derived from the PRS data. In the exemplary arrangement the existence of such a structure that is missing from the PRS data is identified as represented in a step 410 and the record data related to the building structure for which there is no sketch in the corresponding PRS data is stored through operation of the RAS circuitry as represented in a step 412. The RAS circuitry is then operative as represented by step 414 to disregard the building structure for which there is no sketch data and for which the data has been stored. The RAS circuitry is then operative to again determine if there are other building structures included in the GRS data for which there is no corresponding sketch data in the PRS data. The process of identifying building structures for which there is no corresponding sketch data is repeated until all such structures in the GRS data have been identified. Of course it should be understood that these approaches are exemplary and in other arrangements other approaches may be used.

An alternative or additional method that may be used for resolving the closest area match of the building structures included in the PRS extract data and the GRS data of some exemplary embodiments involves iterative angular movement of the outline data S to evaluate the closest match (smallest level discrepancy and smallest E value). The additional method may be used in in some arrangements to evaluate whether the alternative method produces a closer match than the methods previously described.

In the exemplary arrangement, the exemplary alternative method includes determining the closest area match between the area of the outline data S for structures indicated as on the parcel from the PRS extract data, and the area of structures indicated as on the parcel in the GRS data from the BGRS data. In this exemplary approach the centroid of a selected building outline G from the GRS data is determined in a step 292 as is the centroid of the outline data S resolved from the PRS extract data as represented by step 294. Again the data is analyzed in a manner such that the outline data is superimposed in a common scale and the centroids are aligned in a manner like that previously discussed. This is represented by step 296.

In the original centroid aligned positions of S and G a calculation is done like that previously discussed where the overlap area of G is taken from S, which is designated area value A as represented by step 298. Similar to that previously discussed, a calculation is conducted where the overlap of S is taken away from G to calculate an area value B as represented by step 300. The larger of A or B is determined as represented in step 302 which value is designated C. The calculation of the level of discrepancy as a percentage mismatch E is then carried out as represented in step 304. The percentage mismatch is based on the value of area C over the value of outline area S.

As represented in step 306 a determination is made as to whether E corresponds to a value less than or equal to that required for a match. If so, the transform data and value of E are stored as represented by step 308. If a match is not found the value of E is evaluated in a step 310 to determine if the value corresponds to a minor mismatch. If so then the transform data and the value of E is stored as represented by step 312. If the value of E is above that necessary to have a minor mismatch a determination is made whether the value of E s within the range for a major mismatch. If so a major mismatch categorization is assigned and the transform data and value of E is stored as represented by step 314. This corresponds to a determination that in the current representation of the data, the sketch outline data resolved from the PRS data and the building outline data resolved from the GRS data do not correspond at least at the level of a major mismatch. Of course it should be understood that the range of discrepancies for purposes of determining if there is a match, a minor mismatch or a major mismatch may be the same as those previously discussed, or may alternatively be different ranges of different criteria as established in the circuit executable instructions of the RAS circuitry.

In accordance with this alternative evaluation approach the amount of prior rotation of outline S is analyzed as represented by step 316. A determination is then made at step 318 as to whether the outline S has been previously rotated by 360° about the common centroid. If the rotation has not been through a full 360° the RAS is in operative to rotate the outline S by an angular increment (i) as represented by step 320. In exemplary embodiments the angular increment (i) may be set as appropriate by the system operator through configuration of the RAS circuitry so as to identify any situation where rotation of the outline S will correspond to a match with the underlying GRS outline. In some embodiments the increment may be set at approximately 3°, which corresponds to 3°+/−2°. In some arrangements the results after each rotation are analyzed to determine if the current result reflects a closer match than the prior result. If the result is better, the data and rotational transform information is stored as the best match until a better match is found through further rotation. Thus the best match through rotational manipulation of the data corresponding to the PRS sketch data and the GRS data is identified. Of course these approaches are exemplary and in other embodiments other approaches may be used.

In this exemplary arrangement if the outline S has been rotated 3600 an analysis is made as represented by step 322, as to whether there are additional structures on the particular parcel. If a determination as represented at step 324 indicates that there are more buildings on the parcel, a determination is made as to the next closest area match between the buildings as represented in step 326. The process is then repeated. This analysis in the exemplary arrangement is carried out for all the different structures on the particular parcel as indicated from the PRS extract until all structures have been analyzed.

After all of the outlines corresponding to the PRS sketch data have been analyzed for a given parcel, the exemplary RAS circuitry is operative to determine if there are any structures identified in the PRS sketch data for which there is no match to the GRS data for the given parcel within at least the major mismatch range of discrepancy. The sketch data in the PRS record data for which there is no match is determined and stored in a manner like that previously discussed in connection with steps 400, 402, 404 and 406. In this manner the RAS circuitry is operative to identify sketch data for which there is no match in the GRS data. Likewise the RAS circuitry is operative to determine the building outlines included in the GRS data for which there is no corresponding sketch with at least the major mismatch level of discrepancy in the PRS data. This may be done in a manner like that previously described in connection with steps 408, 410, 412 and 414. Of course it should be understood that these approaches are exemplary and in other arrangements other approaches may be used.

Figure 16:
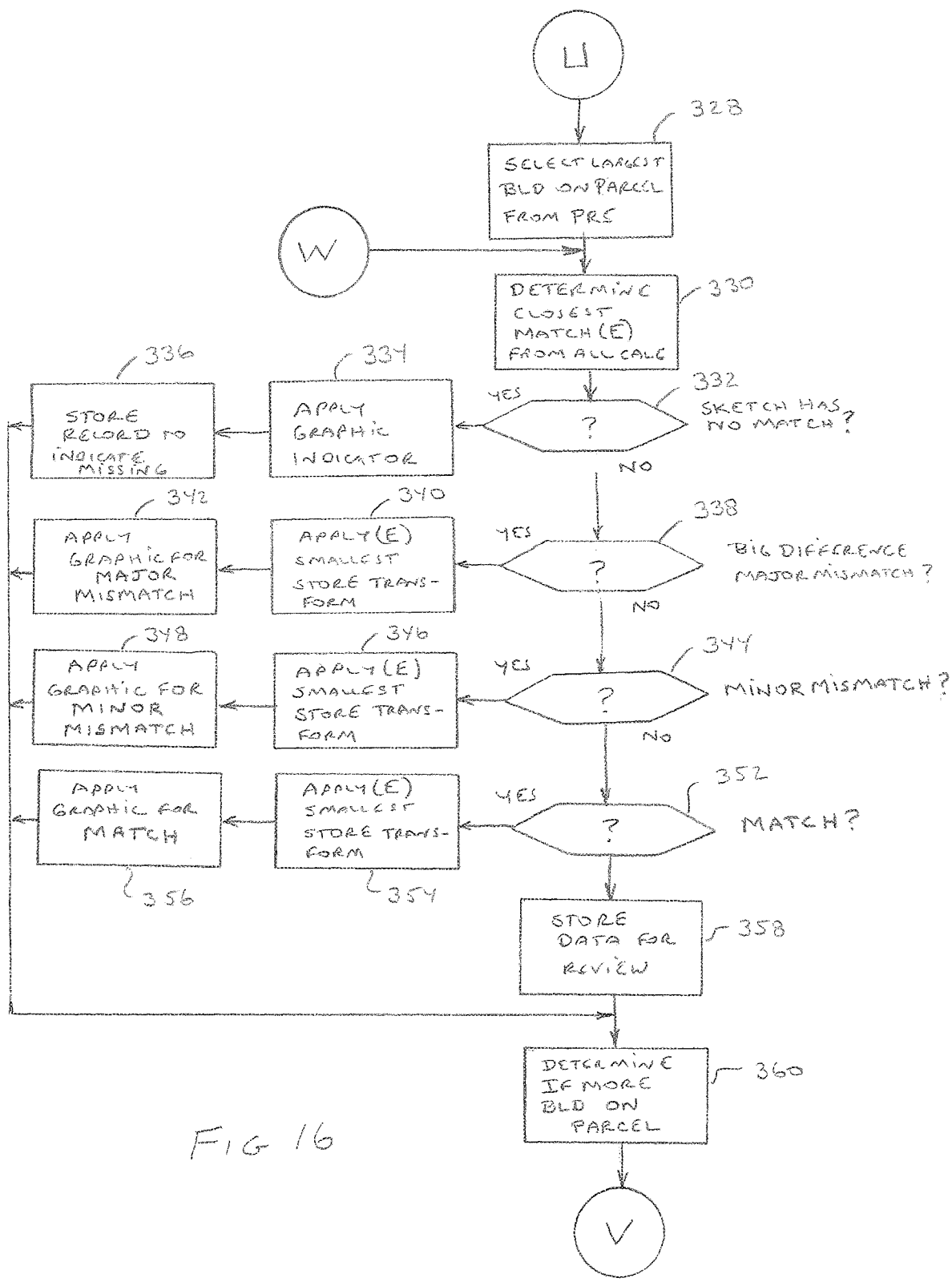
Figure 17:
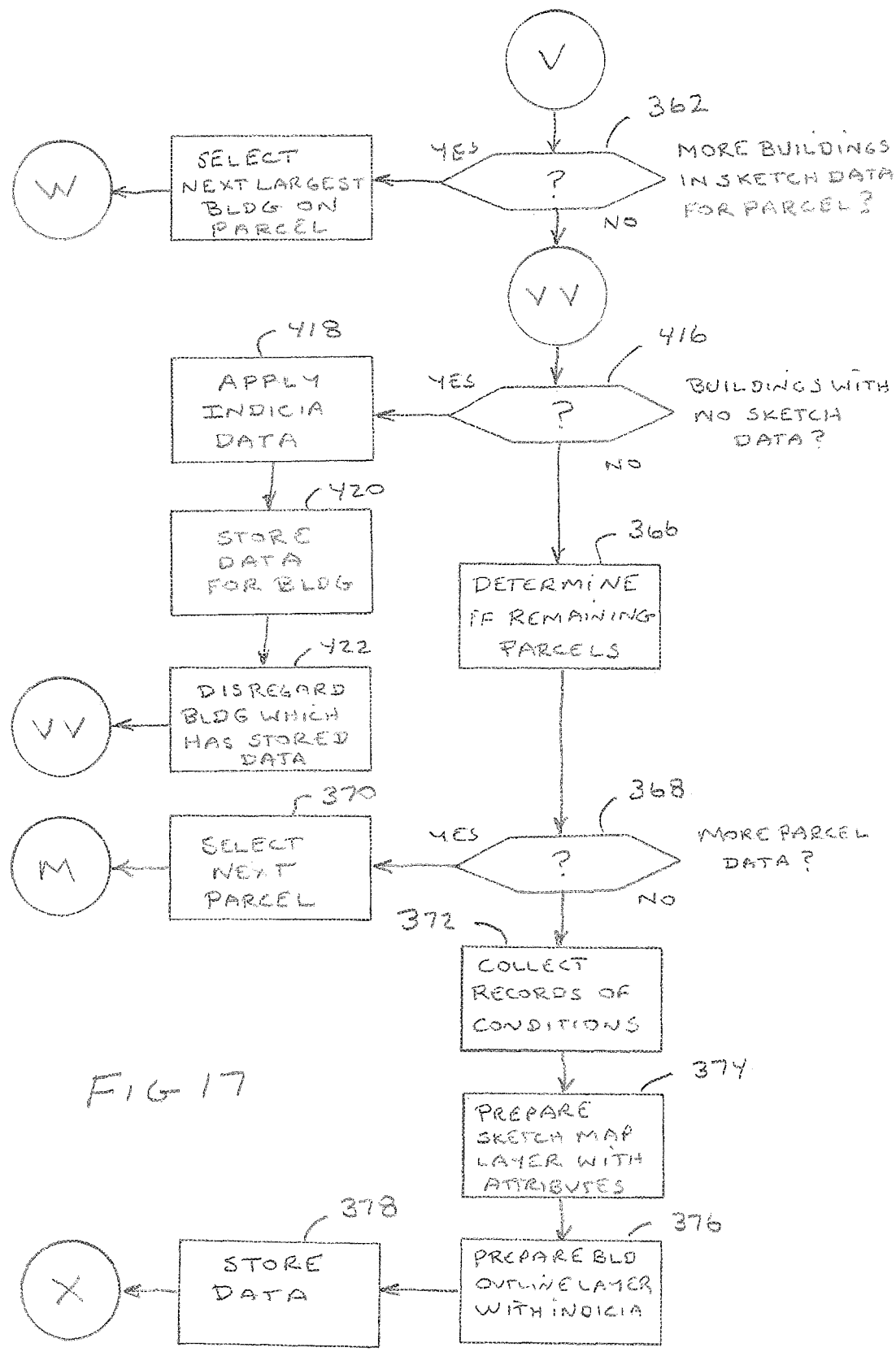
Figure 18:
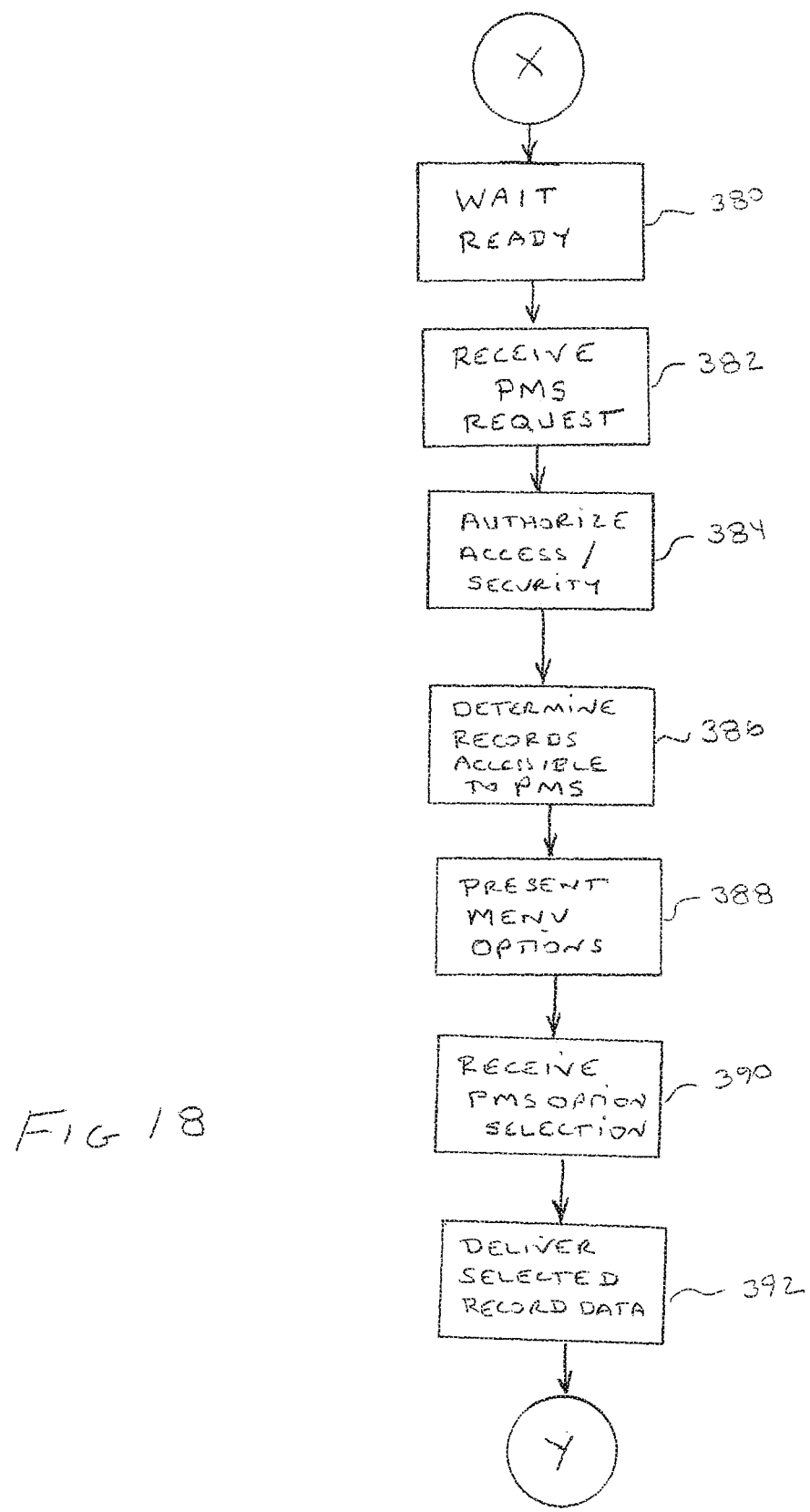
Figure 19:
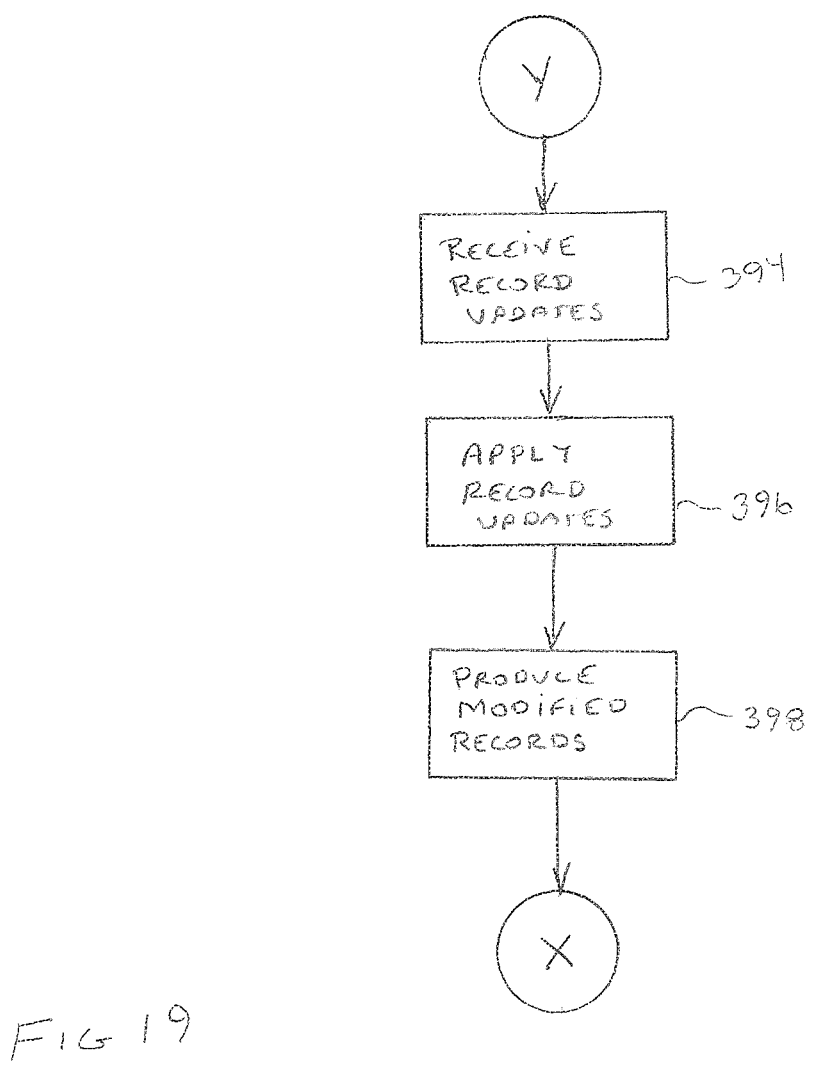

In the exemplary arrangement once all the structures have been evaluated for a match with the GRS data through one or a plurality of methods of analysis, the RAS circuitry is operative as represented in FIG. 16 to select the structure having the largest area outline based on the outline resolved from the PRS data. This is represented by step 328. The determination is then made a step 330 as to the closest match (smallest area mismatch/discrepancy value of E) that resulted from evaluations of the data for this particular structure.

If it is determined in step 332 that there is no match for this particular structure shown in the PRS data at or lower than the major mismatch level of discrepancy, the RAS is operative to produce data corresponding to graphic indicia corresponding to the structure which is usable to produce indicia indicative that there is no match for the sketch data in the GRS data as represented by step 334. A data record is also stored indicating that a corresponding structure is not included in the GRS data. This data bearing record is represented by step 336.

In exemplary arrangements data corresponding to sketch data that is included in the PRS data for which there is no match in the GRS data within at least the level of a major mismatch, is stored through operation of the RAS circuitry so that visual indicia may be generated corresponding to the sketch data and applied to a visual representation of the parcel or other geographic area with which the sketch data is associated. In exemplary arrangements the graphic indicia corresponding to the sketch data for which there is no match is presented in a distinctive transparent color in the at least one visual output that is generated responsive to operation of the RAS circuitry such that an operator can identify quickly that there is sketch data in the PRS data for which there is no match. Further in exemplary arrangements the provision of a visual rendering of the outline or entire area for which there is a missing sketch enables an operator to identify other building structures that may be included in the GRS data to which the missing sketch may properly apply. In some arrangements the RAS circuitry is operative to place the graphical indicia corresponding to the missing sketch in a particular location with regard to the at least one visual output corresponding to the parcel. This may facilitate the ability of the user to identify that there is sketch data for which there is no match with regard to the parcel. Also in exemplary arrangements when there is a plurality of structures represented in the PRS sketch data for which there are no structures within at least the major mismatch range of discrepancy in the GRS data, the RAS circuitry is operative to place the indicia representative of each of the plurality sketch outlines for which there is no match in a side-by-side relation in the at least one visual output corresponding to the parcel. Of course these approaches are exemplary and other arrangements other approaches may be used.

If it is determined in a step 338 that the closest match for the structure constitutes a big difference which is alternatively referred to herein as a major mismatch, the transform for the smallest mismatch discrepancy value E is applied to the outline S as represented by step 340. Further, in an exemplary arrangement, distinctive graphic indicia is applied to the overlying outline S in a GIS layer. This layer may be combined and superimposed in a common scale with the layer showing the outline of structure G in the visually rendered GRS layer data which is included in at least one visual output that is produced responsive to operation of the RAS circuitry which produces at least one visual display including such data. This is represented by step 342. In exemplary arrangements a major mismatch may include a visual color or other graphic indicia so as to identify the particular structure as one for which there is a major mismatch. For example in some exemplary arrangements a designated color scheme such as alternative yellow and red bands or other distinctive overlying color scheme may be used to identify a structure that is represented in at least one visual output for a common parcel where S and G are shown in superimposed relation and are subject to a major mismatch.

If it is determined that the resolved value of E corresponds to a minor mismatch as determined in a step 344, the RAS circuitry is operative to apply the transform to the outline S that produces the smallest value of E (the closest match and smallest discrepancy value) and to store the associated value and transform data as represented by step 346. The RAS circuitry is further operative to modify the record data to apply graphic indicia corresponding to the minor mismatch level when the circuitry operates to produce at least one visual output corresponding to the visual rendering of S superimposed on the outline of building structure G in the GRS data as represented by step 348.

In some exemplary arrangements the determination of the minor mismatch may be indicated by the application of distinctive color or graphic indicia on the building outline data S as represented in at least one visual output which is superimposed on the outline of a corresponding building structure G in the GRS data. As represented in FIG. 26, a building 350 is indicated as corresponding to a minor mismatch by having the indicia associated therewith in a yellow or other distinctive corresponding color or other indicia. Further in the at least one graphic visual output shown the building 350 includes indicia of a Y in a circle to further designate the status. Of course this approach is exemplary. Further, in the exemplary arrangement the manipulation of the outline S to the closest match in layered superimposed relation over the underlying building as shown in the GRS data, is operative to highlight in the at least on visual output the differences between the building outline as resolved from the PRS sketch data and the actual image as determined from the overhead view in the GRS layer. This facilitates the review of the particular structure as the graphics in the overlying layers in the at least one visual output produced by the RAS circuitry highlight where the discrepancies are between the PRS sketch data and the image of the structure produced from the GRS data. Of course this approach is exemplary and in other embodiments other approaches may be used.

In the exemplary arrangement if a match is determined at the step 352 the RAS is operative to apply the transform data for the smallest mismatch (smallest discrepancy value of E) and store the data. This is represented by step 354. Further, the RAS circuitry is operative to manipulate the corresponding data to apply graphic indicia indicative that for this particular structure S, the structure G in the GRS layer corresponds thereto at the level of a match. In exemplary arrangements the RAS circuitry is operative to cause at least one visual output that includes a visual display output corresponding to the sketch data from the PRS data and includes at least one visual display output corresponding to the building structure for which a match determination has been made in superimposed relation and in a common scale. In the exemplary arrangement the visual indicia included in the at least one visual output corresponding to the sketch data includes distinctive visual indicia indicative of a match. This is represented by step 356.

In the exemplary arrangement the graphic and color indicia that is applied for situations where there is a match is green indicia which corresponds to the substantially overlapping outline S and underlying building G in the at least one visual output produced responsive to the RAS circuitry. This condition is represented in FIG. 26 for building 246. Further, in the representation of the visual output shown in FIG. 26, the indicia of a G in a circle is shown applied to indicate a match for this particular structure. Of course these are only some of exemplary approaches that can be used for purposes of providing graphic or color indicia or other indicia to indicate the status of the level of match between the different sources of data.

As represented by step 358 the data is stored through operation of the RAS circuitry including data that produces the applied indicia when the records are visually rendered. An analysis is then made in a step 360 as to whether there are additional buildings represented in the PRS data as being on the particular parcel which need to be analyzed for correspondence with the outline data resolved from the GRS data. A determination is made at a step 362 on whether additional buildings represented in the sketch data as on the parcel need to be evaluated for correspondence with building outlines in the GRS data and for inclusion of graphical indicia indicative of the level of discrepancy in the associated records through operation of the RAS circuitry. If so, as represented in step 364 the next largest structure on the particular parcel is selected and undergoes a similar analysis and tagging with indicating indicia as previously described.

In the exemplary arrangement after all the data corresponding to the sketch data included in the PRS data has been analyzed for the level of discrepancy with corresponding building structures included in the GRS data, the RAS circuitry is then operative to determine if there are buildings represented in the GRS data for which there is no sketch data. This determination is represented by step 416. If it is determined that there are buildings for which there is no corresponding PRS sketch data, the RAS circuitry is operative to identify the data corresponding to the building outline and store in association therewith data corresponding to indicia which is indicative that the building outline data has no corresponding sketch. In exemplary arrangements the stored data corresponds to distinct visual indicia which identifies this particular condition. The generation of the data corresponding to the indicia that is correlated with the building outline data is represented by step 418. The RAS circuitry is operative to store the data corresponding to the indicia in correlated relation with the GRS data corresponding to the building outline as represented by step 420. The exemplary RAS circuitry is then operative to disregard from the analysis the GRS data corresponding to the particular building outline which has been identified as not having corresponding sketch data as represented by step 422. It is then determined whether or not there are other buildings for which outlines are included in the GRS data which have no corresponding sketch data, and if there are such other buildings the steps are repeated such that the appropriate indicia will be presented in conjunction therewith when the RAS circuitry is operative to produce visual display outputs that include a building outline for which there is no corresponding sketch data.

Further in order to provide a complete analysis and appropriate visual indicia related to the correspondence of structures in the GRS data with PRS sketch data for structures in the geographic area, the process is carried out for structures on all of the included parcels. In some exemplary arrangements the analysis may be carried out for parcels that are contiguous or otherwise adjacent and which are subject to common ownership. Further in some exemplary arrangements parcels that are subject to different ownership within a particular geographic area or other defined area of interest may be analyzed through operation of the RAS circuitry. As represented by step 366, an analysis is made as to whether further parcels need to be analyzed. If it is determined in step 368 that additional parcels remain for analysis, the next parcel is selected as represented by step 370. The process is then repeated for the structures as represented in the PRS sketch data and the GRS data on that parcel.

After the analysis has been completed for all the parcels of interest, the RAS is then operative to correlate records related to the various conditions which prevented the analysis or which indicated inconsistencies as previously discussed. These records are collected along with the associated data by condition categories as represented in step 372. This data may be analyzed and evaluated through further machine analysis or manually through operation of a user terminal for purposes of determining the basis for the discrepancies and for establishing procedures to remedy the conditions which prevented making the RAS analysis.

The exemplary RAS is then operative as represented by step 374 to produce data corresponding to a georeferenced map containing the data corresponding to visual representations of the outlines S resolved from the PRS extract data which contains at least one attribute which indicates the closeness of the match (level of discrepancy) of the outline S with the corresponding structure G building outline in the corresponding GRS map layer data. Such attributes may correspond to visual or other indicia of various types which indicate a match, a minor mismatch, or a big difference/major mismatch, or no match with sketch data as previously discussed. In the exemplary arrangement the georeferenced map data generated responsive to operation of the RAS circuitry in step 374 includes all or a substantial subset of the structures of interest in the selected geographic area.

Further as represented by step 376 the exemplary RAS circuitry is operative to produce data records corresponding to a georeferenced map including the building outlines layer which includes a GIS layer based on the GRS data including indicia that indicates the building structures in the GRS data for which there is no corresponding PRS sketch data. The data corresponding to this map layer may include for example, visual or other indicia discussed in connection with the missing building structure 278 previously mentioned. Again for this exemplary arrangement the data corresponding to this map layer may correspond to all or a significant subset of the parcels and structures of interest presented in an overhead view, in superimposed relation and in a common scale.

Figure 27:
FIG. 27 is a representation of a visually rendered record corresponding to an overhead view representative of alignment of outline record data and building image data produced through operation of the exemplary embodiment.
Figure 28:
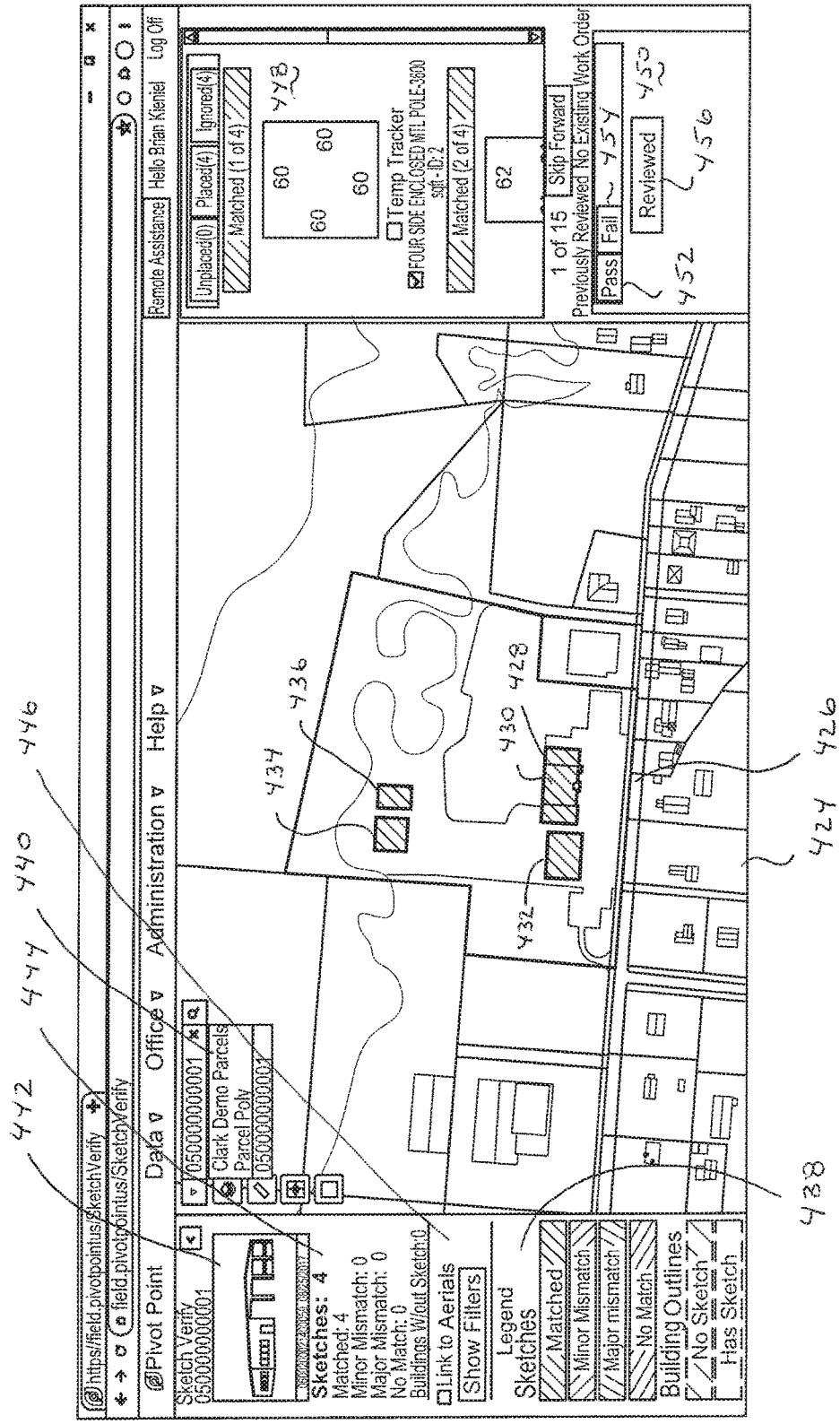
FIGS. 28-36 are representations of visually rendered records corresponding to visual display outputs produced responsive to operation of an exemplary record analysis system.

The exemplary RAS circuitry is then operative as represented by step 378 to store the resolved record data corresponding to visual output layers generated in steps 374 and 376 so as to be usable to produce visual outputs that when rendered through one or more displays shows the status of structures in the geographic area of interest. A representation of such visual rendering of such layers is shown in FIG. 27. As can be appreciated such a visual rendering in an exemplary arrangement will include visible indicia associated with each structure shown which indicates whether it corresponds to a match with PRS sketch data or the other conditions such as a minor mismatch, a major mismatch or that a building outline based on the PRS sketch data has no match within the major mismatch range if discrepancy. Further the exemplary visual rendering producible by the RAS circuitry in exemplary arrangements is further operative to visually indicate the location of each building outline included in the GRS data for which there is no corresponding PRS sketch data. The indication of each of such conditions may be provided through selected graphics, color overlays or other perceivable output indicia. Further as can be appreciated the exemplary map data that is produced through operation of the exemplary RAS circuitry may be modified, expanded, changed, parsed or otherwise manipulated to facilitate the analysis of the information presented, and used to produce visual display outputs to facilitate analysis and correction of PRS data.

Further in exemplary arrangements additional indicia or other indicators may be applied in the data used to produce visual display outputs consistent with other types of analysis that are conducted related to the structures. For example structures that were determined to be too small to be subject to analysis may be presented with associated indicia that corresponds to this condition. Likewise structures that are determined not to be taxable may be presented with other suitable associated indicia that enables them to be readily recognized as having the particular status. In some exemplary arrangements the indicia that is presented through the visual display output may include data corresponding to the structure type data which is included in the PRS data, which is indicative of particular characteristics, properties or usage of the corresponding structure or portions of structures. Such indicia may be provided either directly through characters that are included on the visually output representations of the structures or portions thereof, or may be provided by providing distinct colorations or other visible indicia which are indicative of particular types or aspects of information which are available from the PRS data and/or hint data. Further in exemplary arrangements the record data corresponding to the data usable to produce visual outputs include corresponding dimensions indicative of the external walls bounding a structure in the PRS sketch data, or dimensions of other separating demarcations related to structures that are represented in visual outputs corresponding to the parcel or other geographic area on which the parcels are located. Further other conditions which correspond to known recognized conditions or anomalous conditions may be included in the stored record data and presented through the visual outputs to facilitate the analysis and or remediation of various conditions. Different approaches may be applied by the RAS circuitry in filtering of various conditions so as to enable users of the system to obtain data records of various types which may be desired for different types of analysis. Of course these approaches are exemplary and in other embodiments other approaches may be used.

In exemplary arrangements RAS circuitry 38 may be operated to provide data bearing records as desired to operators of PMS systems 14 or other remote devices that are authorized to access the data bearing records that are accessible in the system. As graphically represented in a step 380 the RAS circuitry will remain in a ready state waiting for requests from PMS systems and other authorized user devices. As can be appreciated, in exemplary arrangements inquiries may come from numerous different users who may operate respective PMS systems. Such users may be associated with different jurisdictions or other data providers that may be entitled to only access certain subsets of the records that are available from the system. Users accessing the system may present inquiries from areas geographically remote from one another and from the RAS system.

In the exemplary arrangement when the RAS circuitry receives an access request from a PMS as represented by step 382, the RAS circuitry requires that the user and/or PMS system which is requesting access to the system provide credentials which can be authenticated as associated with an authorized user as represented by step 384. Further in exemplary arrangements the RAS circuitry provides for secure communications with the PMS through techniques such public/private key encryption, VPN and other security techniques.

Based on the access credentials presented by the user and/or PMS system, the RAS circuitry next operates to determine the scope of the level of permission to access record data that is accorded to the PMS user. This is represented by step 386. In some exemplary arrangements the user may be authorized to only access certain data bearing records corresponding to a selected geographic jurisdiction. In other exemplary arrangements the authority of the user to access data may be limited to particular records or records of a certain type. In other arrangements the authority of the user to make modifications to records may be limited to certain changes as permitted by the level of authority that is granted to the particular user. Of course these approaches are exemplary and other embodiments other approaches may be used.

The user is then presented with one or a series of menu options that describe the available features and record data to which the user is authorized to gain access. This is represented by step 388. In response to being presented with the menu options, the PMS user provides inputs corresponding to menu selections, which are received by the RAS circuitry as represented in step 390.

Responsive to receipt of a menu selection input from the authorized user, the RAS circuitry is operative to resolve and deliver the corresponding selected record data to the user. Such record data will be based on the requested options and functions selected by the PMS user. Such records may include access to map layer data which may be rendered as at least one visual output through a display of the type previously discussed. Such requests may also include access to particular records or groups of records that correspond to particular conditions. For example such requests may include access to record data including information on structures for which there are no corresponding records in the PRS data, or structures for which there is a major mismatch between the PRS sketch data and the GRS data. Alternatively other record types may be provided in response to user requests such as collections of records that are incomplete and require review of the types that have been previously discussed. The requested information is delivered by the RAS circuitry as represented by the step 392.

Further in exemplary embodiments, depending on the type of access that the user is granted, the RAS circuitry may be operative to receive updated data related to the data bearing records that are stored in the system. For example a PMS user may selectively operate a user terminal to access records that are incomplete and provide missing data so that the records can then be processed in the normal manner. Likewise some users may operate a user terminal to review records that include invalid or unsupported data, and provide the necessary information so that the records may include valid data. Authorized users may make various types of record updates in the exemplary system. The receipt of such updates by the system is represented by step 394.

In exemplary arrangements record update data may be applied through operation of the system responsive to inputs from a user. The record update data may be applied to the various records as appropriate to make corrections, modifications, include supplemental information or take other steps as appropriate. This is represented by step 396. The update data may be utilized and processed through operation of the RAS circuitry to produce modified record data. For example such update data may be utilized to analyze structures and identify the level of discrepancy which is indicative of a degree of correspondence or mismatch between the updated data and the georeferenced GRS system data. Other steps may be taken to process or otherwise handle the updated data by producing modified records as represented in step 398.

Of course it should be understood that the schematic representation of the system logic may include numerous different options for the analysis, delivery, rendering, and updating of data bearing records that may be included in or accessible by the RAS circuitry. Further in alternative arrangements the RAS circuitry may be operated to provide data that has been updated or otherwise adjusted to the PRS or to other systems so as to correct incomplete or invalid data in the PRS that is identified through operation of the RAS circuitry. Of course it should be understood that these approaches and capabilities are exemplary, and in other embodiments different or additional functions and capabilities may be provided.

FIGS. 28 through 36 are exemplary visual display outputs that are produced through a visual display responsive to operation of the RAS circuitry and the data bearing records of the types previously discussed. An exemplary visual display output 424 includes a visual representation of an overhead view of a real estate parcel 426 the boundaries of which are represented through output visual indicia that contrast with the existing background. The exemplary display output includes a visual representation of a graphic representation of PRS sketch data 428 that is included in the PRS data record for the existing parcel. The graphic representation of the sketch data 428 is shown in superimposed relation and in a common scale with the graphical appearance of a building 430 included on this parcel that is included in the corresponding GRS data. In this exemplary arrangement the graphic representation of the sketch data 428 corresponds within a set range of discrepancy with the outline data for the building 430 such that the RAS circuitry has made a match determination that the sketch data in the PRS data has a matched relationship with the building structure in the GRS data. In this exemplary arrangement the RAS circuitry is operative to generate at least one visual display output including visual indicia which is indicative of the match determination. In this exemplary arrangement the visible indicia applied by the RAS circuitry is a transparent green color within the boundaries of an outline of the corresponding sketch data. Of course this approach is exemplary and in other arrangements other approaches may be used.

For this exemplary parcel 426 three other building structures that are included on the parcel have been found to have PRS sketch data that match with corresponding building structures included in the GRS data. For each of these building structures 432, 434 and 436 the RAS circuitry is operative to produce visual display outputs that correspond to the PRS sketch data that has a matched relation with the associated building data including color indicia which is indicative that the PRS data matches the GRS building data within the set range of discrepancy which corresponds to a match. In the exemplary arrangement the RAS circuitry is operative to include in the visual display output 424 indicia which is indicative of the match determination for these structures. In the exemplary arrangement the indicia includes a green outline corresponding to the PRS sketch data and a transparent green overlay in the area bounded by the outline that corresponds to the sketch data.

In the exemplary arrangement the RAS circuitry is further operative to include in the at least one visual display, output visual indicia corresponding to a legend 438. The legend includes indicia which is indicative of the meaning of the indicia that is applied in connection with the PRS sketch data and the GRS building data. In the exemplary arrangement the legend includes graphics indicating the colorized boundaries and transparent overlays within sketch data that corresponds to a determination that there has been a match, a minor mismatch, a major mismatch or no match between the PRS sketch data and the GRS data. The exemplary legend also includes graphic indicia indicative of the indicia applied when the GRS data includes a graphical representation of a building for which there is no sketch in the PRS data that corresponds within at least the major mismatch range of discrepancy. The exemplary legend also includes graphic indicia which is indicative of the outline boundary indications of the PRS sketch data which is visible in circumstances where a match determination has not been made.

In the exemplary arrangement the visual display output further includes identifying indicia 440 which is indicative of the particular parcel or other geographic area that is represented through the visual display output. The exemplary at least one visual output further includes a horizontally viewed ground level pictorial representation 442 of at least a portion of the parcel. In exemplary arrangements the pictorial representation may include a graphic image of one or more buildings that are present on the particular parcel. The image data included in the pictorial representation 442 may be included in the PRS data and used to produce the generated output by the RAS circuitry. Alternatively the pictorial representation may be accessed from a data store such as one associated with a service such as a third party service that provides street level imagery. In some exemplary arrangements the pictorial representation information may be usable by individuals who need to utilize the system to conduct field investigations to update the data or otherwise identify the particular parcel to which the output data pertains.

In the exemplary arrangement the visual display output 424 further includes an output region 444. The output region 444 includes indicia corresponding to the number of sketches included in the PRS sketch data for which different levels of match determinations have been made. The exemplary output region 444 further includes indicia corresponding to the number of sketches included in the PRS data for which no match within at least the major mismatch level discrepancy was able to be made. The exemplary output region is further operative to include indicia corresponding to the number of buildings included in the GRS data for which no corresponding PRS sketch data was determined by the RAS circuitry. As indicated for this exemplary parcel, four sketches included in the PRS data were determined to match buildings represented in the GRS data, and no mismatches or non-match situations where determined.

The exemplary visual display output 424 further includes a selection region 446. The exemplary selection region enables a user of a PMS terminal or other user terminal or device from which the visual display output is presented, to provide inputs to select to review other data that may be accessible through the system. For example in the exemplary arrangement the user is enabled to provide inputs through at least one input device which enables the user to select to access georeferenced oblique aerial imagery data related to the particular parcel represented in the display. In some exemplary arrangements the RAS circuitry may be operative responsive to receiving at least one user input corresponding to a georeferenced oblique aerial imagery selection to enable the user to view additional pictorial information regarding the particular parcel and/or the structures thereon. This may include for example the ability to access additional GRS data representative of views of the parcel and/or building structures from different angles, directions and perspectives. The ability to view such structures may facilitate a user's efforts to verify that the data represented in the PRS data is accurate. This may include for example reviewing the structures or other visible items to determine the type thereof for purposes of making decisions as to whether the structure is one that is subject to taxation or exempt. The exemplary selection region 446 further enables a user to provide at least one selection to receive indicia which is indicative of filter functions that have been applied through operation of the RAS circuitry or other circuitry for purposes of presenting the visual display output or other indicia. Users may choose to remove these filter operations for purposes of gaining access to other data that the user may consider helpful for purposes of carrying out their analysis. Of course it should be understood that these approaches are exemplary and other arrangements other approaches may be used.

The exemplary visual display output 424 further includes a graphic output region 448. The exemplary graphic output region 448 includes responsive to operation of the RAS circuitry, indicia which is indicative of the number of sketches included in the PRS data that have been determined to correspond to building structures in the GRS data with at least a major mismatch degree of discrepancy. The exemplary graphic output region further includes a graphic representation of each such building structure for which such a determination has been made. In the exemplary arrangement each building structure is represented as a polygon including dimensional data for the external walls or other demarcation walls included in such structure. In the exemplary arrangement each graphic representation is presented in connection with indicia which is indicative of the structure type data that is included in the PRS record data associated with the structure. In the exemplary arrangement the RAS circuitry is also operative to include with the graphic representation, the area of the particular building structure or sub area thereof.

In the exemplary arrangement the user is enabled to provide inputs through their PMS terminal or other user device to enable scrolling through or otherwise viewing each of the graphic representations for the building structures that have been identified as corresponding with at least a level of discrepancy of a major mismatch on the particular parcel. This enables the user to view the graphical information regarding the PRS sketch data for which a match, minor mismatch or major mismatch has been determined. Further in the exemplary arrangement the graphic output region 448 includes indicia that corresponds to the number of building structures represented in PRS sketch data which were unable to be matched to a building structure in the GRS data. Also included are indicia which indicates the number of structures that were determined as present on the property, but which were ignored for purposes of the analysis. Such structures may correspond for example to structures below a certain area threshold which are exempt from tax. In other exemplary arrangements structures may be ignored due to other data included in PRS data or hint data which is indicative that a particular structure corresponds to personal property (such as a trailer or silo) or other information that results in the particular structure being ignored for purposes of the analysis. Of course it should be understood that this approach is exemplary and in other arrangements other approaches to presenting information that may be useful to a user in connection with the presented visual outputs and data may be utilized.

Further the exemplary visual display output 424 includes a user selections area 450. In the exemplary arrangement the user selections area 450 of the display output includes an area which includes at least one selectable input icon. In the exemplary arrangement the selectable input icons include a pass icon 452. In exemplary arrangements the pass icon 452 selectable by user through at least one input device. In the exemplary arrangement the user is enabled to provide an input corresponding to selection of the pass icon 452 to provide an indication that the PRS data corresponding to the particular parcel is accurate. Such an input is further operative in the exemplary arrangement to cause the RAS circuitry to stored data in at least one data store that the PRS data for the parcel or other geographic area subject to analysis is accurate. In the example shown in FIG. 28 in which the buildings represented in the PRS sketch data each correspond to a building structure within the GRS data within a range of discrepancy that corresponds to a match, the user would appropriately provide an input that the PRS data is accurate.

In the exemplary arrangement the user selections area 450 further includes a fail icon 454. In the exemplary arrangement the fail icon is selectable by user through a user input through an input device of a PMS terminal or other user device to indicate that the PRS data appears to be inaccurate. Selection of the fail icon 454 is operative to cause the RAS circuitry to store data in the at least one data store that is indicative that the PRS data is inaccurate. This may be an indication that further analysis of the building structures included on the parcel needs to be conducted. Further the exemplary user selections area 450 further includes a reviewed icon 456. The reviewed icon is selectable by user through at least one input through at least one input device of a PMS terminal or other user terminal to provide an indication that the data for the particular parcel has been reviewed. The receipt of such an input is operative to cause the RAS circuitry to store in correlated relation with the parcel data, information that the parcel has undergone review. Further as will be demonstrated herein in connection with other visual outputs the exemplary user selection area 450 may include the ability for a user to provide selections related to a work order output. Such selections may be utilized when the user wishes to cause a work order which may include instructions for further activity to be stored in at least one data store in connection with in the system. Such instructions may include certain investigation, review and/or analysis activities that are to be carried out related to the particular parcel and/or the structures thereon. Of course it should be understood that these approaches are exemplary and in other arrangements other approaches may be used.

Figure 29:
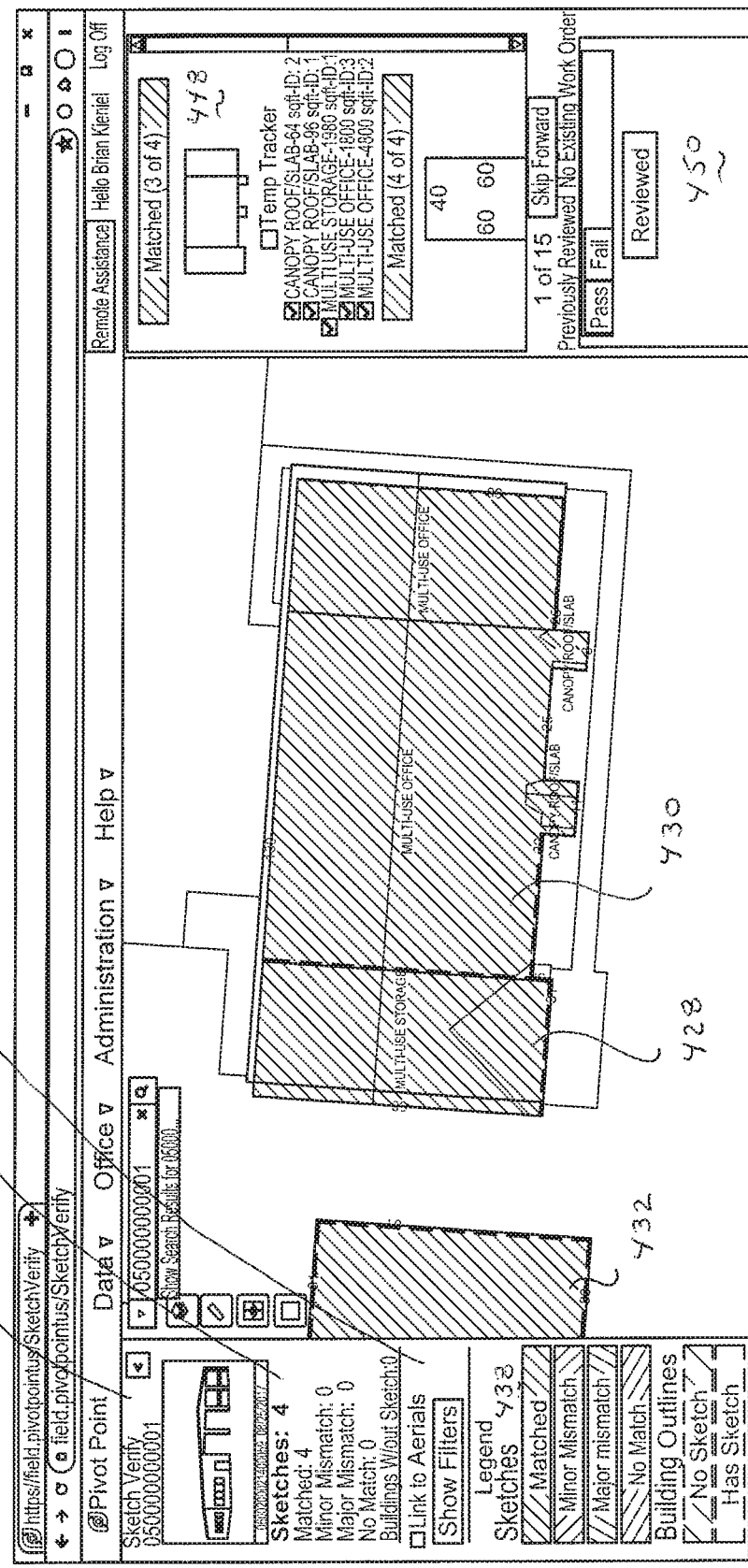

As represented in FIG. 29 the exemplary at least one visual output produced by the RAS circuitry corresponding to the parcel 426 includes the capability to enlarge or minimize the visual indicia included in various areas of the visual display output 424. As shown in FIG. 29, in the exemplary arrangement a user is enabled to enlarge selected areas of the display such as the graphical representation of the building 430 and the sketch data 428. As shown in the exemplary arrangement the enlargement of the graphic overhead representation shown causes the RAS circuitry to automatically include in the output representation, indicia corresponding to the dimensions associated with the external walls of the building outlines represented by the PRS sketch data. In the exemplary arrangements the RAS circuitry is further operative to include in overlying relation of the building structure, indicia corresponding to the structure type data for each of the particular areas that are subject to demarcation within the building structure based on the PRS data. Further the exemplary graphic output region 448 may include for the particular structure, the different areas included in the PRS data that are subject to separate demarcation and the type data and area in square feet associated with each. Of course this approach is exemplary and in other arrangements other approaches may be used.

Figure 30:
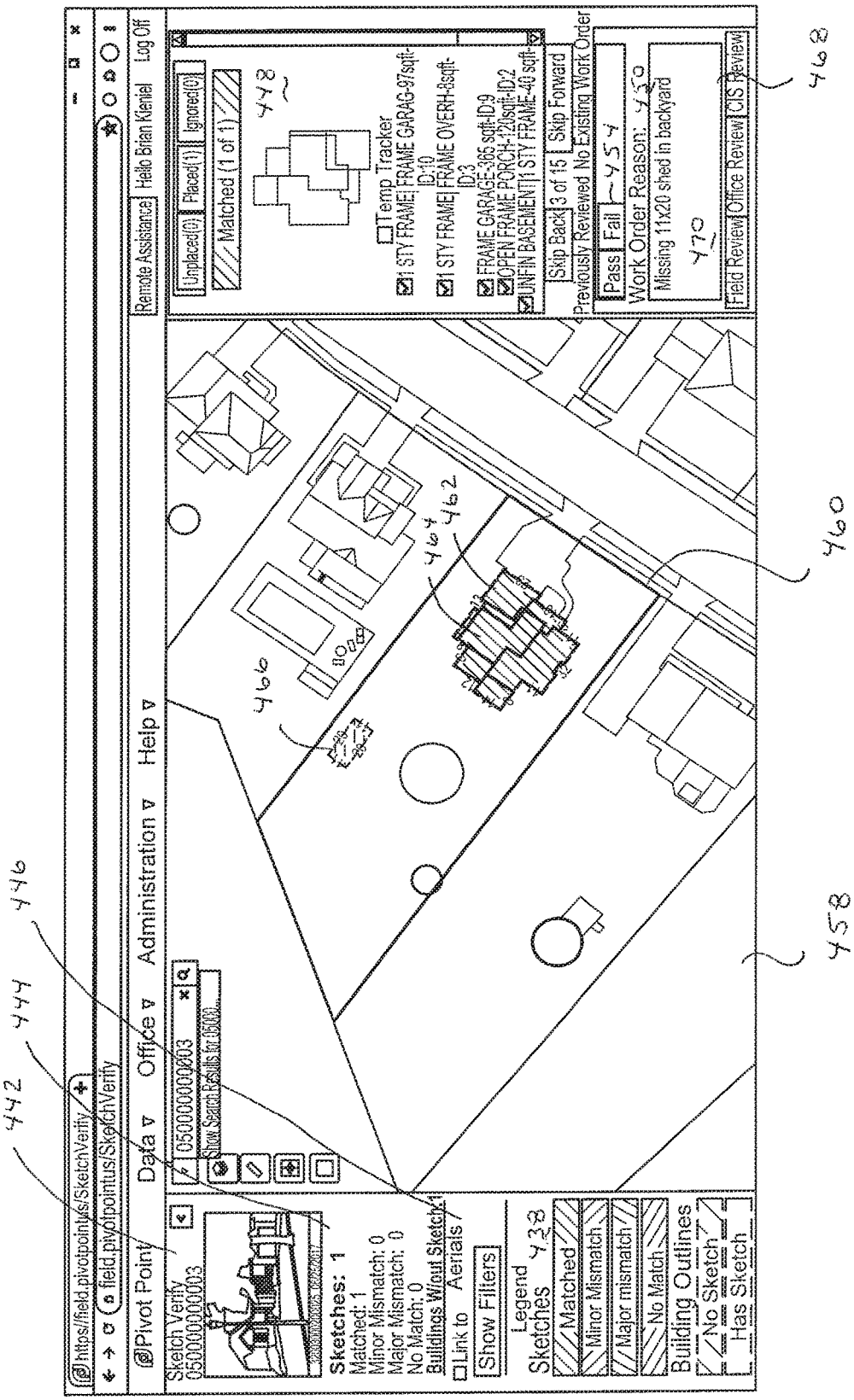

FIG. 30 corresponds to at least one visual display output 458 produced by the RAS circuitry for another parcel 460. Parcel 460 is shown with the boundary thereof in a distinctive color such that the boundary is visible against the background of the visual display output. The exemplary visual display output 458 includes a pictorial representation 442 of a horizontal ground level view of the parcel including a building structure thereon. Visual display output 458 further includes an output region 444, a selection region 446, and a legend 438 similar to those previously discussed in connection with visual display output 424. A graphic output region 448 as well as a user selections area 450 like those previously discussed are also included.

In the exemplary arrangement the RAS circuitry is operative to determine that a graphical representation of PRS sketch data 462 corresponds with a graphical representation of a building included in the GRS data 464 within a range of discrepancy that has been determined to correspond to a match. Also in this visual display output 458 it is indicated that the PRS sketch data includes numerous different areas of demarcation within the external walls of the building structure. These areas of demarcation are represented along with the area and building type data corresponding to each in the exemplary graphic output included in the graphic output region 448.

In this exemplary situation the visual display output 458 includes a visual representation of a building structure 466 for which there is no corresponding sketch data in the PRS data. The RAS circuitry is operative to include in overlying superimposed relation of the visual representation of this building structure, the visual indicia which is indicative of a no sketch determination for this building structure. As a result the RAS circuitry has produced the visual representation for which the un-sketched building structure includes visual indicia that is indicative of no sketch. As shown, the visual indicia placed in overlying relation of building structure 466 is indicated as one which corresponds to a no sketch determination in the legend 438. In the exemplary arrangement this visual representation includes indicia corresponding to at least one external wall dimension of the building 466 for which there is no corresponding PRS sketch data.

In this exemplary arrangement the RAS circuitry is operative to include the dimensions of the building structure for which there is no sketch in the visual display output corresponding to the building structure. The RAS circuitry is also operative to indicate that there is a building included on the parcel for which there is no sketch in the output region 444. This visual indicia is operative to enable the user reviewing the information to more easily determine that there is a problem associated with the PRS records for this particular parcel. Also as can be appreciated the user is enabled to make selections to enlarge the area in which the un-sketched building structure is found and also to provide inputs which may enable the user to view the building structure from different directions and angles so as to identify the nature or type of structure which is not currently found in the PRS data. In the exemplary arrangement if the user determines that the un-sketched building structure 466 is one that may need to be included in PRS data and made subject to taxation or other requirements, the user is enabled to provide at least one input corresponding to selection of the failed icon 454. In the exemplary arrangement the RAS circuitry is operative responsive to selection of the failed icon through the at least one input device to store in at least one data store, data indicative that the PRS data for the parcel is not accurate. Further in the exemplary arrangement responsive at least in part to the user input corresponding to the selection of the fail icon, the RAS circuitry is operative to cause the visual display output 458 to include at least one user selectable work order output 468. The user work order output includes a user populatable region 470. The user populatable region can be populated by the user providing user inputs through at least one input device, with work order or other instructions and/or information. The exemplary RAS circuitry is operative responsive to selection of the work order output and the work order instructions to generate a work order data record corresponding to a work order related to the parcel. The work order data is usable to facilitate the carrying out of activities to investigate, review, resolve and/or correct the discrepancy between the PRS sketch data and the GRS data. As represented in the Figure, in the user populated region 470 a user has provided inputs to indicate that there is a missing shed having the dimensions of 11'×20' in the backyard of the particular parcel. In the exemplary arrangement the user selectable work order output 468 further includes the ability for user to provide additional selectable icons 472 which are indicative of the particular type of reviews to be conducted in connection with the particular work order or other instructions or status data.

As can be appreciated the exemplary RAS circuitry may be operative to make the stored record data related to the particular parcel and the discrepancy available to other user terminals in operative connection with the system. This may include user terminals of review personnel who can carry out the work order activities. Further such personnel may undertake investigations, determine the nature of the unsketched structure and update the PRS data so as to correct any discrepancies. Of course it should be understood that this approach is exemplary and in other systems other arrangements may be used.

Figure 31:
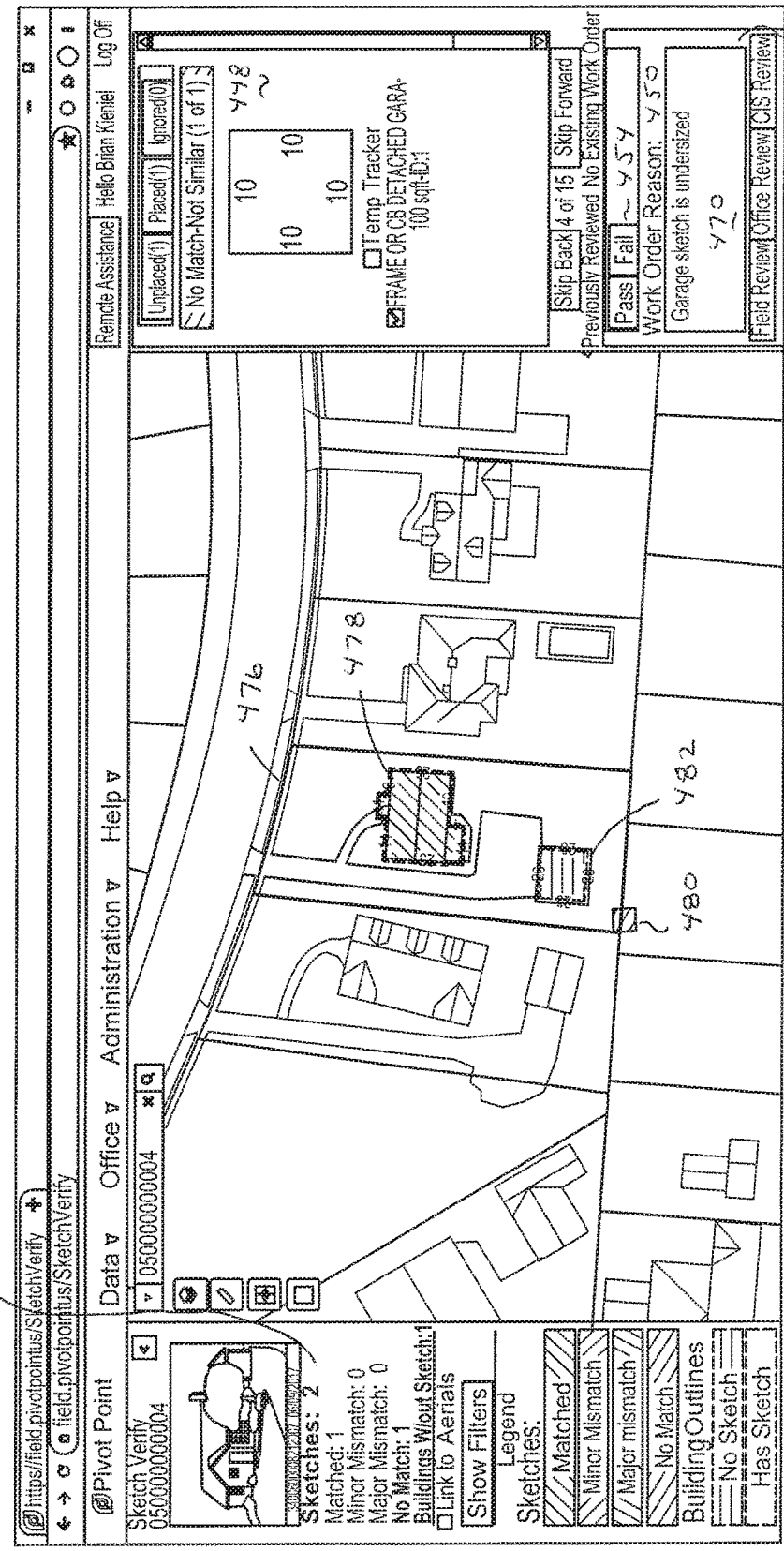

FIG. 31 includes a visual display output 474 of another parcel 476. In this exemplary arrangement the parcel 476 includes a graphic representation of a building 478 for which the RAS circuitry has made a match determination with regard to the PRS sketch data. However for this parcel the PRS data also includes data for a 10'×10' detached garage for which the RAS circuitry is not able to make a match determination within a range of at least a major mismatch. As a result the visual display output 474 includes in the output region 444 an indication that the at least one visual display output includes a building for which there is no matching sketch. Also the graphic output region 448 also includes an indication that there is no match for the PRS data corresponding to a garage building having an area of one hundred square feet. Further in this exemplary arrangement the exemplary RAS circuitry is operative to include in the at least one visual output, visual indicia 480 indicative of the no match determination. In this exemplary arrangement the visual indicia 480 is a transparent yellow polygon corresponding to the sketch data for which there is no match to a building in the GRS data. The RAS circuitry is operative to include the visual representation of the PRS sketch data 480 at the lower left corner of the parcel 476 as represented in the visual display output.

Also in the exemplary visual display output the RAS circuitry is operative to include a graphical representation of a building 482. The graphical representation of the building 482 is labeled to indicate that the building which is included in the GRS data does not correspond to any sketch that is included in the PRS data within at least the major mismatch level of correlation. As represented in the visual display output 474 the building 482 is substantially larger than a building that would correspond to the PRS sketch data for which no match has been found. Thus this situation may correspond to the presence of a garage or other structure on the property which is much larger than the dimensions included for the building that cannot be matched in the PRS sketch data.

In the exemplary arrangement the RAS circuitry is operative to include in the output region 444, indicia which is indicative that there is sketch data in the PRS data for which no match could be made in the GRS data. The output region further includes indicia that the parcel includes GRS data corresponding to a building which does not have corresponding sketch data in the PRS data. The graphic output region 448 also includes an indication of the particular sketch data which does not have a match in the PRS data.

In this exemplary arrangement the user is enabled to provide at least one input selecting the failed icon 454 to indicate that there is a discrepancy between the PRS sketch data and the GRS data. The user is further enabled to select the selectable work order output and include information in the user populated region 470 indicative of the work order instructions. The user is also enabled to provide inputs through at least one input device which correspond to the selectable work order options 472. The exemplary RAS circuitry is operative responsive to the user inputs to generate work order record data indicative of the work order instructions which can be used in a manner like that previously discussed to carry out activities to remedy the discrepancy.

Figure 32:
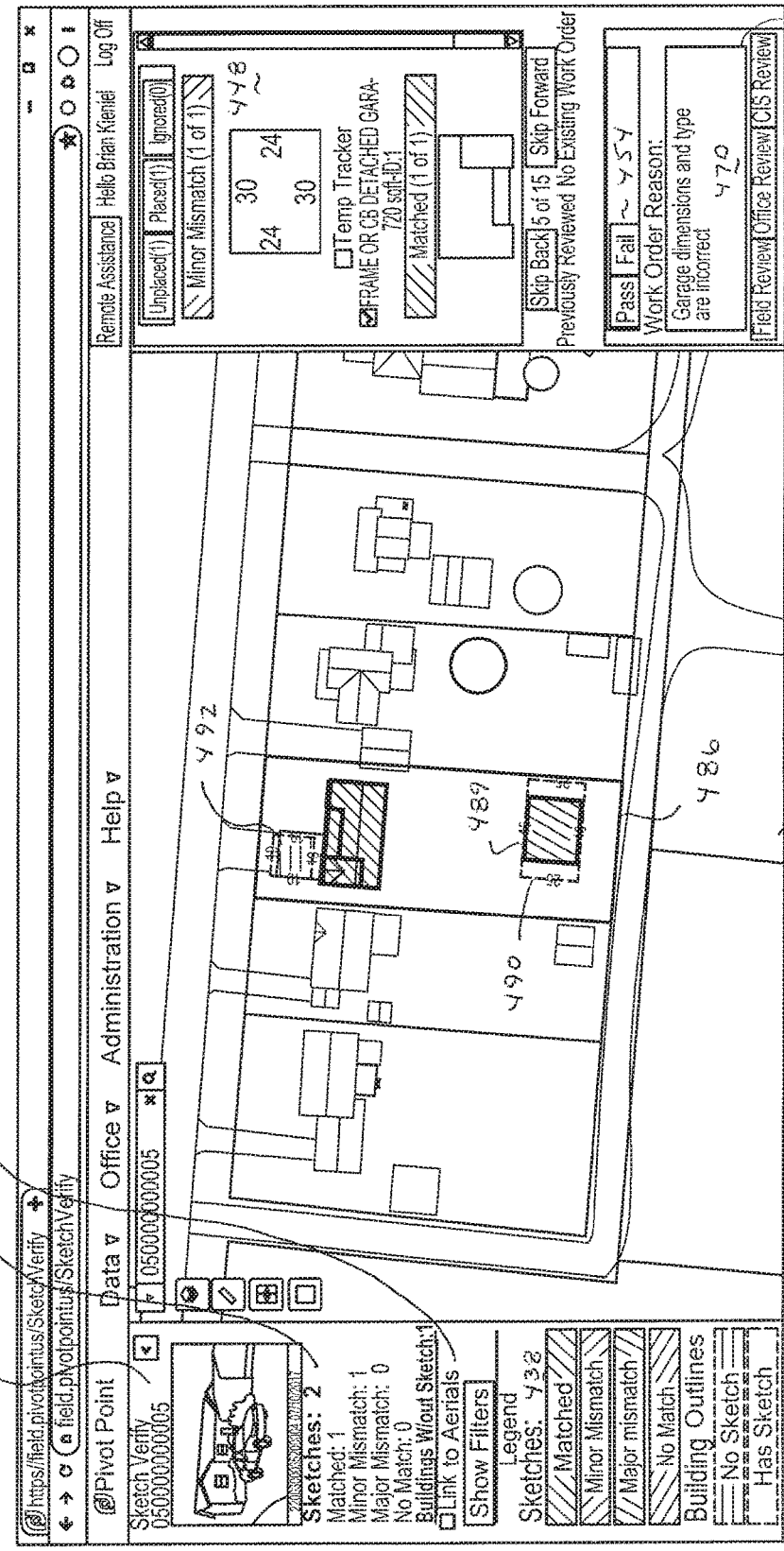

FIG. 32 shows a further visual display output 484 that includes a visual representation of a parcel 486. The parcel 486 includes a graphic representation of a building structure 488 included in the GRS data which corresponds to PRS sketch data within a match range of discrepancy and the RAS circuitry has made a match determination thereof. This match determination is reflected in the indicia presented in the visual display output 484 in overlying relation of the structure 488 as well as in the indicia in the output region 444 and the graphical output region 448.

In this exemplary visual display output the RAS circuitry has made a minor mismatch determination between PRS sketch data represented graphically 489 and a graphic representation of a building structure 490 included in the GRS data. As the RAS circuitry has determined that the outline corresponding to the sketch data 488 is within the set minor mismatch range of discrepancy for the mismatched building structure 490, the RAS circuitry is operative to include the visual indicia indicated in the legend 438 in connection with the representation of the sketch data. In the exemplary arrangement the RAS circuitry is operative to include the distinctive transparent color associated with a minor mismatch in overlying superimposed relation of the graphic representation of the PRS sketch data. Further the output region 444 and the graphic output region 448 include indicia indicative of PRS data for which there is a minor mismatch. Such indications are useful in bringing the reviewing user's attention to the particular discrepancy between the PRS sketch data and the GRS data.

Further in this exemplary visual display output 484 it is indicated that the RAS circuitry has been operative to identify a building structure 492 included in the GRS data for which there is no corresponding PRS sketch data. Such a building portion without a sketch may indicate an addition to a building that has not been reflected in the PRS sketch data. However in this particular visual display output, a reviewing user operating a PMS terminal or other terminal is enabled to review the pictorial representation 442 of the building to which the building 492 is attached. Further in this exemplary arrangement the user is enabled to make selections in the selection region 446 to view the building 492 from different angles and determine its character. In this particular example building 492 is a carport which is ignored for purposes of the PRS data. Thus by providing user inputs to the PMS terminal or other terminal, the user is enabled to determine that the building 492 may be ignored.

In the exemplary arrangement the PMS terminal user is enabled to provide at least one input to at least one input device corresponding to selection of the failed icon 454 and selection of the user selectable work order output 468 to cause the RAS circuitry to store data which is indicative that the PRS data for the parcel is inaccurate and to generate a work order data record including the work order instructions in the user populated region 470 and with instructions corresponding to at least one of the user selectable work order icons 472. Thus in this exemplary arrangement the RAS circuitry is enabled to limit the need for work order activity to discrepancies that could not be resolved by the user through operation of the RAS circuitry.

Figure 33:
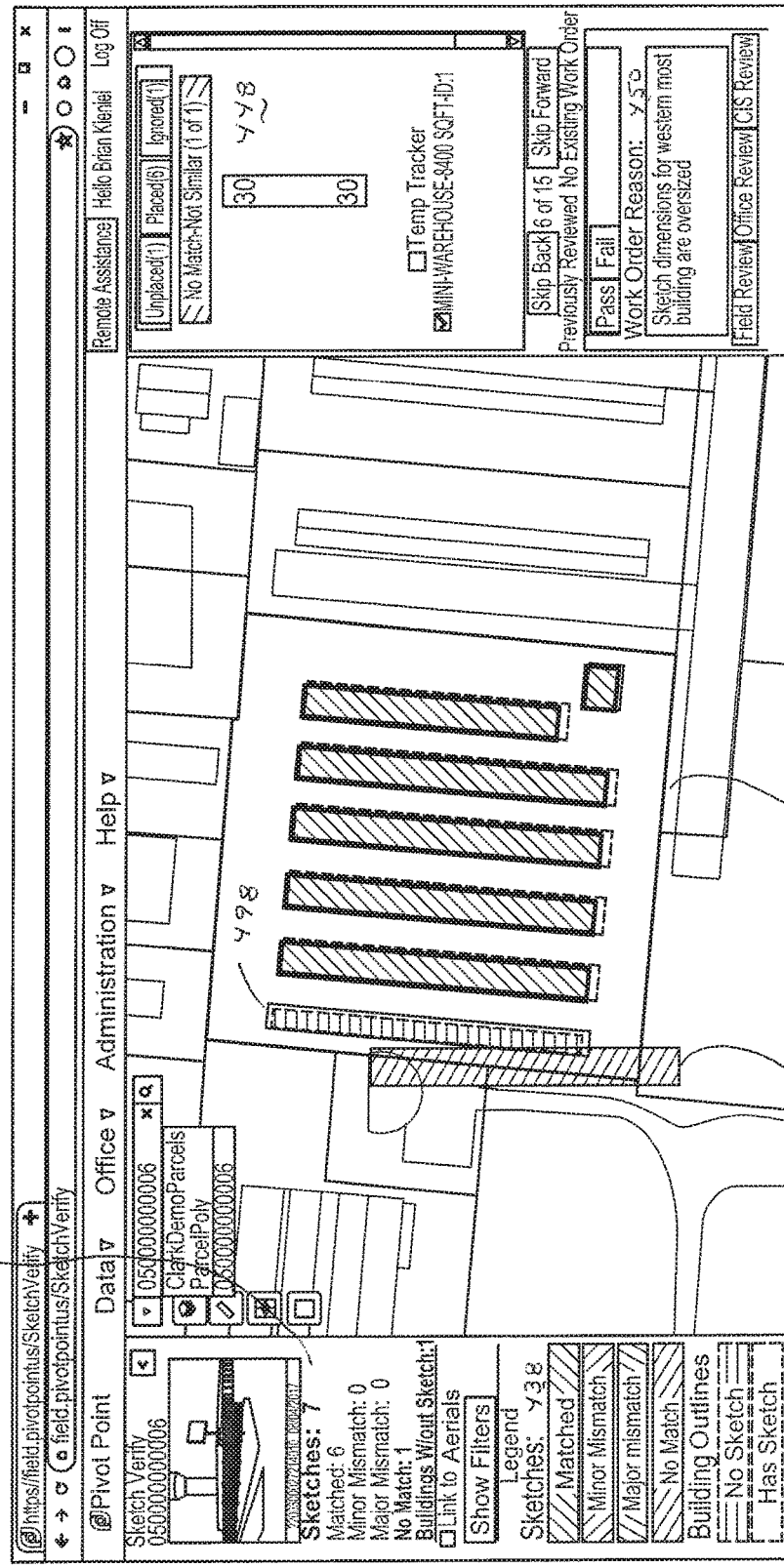

FIG. 33 includes a graphical representation of a visual display output 494. The visual display output 494 includes a visual representation of a parcel 496 for which the parcel boundary is shown in a distinct contrasting color. In this exemplary output the RAS circuitry includes indicia in the visual output which indicates that six building structures included in the PRS sketch data and in the GRS data correspond within the set match range of discrepancy so that the PRS sketch data and GRS data for the respective structures are matched. The match determinations for the six structures are indicated through the colored boundaries and transparent overlays indicative of a match as indicated in the legend 438. The output region 444 and the graphic output region 448 also provide indicia which indicate that PRS sketch data for six structures match structures included in the GRS data.

In this exemplary visual display output it is further indicated that PRS sketch data for one structure was unable to be matched with any building structure in the GRS data within at least a set major mismatch range of discrepancy. Indicia reflecting that there is no match for one structure in the PRS data is indicated in the indicia in both the output region 444 and the graphic output region 448. The RAS circuitry is further operative to cause the output visual indicia corresponding to the unmatched sketch data through the at least one visual display. The unmatched sketch data is represented through a transparent yellow colorized outline 496 which is rendered in the visual output in the lower left-hand corner in the same common scale of the parcel in a manner like that previously discussed.

Further in this visual output visual, indicia is presented in overlying relation of a graphic representation of a building 498 for which the RAS circuitry was unable to correlate any sketch data within at least the major mismatch range of discrepancy. The RAS system circuitry is operative to cause the output of visual indicia corresponding to the no sketch determination as represented in the legend 438 in overlying superimposed relation with the graphic representation of the building 498. The output region 444 includes indicia indicative that the visual output includes a building for which there is no corresponding sketch data.

From the review of the visual display output 494 a user reviewing the indicia presented through a PMS terminal or other user terminal would be notified of the PRS sketch data for which there is no match as well as the GRS building data which does not have a corresponding sketch. The configurations indicated for the PRS sketch data and the building data would likely cause a reviewing user to quickly understand that the discrepancy is that the building 498 was recorded in the PRS data as having a substantially larger width dimension than the actual width dimension. This may result because the missing sketch has a similar width dimension to five other buildings for which the PRS sketch data matched the GRS data. Thus the user is enabled to provide the necessary inputs in a manner like that previously discussed in the user selections area 450 to cause the RAS circuitry to store at least one data record indicative that the PRS data for the parcel is inaccurate and to store data corresponding to a work order record with instructions that can be performed in order to correct the discrepancy. Of course this approach is exemplary and in other arrangements other approaches may be used.

Figure 34:
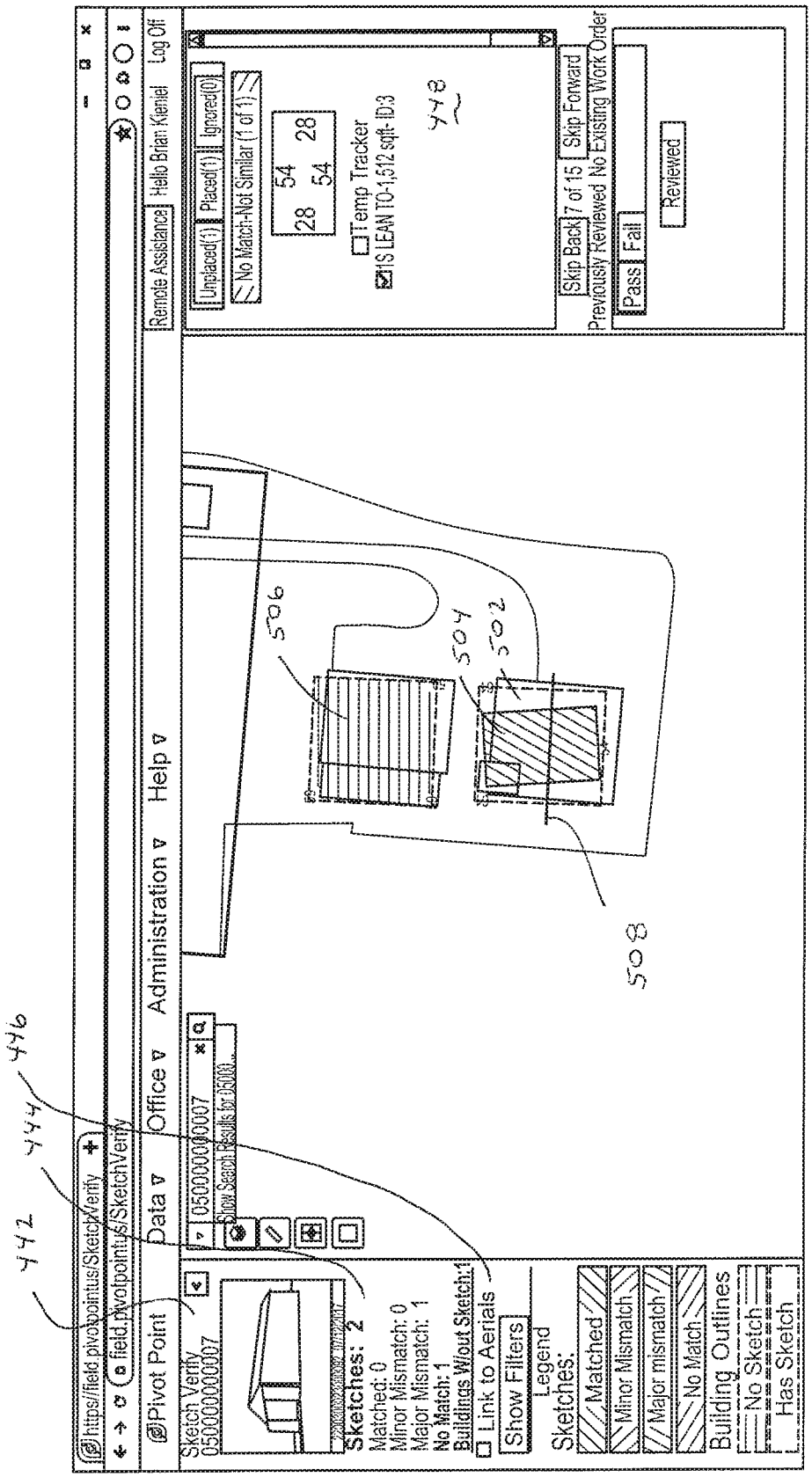

FIG. 34 shows a further visual display output 500. In the situation corresponding to visual display output 500 the RAS circuitry has determined that there is one building 502 in the GRS data which corresponds to the outline 504 corresponding to PRS sketch data with a level of discrepancy that is within the range of a major mismatch. The RAS circuitry further has determined that there is one building 506 in the GRS data for which there is no corresponding PRS sketch data. Further the RAS circuitry has determined that there is sketch data in the PRS data for which there is no match in the GRS data. This information is indicated in the indicia in the output region 444.

In this exemplary arrangement it is indicated in the output indicia from the graphic output region 448 that the sketch data for which there is no matching GRS data is a lean to structure that is attached to another structure. From the pictorial representation 442 it is apparent that the structures involved are barns or other agricultural storage buildings. As can be appreciated, a user operating a PMS terminal is enabled to view the georeferenced oblique aerial imagery information that is accessible by providing inputs in the selection region 446 to view images of the structures from different angles and directions, and to make a determination as to the nature of the buildings. By providing inputs through input devices of the user terminal the user is enabled to provide inputs to adjust the location of the sketch data in the visual display output. In this case the reviewing user is enabled to determine that the building 502 shown in the GRS data corresponds to the sketch data 504 for which there is a major mismatch, and also to the lean to structure for which there is no match. In the exemplary arrangement the user is enabled to divide the building structure 502 as viewed in the overhead view through placement of a cut line 508 on the visual representation of the building. With the placement of the cut line, the RAS circuitry may then operate to reevaluate the determination for the parcel. As can be appreciated, when the extracted PRS data and GRS data is run again with the cut line to indicate that building 502 is actually two separate structures, the PRS sketch data which previously had a major mismatch and no match will much more closely corresponds to the two portions of this building. Building 506 will remain without a corresponding sketch and may be subject to placement of a work order record in a manner like that previously discussed if the user is unable to determine that building 506 is a structure which is not of interest because it is exempt from taxation or other purposes of the evaluation.

Figure 35:
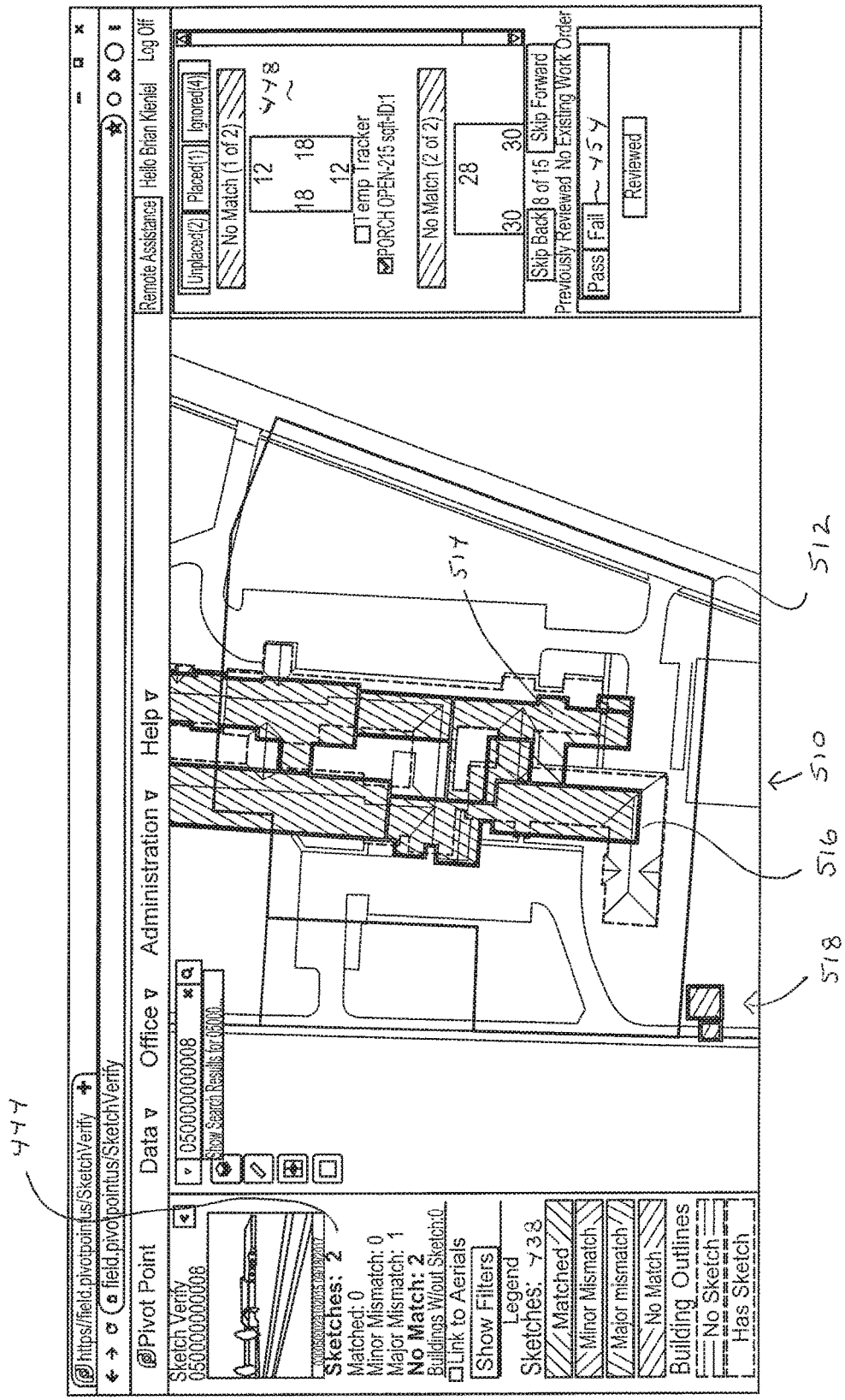

FIG. 35 corresponds to a visual display output 510 which shows an overhead view of a parcel 512. Visual display output 510 shows a building 514 that is included in the GRS data. The building 514 corresponds to the PRS sketch data with a major mismatch range of discrepancy. This is indicated through operation of the RAS circuitry in the visual display output 510 by the corresponding colored outline of the sketch data 516 and the coloration of the sketch outline in the overlying transparent color that corresponds to a major mismatch as indicated in the legend 438. Further in this exemplary output as shown in the output region 444, there are two sketches in the PRS data for which there are no matching building structures in the PRS data. As represented in the graphic output region 448 the outlines and dimensions corresponding to the PRS sketch data for which there are no corresponding building structures, and that the structure type data corresponding to each of the missing sketches is indicated. Further in this exemplary arrangement the RAS circuitry has operated to cause the visual display output 510 to include visual representations 518 of the two structures in the PRS sketch data for which there are no matching building structures in the GRS data, in the lower left-hand corner of the parcel as shown. The visual representations of the missing sketch data are presented with the coloration corresponding to sketches for which there is no match as indicated in the legend area 438.

As can be appreciated the visual display output 510 is presented with indicia to indicate to the user of a PMS terminal or other user terminal reviewing the PRS data, that there are errors in the PRS sketch data such that the building shown in the PRS data only corresponds within a major mismatch range of discrepancy with the GRS data. The user will be alerted that an area of building 514 in the lower left portion of the parcel as shown, is not indicated in the PRS data. The user of the PMS terminal in some arrangements may be able to review the structural information to determine the exact nature of the deficiencies. However in most situations the user will provide an input to cause selection of the fail icon 454 to cause the RAS circuitry to record that the PRS data for the parcel is inaccurate, and will cause the generation of the work order output in a manner like that previously discussed. Such inputs will cause the RAS circuitry to generate a work order record which will indicate and cause the activities necessary to update and correct the PRS data. Of course it should be understood that these approaches are exemplary and in other arrangements other approaches may be used.

Figure 36:
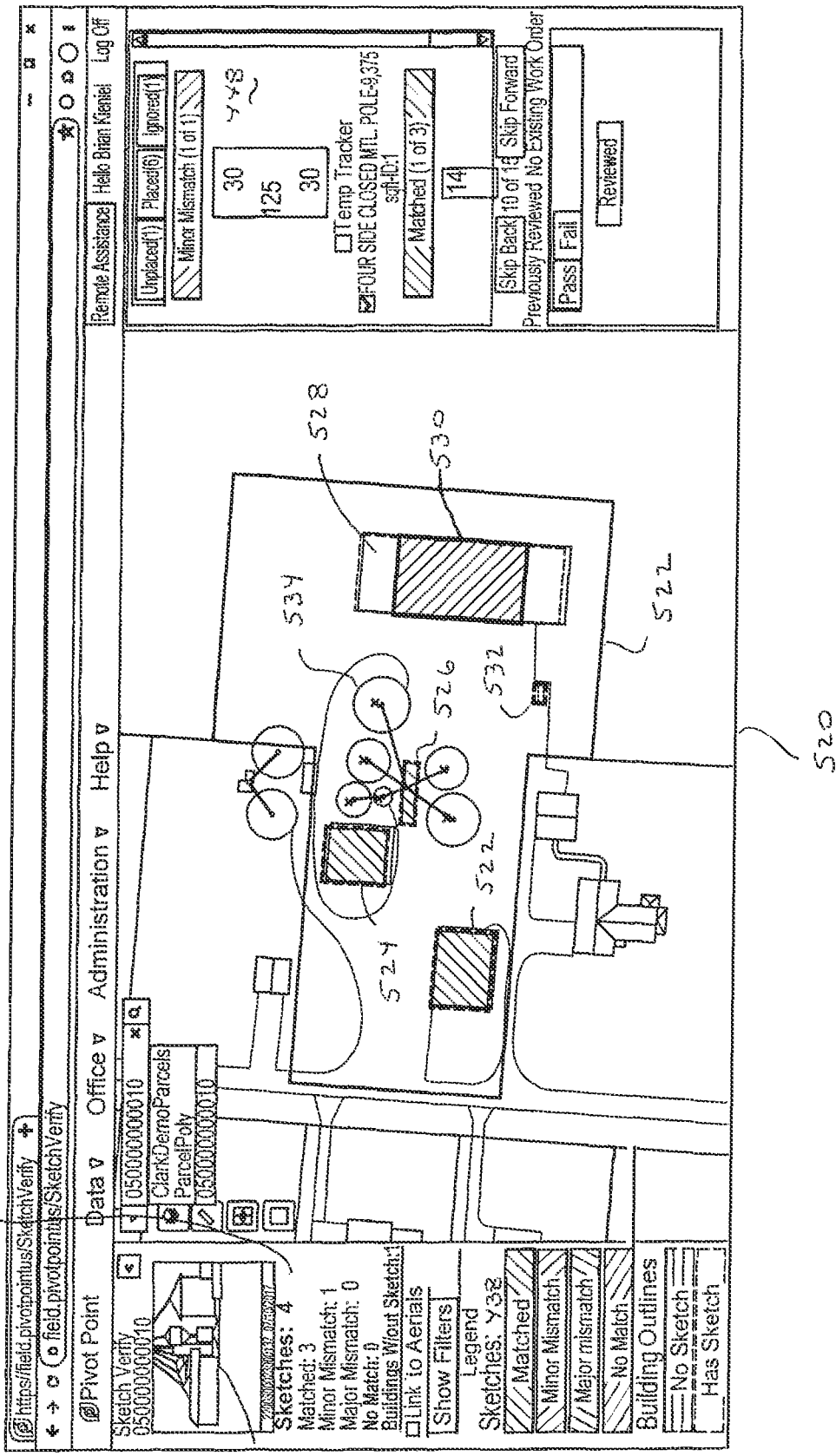

FIG. 36 shows a visual display output 520 produced through operation of the RAS circuitry and which includes a visual outline of a parcel 522. In this exemplary visual output the RAS circuitry has indicated via the visual indicia that three buildings represented in the GRS data 522, 524 and 526 correspond to PRS sketch data within the match range of discrepancy. As a result the RAS circuitry is operative to cause the visual output 522 to include the PRS sketch data in overhead superimposed relation with the building outlines in the coloration that corresponds to a match as indicated in the legend 438. The indication that there are three matched sketches is further indicated in the indicia included in the output region 444.

In this arrangement the RAS circuitry has determined that another building 528 corresponds to the outline resolved from the PRS sketch data 530 within a minor mismatch range of discrepancy. This is indicated in the visual display output 520 by the coloration of the sketch outline 530 and the overlying transparent coloration within the outline that corresponds to the minor mismatch designation in the legend 438. Further the graphic output region 448 includes the representation of the PRS sketch data with the dimensions thereof for which the minor mismatch determination has been made.

The visual display output 520 further includes a visual representation of a building 532 for which there is no PRS sketch data which corresponds to a match within at least the major mismatch range. The RAS circuitry is operative to cause the building 532 to be in overlying relation therewith along with the visible indicia indicative that there is no sketch in the PRS data corresponding to this building. Indicia indicative that there is a building in the visual output for which there is no corresponding sketch data is also indicated in the indicia presented in the output region 444.

In this exemplary arrangement the PRS data also indicates that there are six structures included on the parcel that were ignored for purposes of the analysis. In the exemplary arrangement the fact that there are six structures that are ignored is indicated in the graphic output region 448. Each of the structures 534, which in this arrangement correspond to silos, are marked with graphic indicia (an X) indicative that the structure is to be ignored for purposes of the analysis. Thus the exemplary RAS circuitry is operative to distinguish between the different shapes of structures that need to be considered for purposes of the particular analysis and those that do not, based on the information that is included in the PRS data. As a result, in this case an operator of a PMS terminal or other user terminal reviewing the information is enabled to determine the need to provide inputs through at least one input device that causes the RAS circuitry to generate at least one record indicative that the PRS data for this parcel is inaccurate. and the user is also enabled to provide inputs so as to cause one or more work order data records to be generated in at least one data store so as to cause the work order to be generated for further activity and analysis related to this particular parcel.

Of course it should be understood that the capabilities and functions of the RAS circuitry as represented herein are merely examples of the capabilities that may be provided by such circuitry for purposes of determining whether there are discrepancies between PRS data and GRS data. In other exemplary arrangements RAS circuitry may be operative in accordance with its circuit executable instructions to provide different or other types of outputs that can be utilized by operators to identify discrepancies and to take actions as appropriate for purposes of evaluation and analysis of data bearing records to provide updates and ensure their accuracy. Numerous additional functions and capabilities may be implemented in connection with such exemplary systems.

In exemplary arrangements the RAS circuitry may be operative responsive to the work order records to facilitate the resolution of issues related to the PRS data and the GRS data. For example in some exemplary arrangements the RAS circuitry may operate in accordance with its circuit executable instructions to generate messages to terminal devices associated with users who may carry out certain activities that are indicated as needed in the work order records. For example, an employee or contractor working for the taxing jurisdiction may be assigned a group of parcels located in a geographic area to carry out reviews consistent with the work order instruction records. Thus in exemplary arrangements the individual responsible for field review may receive assignments to complete the work order activities within a given area. Further in exemplary arrangements the RAS circuitry may receive messages from the individual's terminal indicative of parcel information, structure data, location data, building type data and other types of data that may be usable to update the PRS record data. In some exemplary arrangements the RAS circuitry or systems connected thereto may also be operative to track the terminal device of the user to facilitate guiding the user to the location where the PRS records have a discrepancy and/or recording locations of different building structures which are determined through the actions of the individual. This may include for example point data and dimensions for structures to be evaluated, and point data for structures that are to be ignored. User terminals may also provide information as to the type of structures and other types of information that can be collected and provided through inputs to the user terminal. In exemplary arrangements such information may be communicated wirelessly in the at least one network 44 so as to enable the appropriate data stores in operative connection with the RAS circuitry to receive and store such data.

Further in exemplary arrangements the RAS circuitry may operate to track the related work order activities and the receipt of additional data related to different parcels. The RAS circuitry may operate in accordance with its circuit executable structures to notify other individuals through their user terminals that updated data has been received and is ready for review. Such individuals may review the data received responsive to the work order and added to the work order to record data to determine if it is usable to correct discrepancies in the PRS data. Such individuals may have authority to access the stored data included in connection with the PRS records and to make changes and corrections therein. Further in exemplary arrangements the RAS circuitry may be operative once corrections have been proposed to PRS data, to further communicate with terminal devices of individuals who are required to approve changes and apply them to the stored system data. Additionally the RAS circuitry may operate in conjunction with other systems to generate notices to owners of parcels or other individuals concerning updates and corrections that have been made to the records pertaining to such parcels. Of course these particular functions are exemplary and in other arrangements numerous different types of functions may be carried out through operation of the RAS circuitry and related systems.

Thus it will be appreciated the exemplary system controlled responsive to data bearing records achieves useful results, eliminates difficulties encountered in the use of existing systems and attains the useful and beneficial capabilities described herein.

In the foregoing description certain terms have been used in describing exemplary embodiments for purposes of brevity, clarity and understanding. However, no one necessary limitations are to be implied therefrom because such terms are used for descriptive purposes and are intended to be broadly construed. Moreover the descriptions and illustrations herein are by way of examples in the new and useful concepts are not limited to the exact features that are shown and described.

Further in the following claims any feature described as a means for performing a function shall be construed as encompassing any means known to those skilled in the art as being capable of carrying out the recited function, and shall not be deemed limited to the particular means shown or described for performing the recited function in the foregoing description, or mere equivalents thereof.

Having described features, discoveries and principles utilized in the exemplary embodiments, the manner in which they are constructed and operated, and the advantages and useful results attained, the new and useful structures, devices, elements, arrangements, parts, combinations, systems, equipment, operations and methods, processes and relationships are set forth in the appended claims.

We claim:

1. Apparatus that operates to provide a graphical user interface comprising:
   record analysis system (RAS) circuitry, wherein the RAS circuitry is in operative connection with at least one data store,
   wherein the at least one data store includes
      property record system (PRS) data, wherein the PRS data includes
         parcel data corresponding to a plurality of real estate parcels,
            wherein the parcel data for a respective parcel includes sketch data comprising dimensions and relative directions of the external walls of a building structures of record in the parcel data as being located on the respective parcel,
      georeferenced record system (GRS) data, wherein the GRS data includes
         image data corresponding to visual overhead images of the plurality of real estate parcels
            wherein the image data for a respective parcel includes data representative of an overhead image of an imaged building structures located on the respective parcel,
   wherein the RAS circuitry is operative responsive at least in part to
      the PRS data,
      the GRS data, and
      receipt of at least one signal corresponding to at least one user parcel selection input through an input device in operative connection with the graphical user interface, wherein the at least one signal is indicative of a user selected parcel,
   to cause
      through use of the sketch data associated with the building structure of record in the parcel data for the user selected parcel, generation of first data that corresponds to a visual representation of an overhead outline of the building structure of record as being on the user selected parcel,
      through use of the image data associated with the imaged building structure located on the user selected parcel in the GRS data, generation of second data that corresponds to a visual representation of an overhead view of the building structure located on the user selected parcel,
      through use of the first data and the second data, a match determination to be made indicative that sketch data for the building structure of record as being on the user selected parcel in the PRS data, corresponds within a set match range of discrepancy, with image data corresponding to the visual overhead image of the imaged building structure located on the user selected parcel,
      responsive at least in part to the match determination and through use of the first data and the second data, signals to be generated that cause the graphical user interface to output a visual display output that includes
         the visual representation of the overhead outline of the building structure of record as being on the user selected parcel and the visual representation of the overhead view of the matched imaged building structure located on the user selected parcel,
      wherein the visual display output includes
         the visual representation of the overhead outline of the building structure of record presented in a first visual format,
         the visual representation of the overhead view of the matched imaged building structure presented in a second visual format that is visually different from the first visual format,
         the visual representation of the overhead outline and the overhead view in superimposed relation and in a common scale, and
         first visual indicia indicative of the match determination.

2. The apparatus according to claim 1
   wherein the RAS circuitry is further operative responsive at least in part to the PRS data and the GRS data corresponding to the user selected parcel to cause
      a minor mismatch determination to be made indicative that further sketch data for a further building structure of record as being on the user selected parcel in the PRS data, corresponds within a set minor mismatch range of discrepancy, with image data representative of an overhead image of a minor mismatched building structure located on the user selected parcel included in the GRS data, responsive at least in part to the minor mismatch determination, the visual display output to include a second visual representation corresponding to an overhead view of the minor mismatched building structure in the second visual format, and a visual representation of a further overhead outline corresponding to the further sketch data in the first visual format, in superimposed relation and in the common scale, and wherein the second visual representation includes second visual indicia that is visually different from the first visual indicia and indicative of the minor mismatch determination.

3. The apparatus according to claim 2
wherein the RAS circuitry is further operative responsive at least in part to the PRS data and the GRS data for the user selected parcel to cause
a major mismatch determination to be made indicative that additional sketch data for an additional building structure of record as being on the user selected parcel in the PRS data corresponds within a set major mismatch range of discrepancy, with image data representative of an overhead image of a major mismatched building structure located on the user selected parcel included in the GRS data, responsive at least in part to the major mismatch determination, the visual display output to include a third visual representation corresponding to an overhead view of the major mismatched building structure in the second visual format, and a visual representation of an additional overhead outline corresponding to the additional sketch data in the first visual format, in superimposed relation and in the common scale, and wherein the third visual representation includes third visual indicia that is visually different from the first and second visual indicia and indicative of the major mismatch determination.

4. The apparatus according to claim 3
wherein the RAS circuitry is further operative responsive at least in part to the PRS data and the GRS data corresponding to the user selected parcel to cause
a no match determination to be made indicative that other sketch data for an other building structure of record as being on the user selected parcel in the PRS data does not correspond to any image data representative of any image of any building structure located on the user selected parcel included in the GRS data within the major mismatch range of discrepancy or less, responsive at least in part to the no match determination, the visual display output to include a fourth visual representation corresponding to at least a portion of the user selected parcel and a visual representation of another overhead outline corresponding to the other sketch data in the common scale, wherein the fourth visual representation includes fourth visual indicia that is visually different from each of the first, second and third visual indicia and indicative of the no match determination for the other building structure of record on the user selected parcel.

5. The apparatus according to claim 4
wherein in the visual display output, the fourth visual representation is at least one of
disposed away from any visual representation of an overhead image of any building structure located on the user selected parcel included in the GRS data, and
transparent such that a visual representation of a building structure located on the user selected parcel included in the GRS data is visible therethrough.

6. The apparatus according to claim 4
wherein the RAS circuitry is further operative to cause
responsive at least in part to the PRS and GRS data for the user selected parcel to make a plurality of no match determinations indicative that a plurality of other sketch data for a plurality of respective other building structures of record as being on the user selected parcel in the PRS data, each do not correspond to any image data for f any building structure located on the user selected parcel included in the GRS data, responsive at least in part to each no match determination, the visual display output to include a respective fourth visual representation in the display output,
wherein in the visual display output each of the plurality of fourth visual representations is disposed away from any other fourth visual representation.

7. The apparatus according to claim 4
wherein the RAS circuitry is further operative responsive at least in part to the PRS data and the GRS data for the user selected parcel to cause
a no sketch determination to be made indicative that image data for an unsketched building structure located on the user selected parcel in the GRS data, does not correspond to any sketch data for any building structure of record as being on the user selected parcel in the PRS data, within the major mismatch range of discrepancy or less,
responsive at least in part to the no sketch determination, the visual display output to include a fifth visual representation corresponding to an overhead image of at least a portion of the user selected parcel and the unsketched building structure,
wherein the fifth visual representation includes fifth visual indicia that is visually different from each of the first, second, third and fourth visual indicia and indicative of the no sketch determination.

8. The apparatus according to claim 7
wherein the RAS circuitry is further operative to cause the visual display output to include for the user selected parcel, indicia indicative of a number of buildings for which there is sketch data of record as being on the user selected parcel in the PRS data, and a first number of building structures of record as being on the user selected parcel in the PRS data for which the RAS circuitry has made a match determination.

9. The apparatus according to claim 8
wherein the RAS circuitry is further operative to cause the visual display output to include for the user selected parcel, indicia indicative of a second number of building structures of record as being on the user selected parcel in the PRS data for which the RAS circuitry has made a minor mismatch determination, a third number of building structures of record as being on the user selected parcel in the PRS data for which the RAS circuitry has made a major mismatch determination, and a fourth number of building structures of record as being on the user selected parcel in the PRS data for which the RAS circuitry has made a no match determination.

10. The apparatus according to claim 8 wherein the RAS circuitry is further operative to cause the visual display output for the user selected parcel to further include indicia indicative of a number of building structures located on the user selected parcel for which there is image data in the GRS data, for which there is a no sketch determination.

11. The apparatus according to claim 10 wherein the RAS circuitry is further operative to cause the visual display output for the user selected parcel to further include indicia corresponding to a legend, wherein the legend includes an identifying indication for the first visual indicia, the second visual indicia, the third visual indicia, the fourth visual indicia and the fifth visual indicia.

12. The apparatus according to claim 11 wherein in the visual display output, the visual representation corresponding to of at least one of the sketch data, the further sketch data, and the additional sketch data, includes at least one external wall dimension.

13. The apparatus according to claim 12 wherein the fifth visual representation includes at least one external wall dimension of the unsketched building structure.

14. The apparatus according to claim 13 wherein the visual display output includes a geometric figure corresponding to respective sketch data for a building structure of record as being on the user selected parcel, and dimensions for the respective building structure for which a no match determination is made.

15. The apparatus according to claim 1 wherein the visual display output includes at least one selectable work order output, wherein selection of the at least one selectable work order output through at least one input device in operative connection with the graphical user interface, is operative to cause the RAS circuitry to generate data corresponding to a work order record with regard to the user selected parcel.

16. The apparatus according to claim 1 wherein the visual display output includes at least one selectable work order output, wherein selection of the at least one selectable work order output through at least one input device in operative connection with the graphical user interface, is operative to cause the RAS circuitry to generate data corresponding to a work order record with regard to the user selected parcel, wherein the at least one selectable work order output includes a user populatable region, wherein the region is populatable by inputs through the at least one input device, with work order instructions that are included in the work order record.

17. The apparatus according to claim 1 wherein the visual display output includes at least one selectable input icon, wherein selection of at least one selectable input icon through at least one input device in operative connection with the graphical user interface is operative to cause the RAS circuitry to store data in at least one data store indicative that the PRS data of the user selected parcel is accurate.

18. The apparatus according to claim 1 wherein the visual display output includes a horizontal ground level pictorial representation of at least a portion of the user selected parcel.

19. The apparatus according to claim 1 wherein the PRS data includes structure type data in correlated relation with respective sketch data for the building structure of record as being located on the respective parcel, and wherein the RAS circuitry is further operative to cause the visual display output to include type indicia corresponding to the structure type data correlated with the visual representation of the overhead outline.

20. The apparatus according to claim 1 wherein the visual display output includes a geometric figure with at least one dimension thereon corresponding to the sketch data of the building structure of record as being on the user selected parcel, and that is not in superimposed relation with the matched building structure.

21. The apparatus according to claim 1 wherein the RAS circuitry is further operative responsive at least in part to the PRS data and the GRS data corresponding to the user selected parcel to cause a no match determination to be made indicative that other sketch data for an other building structure of record as being on the user selected parcel in the PRS data, does not correspond to any image data representative of any image of any building structure located on the user selected parcel included in the GRS data, responsive at least in part to the no match determination, the visual display output to include a further visual representation corresponding to at least a portion of the user selected parcel and a visual representation of another overhead outline corresponding to the other sketch data in the common scale, wherein the further visual representation includes further visual indicia that is visually different from the first visual indicia and indicative of the no match determination for the other building structure of record as being on the user selected parcel.

22. The apparatus according to claim 1 wherein the RAS circuitry is further operative responsive at least in part to the PRS data and the GRS data for the user selected parcel to cause a no sketch determination to be made that image data for an unsketched building structure located on the user selected parcel in the GRS data, does not correspond to any sketch data for any building structure of record as being on the user selected parcel in the PRS data, responsive at least in part to the no sketch determination, the visual display output to include a further visual representation corresponding to an overhead image of at least a portion of the user selected parcel and the unsketched building structure, wherein the further visual representation includes further visual indicia that is visually different from the first visual indicia and indicative of the no sketch determination.

23. The apparatus according to claim 1 wherein the RAS circuitry is further operative responsive at least in part to the PRS data and the GRS data for the user selected parcel to cause a no sketch determination to be made that image data for an unsketched building structure located on the user selected parcel in the GRS data, does not correspond to any sketch data for any building structure of record as being on the user selected parcel in the PRS data, responsive at least in part to the no sketch determination, the visual display output to include a further visual representation corresponding to an overhead image of at least a portion of the user selected parcel and the unsketched building structure and dimensions of the unsketched building structure, wherein the further visual representation includes further visual indicia that is visually different from the first visual indicia and indicative of the no sketch determination.

24. The apparatus according to claim 1
wherein the RAS circuitry is further operative to cause the visual display output to include for the user selected parcel, indicia indicative of a number of buildings for which there is sketch data of record as being on the user selected parcel in the PRS data, and a number of building structures of record as being on the user selected parcel in the PRS data for which the RAS circuitry has made a match determination.

25. The apparatus according to claim 1
wherein the RAS circuitry is further operative responsive at least in part to the PRS data and the GRS data corresponding to the user selected parcel to cause
a mismatch determination to be made indicative that further sketch data for a further building structure of record as being on the user selected parcel in the PRS data, corresponds within a set mismatch range of discrepancy, with image data representative of an overhead image of a mismatched building structure located on the user selected parcel included in the GRS data,
responsive at least in part to the mismatch determination, the visual display output to include a visual representation of corresponding to an overhead view of the mismatched building structure in the second visual format, and a visual representation of a further overhead outline corresponding to the further sketch data in the first visual format, in superimposed relation and in the common scale, and wherein the visual representation includes further visual indicia that is visually different from the visual indicia, indicative of the mismatch determination.

26. The apparatus according to claim 1
wherein the RAS circuitry is further operative responsive at least in part to the PRS data and the GRS data corresponding to the user selected parcel to cause
at least one mismatch determination to be made indicative that further sketch data for at least one further building structure of record as being on the user selected parcel in the PRS data, corresponds within a set mismatch range of discrepancy, with image data representative of an overhead image of a mismatched building structure located on the user selected parcel included in the GRS data,
responsive at least in part to the at least one mismatch determination, the visual display output to include a visual representation corresponding to of an overhead view of each mismatched building structure in the second visual format and a visual representation of at least one further overhead outline corresponding to the respective further sketch data in the first visual format, in superimposed relation and in the common scale, and wherein the visual representation includes further visual indicia indicative of each mismatch determination, and
a number of sketches for the user selected parcel for which the RAS circuitry has made a mismatch determination.

27. Apparatus that operates to provide a graphical user interface comprising:
record analysis system (RAS) circuitry, wherein the RAS circuitry is in operative connection with at least one data store,
wherein the at least one data store includes
property record system (PRS) data, wherein the PRS data includes
parcel data corresponding to a plurality of geographic areas of real estate,
wherein the parcel data for a respective geographical area includes sketch data comprising dimensions and configurations of external walls of building structures of record in the parcel data as being located in the respective geographic area,
georeferenced record system (GRS) data, wherein the GRS data includes
image data corresponding to visual overhead images of the plurality of geographic areas of real estate,
wherein the image data for a respective geographic area includes data representative of an overhead image of imaged building structures located in the respective geographic areas,
wherein the RAS circuitry is operative responsive at least in part to the PRS data, the GRS data, and receipt of at least one signal corresponding to at least one user geographical area selection input to an input device in operative connection with the graphical user interface, wherein the at least one signal is indicative of a user selected geographic area, to cause
through use of the sketch data associated with the building structures of record in the parcel data for the user selected geographic area, generation of first data that corresponds to a visual representation of an overhead outline of each building structure of record in the user selected geographic area,
through use of the image data associated with the imaged building structures located in the user selected geographic area, generation of second data that corresponds to a visual representation of an overhead view of each building structure located within the user selected geographic area,
through use of the first data and the second data, a match determination to be made indicative that sketch data for a first building structure of record in the user selected geographic area in the PRS data, corresponds within a set match range of discrepancy, with image data corresponding to the visual image of a matched imaged building structure located in the user selected geographic area, and
through use of the first data and the second data, a mismatch determination to be made indicative that further sketch data for a second building structure of record in the user selected geographic area in the PRS data, corresponds within a set mismatch range of discrepancy, with image data corresponding to the visual image of a mismatched imaged building structure located in the user selected geographic area, and
generation of signals that cause graphical user interface to output a visual display output which includes
responsive at least in part to the match determination, a visual representation of the imaged overhead view of the matched building structure in a first visual format, and the overhead outline of the first building structure in a second visual format that is visually different from the first visual format, in superimposed relation and in a common scale, and responsive at least in part to the mismatch determination, a further visual representation of the overhead view of the mismatched imaged building structure in the first visual format, and the overhead outline of the second building structure in the second visual format, in superimposed relation and in the common scale, wherein the visual output further includes visual indicia associated with at least one of the visual representation and the further visual representation indicative of the respective match determination or and mismatch determination.

28. Apparatus comprising:

record analysis system (RAS) circuitry, wherein the RAS circuitry is in operative connection with at least one data store, wherein the at least one data store includes property record system (PRS) data, wherein the PRS data includes data corresponding to a plurality of real estate parcels, sketch data corresponding to dimensions and relative directions of the external walls of building structures on each respective parcel, georeferenced record system (GRS) data, wherein the GRS data includes data corresponding to visual overhead images of real estate parcels including building structures on the respective parcels, wherein the RAS circuitry is operative responsive at least in part to the PRS data and the GRS data corresponding to a common parcel to cause a match determination to be made indicative that sketch data for a building structure in the PRS data corresponds within a set match range of discrepancy, with data corresponding to a visual image of a matched building structure in the GRS data, responsive at least in part to the match determination, to enable generation of at least one visual display output through a display, which at least one display output includes a first visual representation corresponding to an overhead view of the matched building structure and a graphic representation of the sketch data in superimposed relation and in a common scale, and wherein the first visual representation includes first visual indicia indicative of the match determination, a minor mismatch determination to be made indicative that further sketch data for a further building structure in the PRS data corresponds within a set minor mismatch range of discrepancy, with data corresponding to a visual image of a minor mismatched building structure in the GRS data, responsive at least in part to the minor mismatch determination, the at least one visual display output to include a second visual representation corresponding to an overhead view of the minor mismatch building structure and a graphic representation of the further sketch data in superimposed relation and in the common scale, and wherein the second visual representation includes second visual indicia different from the first visual indicia and indicative of the minor mismatch determination, a major mismatch determination to be made indicative that additional sketch data for an additional building structure in the PRS data corresponds within a set major mismatch range of discrepancy, with a visual image of a major mismatched building structure in the GRS data, responsive at least in part to the major mismatch determination, the at least one visual display output to include a third visual representation corresponding to an overhead view of the major mismatch building structure and a graphic representation of the additional sketch data in superimposed relation and in the common scale, and wherein the third visual representation includes third visual indicia different from the first and second visual indicia and indicative of the major mismatch determination, a no match determination to be made that other sketch data for an other building structure in the PRS data does not correspond to any visual image of any building structure in the PRS data within the major mismatch range of discrepancy or less, responsive at least in part to the no match determination, the at least one visual display output to include a fourth visual representation corresponding to at least a portion of the common parcel and a graphic representation of the other sketch data in superimposed relation and in the common scale, wherein the fourth visual representation includes fourth visual indicia different from each of the first, second and third visual indicia and indicative of the no match determination, wherein the at least one visual display output further includes a geometric figure with at least one dimension thereon corresponding to respective sketch data that is not in superimposed relation with a visual representation of a building structure for which one of a match determination, a minor mismatch determination, a major mismatch determination and a no sketch determination has been made.

29. The apparatus according to claim 28 wherein the PRS data includes structure type data in correlated relation with respective sketch data, and wherein the RAS circuitry is further operative to cause the at least one visual display output including the first visual representation corresponding to the overhead view of the matched building structure to include type indicia corresponding to the structure type data that is correlated with the respective sketch data.

30. The apparatus according to claim 29 wherein the at least one visual display output includes a horizontal ground level pictorial representation of at least a portion of the parcel.

31. The apparatus according to claim 30 wherein the at least one visual display output includes at least one selectable input icon, wherein selection of at least one first selectable input icon through at least one input device is operative to indicate that the PRS data for the common parcel is accurate, and cause the RAS circuitry to store data in at least one data store indicative that the PRS data for the common parcel is accurate.

32. The apparatus according to claim 31
wherein selection of at least one second selectable input icon through at least one input device is operative to
indicate that the PRS data for the common parcel is inaccurate, and
cause the RAS circuitry to store data in the at least one data store indicative that the PRS data for the common parcel is inaccurate.

33. The apparatus according to claim 32
wherein the at least one visual display output includes at least one selectable work order output, wherein selection of the at least one selectable work order output through at least one input device is operative to cause the RAS circuitry to generate data corresponding to a work order record with regard to the common parcel.

34. The apparatus according to claim 33
wherein the at least one selectable work order output includes a user populatable region, wherein the region is populatable by user inputs through the at least one input device with work order instructions that are included in the work order record.

* * * * *

UNITED STATES PATENT AND TRADEMARK OFFICE
CERTIFICATE OF CORRECTION

PATENT NO. : 11,971,871 B1
APPLICATION NO. : 17/021089
DATED : April 30, 2024
INVENTOR(S) : Brian N. Kienle et al.

It is certified that error appears in the above-identified patent and that said Letters Patent is hereby corrected as shown below:

In the Claims

Claim 1, Column 43, Line 60, "structures" is changed to "structure".
Claim 1, Column 44, Line 1, "structures" is changed to "structure".
Claim 6, Column 46, Line 18, "f" is deleted.
Claim 25, Column 49, Line 37, "of" is deleted.
Claim 26, Column 49, Line 60, "of" is deleted.
Claim 27, Column 50, Line 64, "the" is added after "cause".
Claim 27, Column 51, Line 17, "and" is deleted.

Signed and Sealed this
Eleventh Day of June, 2024

Katherine Kelly Vidal
*Director of the United States Patent and Trademark Office*